United States Patent
Wang et al.

(10) Patent No.: US 11,818,695 B2
(45) Date of Patent: Nov. 14, 2023

(54) SIGNAL TRANSMISSION METHOD, APPARATUS, TERMINAL DEVICE, NETWORK DEVICE, AND SYSTEM

(71) Applicant: HUAWEI TECHNOLOGIES CO., LTD., Guangdong (CN)

(72) Inventors: Ting Wang, Shanghai (CN); Jinlin Peng, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 488 days.

(21) Appl. No.: 17/157,727

(22) Filed: Jan. 25, 2021

(65) Prior Publication Data

US 2021/0168801 A1 Jun. 3, 2021

Related U.S. Application Data

(63) Continuation of application No. PCT/CN2019/097693, filed on Jul. 25, 2019.

Foreign Application Priority Data

Jul. 27, 2018 (CN) .......................... 201810845114.4

(51) Int. Cl.
*H04L 5/00* (2006.01)
*H04W 72/04* (2023.01)
(Continued)

(52) U.S. Cl.
CPC ....... *H04W 72/0453* (2013.01); *H04L 5/0092* (2013.01); *H04L 5/0094* (2013.01);
(Continued)

(58) Field of Classification Search
CPC ............ H04L 5/0001–0098; H04W 8/22–245; H04W 28/02–26; H04W 48/02–20;
(Continued)

(56) References Cited

U.S. PATENT DOCUMENTS

| | | |
|---|---|---|
| 2018/0049203 A1 | 2/2018 | Xue et al. |
| 2018/0192383 A1 | 7/2018 | Nam et al. |

(Continued)

FOREIGN PATENT DOCUMENTS

| | | |
|---|---|---|
| CN | 107911203 A | 4/2018 |
| WO | 2017000903 A1 | 1/2017 |

OTHER PUBLICATIONS

CATT, "On PDSCH and PUSCH resource allocation," 3GPP TSG RAN WG1 Meeting AH 1801, R1-1800257, Vancouver, Canada, Jan. 22-26, 2018, 22 pages (Year: 2018).*

(Continued)

*Primary Examiner* — Timothy J Weidner
(74) *Attorney, Agent, or Firm* — Fish & Richardson P.C.

(57) ABSTRACT

A method is provided, comprising: receiving resource indication information sent by a network device, where the resource indication information is used to indicate resource block groups RBGs allocated to the terminal device in a bandwidth part BWP, and the BWP includes N segments of frequency domain resources; for one of the N segments of frequency domain resources, a size P of an RBG other than the first RBG and the last RBG in the segment of frequency domain resources is determined based on a sum of bandwidths of the N segments of frequency domain resources; and for one of the N segments of frequency domain resources, a size of the first RBG in the segment of frequency domain resources is determined based on a start location of the segment of frequency domain resources and (Continued)

P; and transmitting a signal on the resource block groups RBGs allocated to the terminal device.

15 Claims, 18 Drawing Sheets

(51) Int. Cl.
```
H04W 72/12       (2023.01)
H04W 84/02       (2009.01)
H04W 88/02       (2009.01)
H04W 88/08       (2009.01)
H04W 92/02       (2009.01)
H04W 92/10       (2009.01)
H04W 72/0453     (2023.01)
H04W 72/23       (2023.01)
H04W 72/232      (2023.01)
H04W 72/1263     (2023.01)
```

(52) U.S. Cl.
CPC ....... *H04W 72/12* (2013.01); *H04W 72/1263* (2013.01); *H04W 72/23* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 72/02–569; H04W 74/002–008; H04W 76/10–50; H04W 84/005–22; H04W 88/005–188; H04W 92/02–24
See application file for complete search history.

(56) References Cited

U.S. PATENT DOCUMENTS

2019/0215807 A1* 7/2019 Hwang ................. H04W 72/23
2020/0274677 A1* 8/2020 Xing ................. H04W 72/0453

OTHER PUBLICATIONS

3GPP TS 38.211 V15.2.0 (Jun. 2018), "3rd Generation Partnership Project; Technical Specification Group Radio Access Network; NR; Physical channels and modulation (Release 15)," Jun. 2018, 96 pages.
CATT, "On PDSCH and PUSCH resource allocation," 3GPP TSG RAN WG1 Meeting AH 1801, R1-1800257, Vancouver, Canada, Jan. 22-26, 2018, 22 pages.
Huawei et al., "Resource allocation and TBS," 3GPP TSG RAN WG1 Meeting #91, R1-1719381, Reno, USA, Nov. 27-Dec. 1, 2017, 16 pages.
Huawei et al., "Scheduling and resource allocation for bandwidth parts," 3GPP TSG RAN WG1 Meeting #90, R1-1712156, Prague, Czech Republic, Aug. 21-25, 2017, 4 pages.
Nokia et al., "On the remaining wider-band aspects of NR," 3GPP TSG-RAN WG1 Meeting #90, R1-1714094, Prague, Czech Republic, Aug. 21-25, 2017, 6 pages.
PCT International Search Report and Written Opinion issued in International Application No. PCT/CN2019/097693 dated Oct. 15, 2019, 18 pages (with English translation).
Office Action issued in Chinese Application No. 201810845114.4 dated Jul. 5, 2021, 21 pages (with English translation).
Vivo, "On DL/UL resource allocation," 3GPP TSG RAN WG1 Meeting NR#3, R1-1715642, Nagoya, Japan, Sep. 18-21, 2017, 8 pages.
Office Action issued in Indian Application No. 202127002724 dated Jan. 6, 2022, 5 pages.
Huawei et al., "Scheduling and resource allocation mechanism for active bandwidth parts," 3GPP TSG RAN WG 1 NR Ad Hoc Meeting, R1-1709974, Qingdao, China, Jun. 27-30, 2017, 7 pages.
Extended European Search Report in European Application No. 19840688.6, dated Aug. 19, 2021, 19 pages.

* cited by examiner

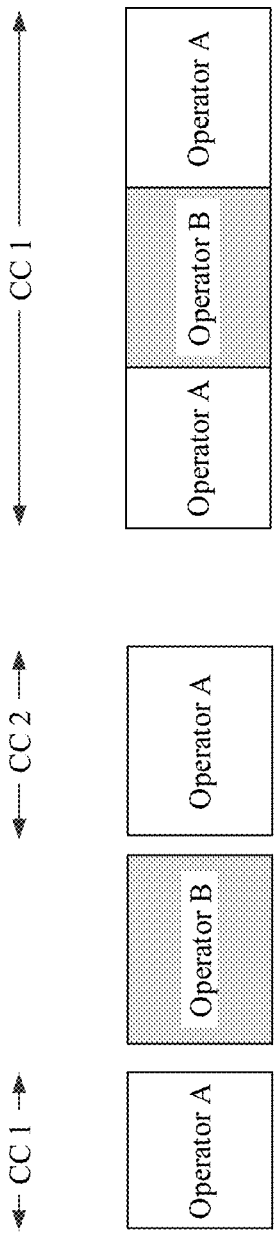

SIGNAL TRANSMISSION METHOD, APPARATUS, TERMINAL DEVICE, NETWORK DEVICE, AND SYSTEM

CROSS-REFERENCE TO RELATED APPLICATIONS

This application is a continuation of International Application No. PCT/CN2019/097693, filed on Jul. 25, 2019, which claims priority to Chinese Patent Application No. 201810845114.4, filed on Jul. 27, 2018. The disclosures of the aforementioned applications are hereby incorporated by reference in their entireties.

TECHNICAL FIELD

Embodiments of this application relate to communications technologies, and in particular, to a signal transmission method, an apparatus, a terminal device, a network device, and a system.

BACKGROUND

In a mobile communications system, a network device and a terminal device may transmit signals to each other through air interface resources. The air interface resources include frequency domain resources, and the frequency domain resources may fall within a specific frequency range. The network device may configure a bandwidth part (BWP) for the terminal device in frequency domain resources, for example, system bandwidths, to transmit a signal between the network device and the terminal device. How to transmit a signal on a BWP is an urgent topic to be studied.

SUMMARY

According to a first aspect, an embodiment of this application provides a signal transmission method, and the method includes:

receiving resource indication information sent by a network device, where the resource indication information is used to indicate resource block groups RBGs allocated to a terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1; and for one of the N segments of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP; and transmitting a signal on the RBGs allocated to the terminal device.

This method ensures normal transmission of a signal on the BWP.

In a possible design, if the BWP is described as a second-type BWP, and the segment of frequency domain resources is described as a first-type BWP, the method includes:

receiving resource indication information sent by the network device, where the resource indication information is used to indicate resource block groups RBGs allocated to the terminal device in the second-type BWP, the second-type BWP includes N first-type BWPs, and N is an integer greater than or equal to 2, where for one of the N first-type BWPs, a size P of an RBG other than the first RBG and the last RBG in the first-type BWP is determined based on a sum of bandwidths of the N first-type BWPs, where P is an integer greater than or equal to 1; and for one of the N first-type BWPs, a size of the first RBG in the first-type BWP is determined based on a start location of the first-type BWP and P, where the start location of the first-type BWP is determined based on a reference point of the first-type BWP, or the start location of the first-type BWP is determined based on a reference point of the second-type BWP; and transmitting a signal on the resource block groups RBGs allocated to the terminal device.

Another method provided in this embodiment of this application may also be equivalently described.

In a possible design, if the BWP is described as a first-type BWP group, and the segment of frequency domain resources is described as a first-type BWP, the method includes:

receiving resource indication information sent by the network device, where the resource indication information is used to indicate resource block groups RBGs allocated to the terminal device in the first-type BWP group, the BWP group includes N first-type BWPs, and N is an integer greater than or equal to 2, where for one of the N first-type BWPs, a size P of an RBG other than the first RBG and the last RBG in the first-type BWP is determined based on a sum of bandwidths of the N first-type BWPs, where P is an integer greater than or equal to 1; and for one of the N first-type BWPs, a size of the first RBG in the first-type BWP is determined based on a start location of the first-type BWP and P, where the start location of the first-type BWP is determined based on a reference point of the first-type BWP, or the start location of the first-type BWP is determined based on a reference point of the BWP group; and transmitting a signal on the resource block groups RBGs allocated to the terminal device.

Another method provided in this embodiment of this application may also be equivalently described.

According to the method provided in the first aspect, resources can be allocated on discrete spectrums, so that the network device and the terminal device can transmit signals to each other on discrete frequency domain resources. This improves resource utilization and signal transmission performance. In addition, according to the method, RBG sizes in all frequency domain resources can be the same. This reduces complexity of determining an RBG by the network device and the terminal device. In addition, RBGs in frequency domain resources on a carrier can be aligned, to ensure flexible resource allocation. During multi-user scheduling, RBGs of users can be aligned, to improve channel estimation accuracy and ensure signal transmission performance.

According to a second aspect, an embodiment of this application provides a signal transmission method, and the method includes:

receiving resource indication information sent by a network device, where the resource indication information is used to indicate resource block groups RBGs allocated to a terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1; and for one of the N segments of frequency domain resources, a size of the last RBG the segment of frequency domain resources is determined based on a start location of the segment of frequency domain resources, a bandwidth of the segment of frequency domain resources, and P, where the start location of the segment of frequency domain resources is determined based on a reference point of the segment of frequency domain resources, or the start location of the segment of frequency domain resources is determined based on a reference point of the BWP; and transmitting a signal on the resource block groups RBGs allocated to the terminal device.

This method ensures normal transmission of a signal on the BWP.

In a possible design, the first aspect and the second aspect may be combined for implementation.

In a possible design, the first aspect and the second aspect may be separately implemented.

According to the method provided in the second aspect, resources can be allocated on discrete spectrums, so that the network device and the terminal device can transmit a signal on discrete frequency domain resources. This improves resource utilization and signal transmission performance. In addition, according to the method, RBG sizes in all frequency domain resources can be the same. This reduces complexity of determining an RBG by the network device and the terminal device. In addition, RBGs in frequency domain resources on a carrier can be aligned, to ensure flexible resource allocation. During multi-user scheduling, RBGs of users can be aligned, to improve channel estimation accuracy and ensure signal transmission performance.

For the first aspect and the second aspect, in a possible design, the sum of the bandwidths of the N segments of frequency domain resources is:

a value obtained after a quantity of overlapping RBs is subtracted from a total quantity of RBs included in the N segments of frequency domain resources, where the overlapping RBs include an RB on which a first segment of frequency domain resources and a second segment of frequency domain resources in the N segments of frequency domain resources overlap. The descriptions of the first section and the second section are used for distinguishing, and do not indicate a specific sequence.

According to the foregoing method, a case of overlapping RBs may be considered when a size of an RBG is to be determined, and a more proper size of an RBG may be determined after the overlapping RBs are subtracted, to improve resource utilization, implement proper resource allocation, and improve signal transmission performance.

According to a third aspect, an embodiment of this application provides a signal transmission method, and the method includes:

receiving resource indication information sent by a network device, where the resource indication information is used to indicate resource block groups RBGs allocated to a terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a bandwidth of the segment of frequency domain resources, where P is an integer greater than or equal to 1; and for the segment of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP; and transmitting a signal on the resource block groups RBGs allocated to the terminal device.

This method ensures normal transmission of a signal on the BWP.

According to the method provided in the third aspect, resources can be allocated on discrete spectrums, so that the network device and the terminal device can transmit signals to each other on discrete frequency domain resources. This improves resource utilization and signal transmission performance. In addition, according to the method, RBG sizes in frequency domain resources may be the same or different. To be specific, an RBG size of each frequency domain resource may be determined based on a bandwidth of each frequency domain resource, and a proper RBG size may be determined based on the bandwidth of each frequency domain resource. In addition, RBGs in frequency domain resources on a carrier can be aligned, to ensure flexible resource allocation. During multi-user scheduling, RBGs of users can be aligned, to improve channel estimation accuracy and ensure signal transmission performance.

According to a fourth aspect, an embodiment of this application provides a signal transmission method, and the method includes:

receiving resource indication information sent by a network device, where the resource indication information is used to indicate resource block groups RBGs allocated to a terminal device in a bandwidth part the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a bandwidth of the segment of frequency domain resources, where P is an integer greater than or equal to 1; and for the segment of frequency domain resources, a size of the last RBG in the segment of frequency domain resources is determined based on a start location of the segment of frequency domain resources, the bandwidth of the segment of frequency domain resources, and P, where the start location of the segment of frequency domain resources is determined based on a reference point of the segment of frequency domain resources, or the start location of the segment of frequency domain resources is determined based on a reference point of the BWP; and transmitting a signal on the resource block groups RBGs allocated to the terminal device.

This method ensures normal transmission of a signal on the BWP.

According to the method provided in the fourth aspect, resources can be allocated on discrete spectrums, so that the network device and the terminal device can transmit signals to each other on discrete frequency domain resources. This improves resource utilization and signal transmission performance. In addition, according to the method, RBG sizes in frequency domain resources may be the same or different. To be specific, an RBG size of each frequency domain resource may be determined based on a bandwidth of each frequency domain resource, and a proper RBG size may be determined based on the bandwidth of each frequency domain resource. In addition, RBGs in frequency domain resources on a carrier can be aligned, to ensure flexible resource allocation. During multi-user scheduling, RBGs of users can be aligned, to improve channel estimation accuracy and ensure signal transmission performance.

In a possible design, the third aspect and the fourth aspect may be combined for implementation.

In a possible design, the third aspect and the fourth aspect may be separately implemented.

For the first aspect, the second aspect, the third aspect, and the fourth aspect, in a possible design, when the resource indication information is used to indicate the RBGs allocated to the terminal device in the BWP, one information bit in the resource indication information corresponds to one RBG index, and when a value of the information bit is t1, the RBGs allocated to the terminal device include an RBG corresponding to the RBG index, or when a value of the information bit is not t1 or is t2, the RBGs allocated to the terminal device do not include an RBG corresponding to the RBG index;

one RBG index uniquely corresponds to one RBG or a plurality of RBG indexes correspond to one RBG; and when a plurality of RBG indexes correspond to one RBG, the RBG is an overlapping resource in a plurality of segments of frequency domain resources of the N segments of frequency domain resources.

According to the method, resources can be allocated on discrete spectrums, so that the network device and the terminal device can transmit signals to each other on discrete frequency domain resources. This improves resource utilization and signal transmission performance. In addition, in this method, an RBG may be numbered once in consideration of overlapping frequency domain resources, so that overheads of the resource indication information can be reduced, and signal transmission performance can be ensured.

According to a fifth aspect, an embodiment of this application provides a signal transmission method, and the method includes:

receiving resource indication information sent by a network device, where the resource indication information is used to determine resources allocated to a terminal device in a bandwidth part BWP, the BWP includes N segments of frequency domain resources, and N is an integer greater than or equal to 2, where the resource indication information includes N information fields, the N information fields one-to-one correspond to the N segments of frequency domain resources, and each of the N information fields is used to determine resources allocated to the terminal device in each of the N segments of frequency domain resources; and if a quantity of bits in the resource indication information is L greater than a quantity of required bits, for one of the N information fields, X1 bits in the information field are used to indicate resources allocated to the terminal device in a segment of frequency domain resources corresponding to the information field, where X1 is equal to a quantity of bits in the information field minus Y1, and Y1 is a value obtained by equally dividing L by N, or Y1 is determined based on L and a ratio of the quantity of bits in the information field to the quantity of bits in the resource indication information; or if a quantity of bits in the resource indication information is S less than a quantity of required bits, for one of the N information fields, bits obtained after Y2 bits 0 are added to bits in the information field are used to indicate resources allocated to the terminal device in a segment of frequency domain resources corresponding to the information field, where Y2 is a value obtained by equally dividing S by N, or Y2 is determined based on S and a ratio of a quantity of bits in the information field to the quantity of bits in the resource indication information; and transmitting a signal on the resources allocated to the terminal device.

This method ensures normal transmission of a signal on the BWP.

According to the method, resources can be allocated on discrete spectrums, so that the network device and the terminal device can transmit signals to each other on discrete frequency domain resources. This improves resource utilization and signal transmission performance. In addition, according to the method, when the quantity of bits in the resource indication information is different from the quantity of required bits, it is ensured that the network device and the terminal device have a consistent understanding of a meaning of the bits, and determine same frequency domain resources for signal transmission, to ensure signal transmission performance. A method for determining Y1 or Y2 through equal division reduces processing complexity of the network device and the terminal device. In the method for determining Y1 or Y2 based on a ratio, a quantity of bits of each frequency domain resource may be considered, and a quantity of bits is properly designed based on a bandwidth of each frequency domain resource, to avoid a case in which a quantity of available bits of a frequency domain resource is relatively small. This ensures flexible resource allocation and improves signal transmission performance.

In a possible design, the fifth aspect may be implemented in combination with one or more of the first aspect, the second aspect, the third aspect, and the fourth aspect.

In a possible design, the fifth aspect may be independently implemented.

According to a sixth aspect, an embodiment of this application provides a signal transmission method, and the method includes:

sending resource indication information to a terminal device, where the resource indication information is used to indicate resource block groups RBGs allocated to the terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1; and for one of the N segments of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP; and transmitting a signal to the terminal device on the resource block groups RBGs allocated to the terminal device.

In a possible design, if the BWP is described as a second-type BWP, and the segment of frequency domain resources is described as a first-type BWP, the method includes:

sending resource indication information to the terminal device, where the resource indication information is used to indicate resource block groups RBGs allocated to the terminal device in the second-type BWP, the second-type BWP includes N first-type BWPs, and N is an integer greater than or equal to 2, where for one of the N first-type BWPs, a size P of an RBG other than the first RBG and the last RBG in the first-type BWP is determined based on a sum of bandwidths of the N first-type BWPs, where P is an integer greater than or equal to 1; and for one of the N first-type BWPs, a size of the first RBG in the first-type BWP is determined based on a start location of the first-type BWP and P, where the start location of the first-type BWP is determined based on a reference point of the first-type BWP, or the start location of the first-type BWP is determined based on a reference point of the BWP group; and transmitting a signal to the terminal device on the resource block groups RBGs allocated to the terminal device.

In a possible design, if the BWP is described as a first-type BWP group, and the segment of frequency domain resources is described as a first-type BWP, the method includes:

sending resource indication information to the terminal device, where the resource indication information is used to indicate resource block groups RBGs allocated to the terminal device in the first-type BWP group, the BWP group includes N first-type BWPs, and N is an integer greater than or equal to 2, where for one of the N first-type BWPs, a size P of an RBG other than the first RBG and the last RBG in the first-type BWP is determined based on a sum of bandwidths of the N first-type BWPs, where P is an integer greater than or equal to 1; and for one of the N first-type BWPs, a size of the first RBG in the first-type BWP is determined based on a start location of the first-type BWP and P, where the start location of the first-type BWP is determined based on a reference point of the first-type BWP, or the start location of the first-type BWP is determined based on a reference point of the BWP group; and transmitting a signal to the terminal device on the resource block groups RBGs allocated to the terminal device.

According to a seventh aspect, an embodiment of this application provides a signal transmission method, and the method includes:

sending resource indication information to a terminal device, where the resource indication information is used to indicate resource block groups RBGs allocated to the terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1; and for one of the N segments of frequency domain resources, a size of the last RBG in the segment of frequency domain resources is determined based on a start location of the segment of frequency domain resources, a bandwidth of the segment of frequency domain resources, and P, where the start location of the segment of frequency domain resources is determined based on a reference point of the segment of frequency domain resources, or the start location of the segment of frequency domain resources is determined based on a reference point of the BWP; and transmitting a signal to the terminal device on the resource block groups RBGs allocated to the terminal device.

For the sixth aspect and the seventh aspect, in a possible design, the sum of the bandwidths of the N segments of frequency domain resources is:

a value obtained after a quantity of overlapping RBs is subtracted from a total quantity of RBs included in the N segments of frequency domain resources, where the overlapping RBs include an RB on which a first segment of frequency domain resources and a second segment of frequency domain resources in the N segments of frequency domain resources overlap. The descriptions of the first section and the second section are used for distinguishing, and do not indicate a specific sequence.

In a possible design, the sixth aspect and the seventh aspect may be combined for implementation.

In a possible design, the sixth aspect and the seventh aspect may be separately implemented.

According to an eighth aspect, an embodiment of this application provides a signal transmission method, and the method includes:

sending resource indication information to a terminal device, where the resource indication information is used to indicate resource block groups RBGs allocated to the terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a bandwidth of the segment of frequency domain resources, where P is an integer greater than or equal to 1; and for the segment of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP; and transmitting a signal to the terminal device on the resource block groups RBGs allocated to the terminal device.

According to a ninth aspect, an embodiment of this application provides a signal transmission method, and the method includes:

sending resource indication information to a terminal device, where the resource indication information is used to indicate resource block groups RBGs allocated to the terminal device in a bandwidth part BWP, the BWP includes N segments of frequency domain resources, and N is an integer greater than or equal to 2, where for one of the N segments of frequency domain resources, a size P of an RBG other than the first RBG and the last RBG in the segment of frequency domain resources is determined based on a bandwidth of the segment of frequency domain resources, where P is an integer greater than or equal to 1; and for the segment of frequency domain resources, a size of the last RBG in the segment of frequency domain resources is determined based on a start location of the segment of frequency domain resources, the bandwidth of the segment of frequency domain resources, and P, where the start location of the segment of frequency domain resources is determined based on a reference point of the segment of frequency domain resources, or the start location of the segment of frequency domain resources is determined based on a reference point of the BWP; and transmitting a signal to the terminal device on the resource block groups RBGs allocated to the terminal device.

In a possible design, the eighth aspect and the ninth aspect may be combined for implementation.

In a possible design, the eighth aspect and the ninth aspect may be separately implemented.

For the sixth aspect, the seventh aspect, the eighth aspect, and the ninth aspect, in a possible design, when the resource indication information is used to indicate the RBGs allocated to the terminal device in the BWP, one information bit in the resource indication information corresponds to one RBG index, and when a value of the information bit is t1, the RBGs allocated to the terminal device include an RBG corresponding to the RBG index, or when a value of the information bit is not t1 or is t2, the RBGs allocated to the terminal device do not include an RBG corresponding to the RBG index, where t1 and t2 are integers;

one RBG index uniquely corresponds to one RBG, or a plurality of RBG indexes correspond to one RBG; and when a plurality of RBG indexes correspond to one RBG, the RBG is an overlapping resource in a plurality of segments of frequency domain resources of the N segments of frequency domain resources.

According to a tenth aspect, an embodiment of this application provides a signal transmission method, and the method includes:

sending resource indication information to a terminal device, where the resource indication information is used to indicate resources allocated to the terminal device in a bandwidth part BWP, the BWP includes N segments of frequency domain resources, and N is an integer greater than or equal to 2, where the resource indication information includes N information fields, the N information fields one-to-one correspond to the N segments of frequency domain resources, and each of the N information fields is used to indicate resources allocated to the terminal device in each of the N segments of frequency domain resources; and if a quantity of bits in the resource indication information is L greater than a quantity of required bits, for one of the N information fields, bits in the information field are information obtained after Y1 bits 0 are added to bits required to allocate resources to the terminal device in a segment of frequency domain resources corresponding to the information field, where Y1 is a value obtained by equally dividing L by N, or Y1 is determined based on L and a ratio of a quantity of bits in the information field to the quantity of bits in the resource indication information; or if a quantity of bits in the resource indication information is S less than a quantity of required bits, for one of the N information fields, the information field is used to indicate resources allocated to the terminal device in a segment of frequency domain resources corresponding to the information field, where the information field is information obtained after Y2 bits are removed from bits required to allocate the resources to the terminal device in the segment of frequency domain resources corresponding to the information field, and Y2 is a value obtained by equally dividing S by N, or Y2 is determined based on S and a ratio of a quantity of bits in the information field to the quantity of bits in the resource indication information; and transmitting a signal to the terminal device on the resources allocated to the terminal device.

In a possible design, the tenth aspect may be implemented in combination with one or more of the sixth aspect, the seventh aspect, the eighth aspect, and the ninth aspect.

In a possible design, the tenth aspect may be independently implemented.

According to an eleventh aspect, an embodiment of this application provides an apparatus. The apparatus may be a terminal device, or may be an apparatus that can support a terminal device in performing a corresponding function performed by the terminal device in any design example of the first aspect to the fifth aspect. For example, the apparatus may be an apparatus or a chip system in the terminal device. The apparatus may include a receiving module and a processing module. These modules may perform corresponding functions performed by the terminal device in any one of the design examples in the first aspect to the fifth aspect. Details are as follows:

The receiving module is configured to receive resource indication information.

The processing module is configured to transmit a signal on resources allocated to the terminal device.

In a possible design, for specific content of the resource indication information, refer to specific descriptions of the resource indication information in the first aspect to the fifth aspect. This is not specifically limited herein.

In a possible design, the resources allocated to the terminal device may be RBGs allocated to the terminal device.

According to a twelfth aspect, an embodiment of this application provides an apparatus. The apparatus may be a network device, or may be an apparatus that can support a, network device in performing a corresponding function performed by the network device in any design example of the sixth aspect to the tenth aspect. For example, the apparatus may be an apparatus or a chip system in the network device. The apparatus may include a sending module and a processing module. These modules may perform corresponding functions performed by the network device in any one of the design examples in the sixth aspect to the tenth aspect. Details are as follows:

The sending module is configured to send resource indication information.

The processing module is configured to transmit a signal to a terminal device on resources allocated to the terminal device.

In a possible design, for specific content of the resource indication information, refer to specific descriptions of the resource indication information in the sixth aspect to the tenth aspect. This is not specifically limited herein.

In a possible design, the resources allocated to the terminal device may be RBGs allocated to the terminal device.

According to a thirteenth aspect, an embodiment of this application provides a terminal device. The terminal device includes a processor, configured to implement functions of the terminal device in the methods described in the first aspect to the fifth aspect. The terminal device may further include a memory, configured to store a program instruction and data. The memory is coupled to the processor. The processor may invoke and execute the program instruction stored in the memory, to implement functions of the terminal device in the methods described in the first aspect to the fifth aspect. The terminal device may further include a communications interface, and the communications interface is used by the terminal device to communicate with another device. For example, the another device is a network device.

In a possible design, the terminal device includes:
the communications interface;
the memory, configured to store the program instruction; and
the processor, configured to receive resource indication information, and transmit a signal on resources allocated to the terminal device.

In a possible design, for specific content of the resource indication information, refer to specific descriptions of the resource indication information in the first aspect to the fifth aspect. This is not specifically limited herein.

In a possible design, the resources allocated to the terminal device may be RBGs allocated to the terminal device.

According to a fourteenth aspect, an embodiment of this application provides a network device. The network device includes a processor, configured to implement functions of the network device in the methods described in the sixth aspect to the tenth aspect. The network device may further include a memory, configured to store a program instruction and data. The memory is coupled to the processor. The processor may invoke and execute the program instruction stored in the memory, to implement functions of the network device in the methods described in the sixth aspect to the tenth aspect. The network device may further include a communications interface, and the communications interface is used by the network device to communicate with another device. For example, the another device is a terminal device.

In a possible device, the network device includes:
the communications interface;
the memory, configured to store the program instruction; and
the processor, configured to send resource indication information, and transmit a signal to the terminal device on resources allocated to the terminal device.

In a possible design, for specific content of the resource indication information, refer to specific descriptions of the resource indication information in the sixth aspect to the tenth aspect. This is not specifically limited herein.

In a possible design, the resources allocated to the terminal device may be RBGs allocated to the terminal device.

According to a fifteenth aspect, an embodiment of this application provides a chip system. The chip system includes a processor, may further include a memory, and may further include a communications interface, to implement functions of the terminal device in the foregoing methods. The chip system may include a chip, or may include a chip and another discrete device.

According to a sixteenth aspect, an embodiment of this application provides a chip system. The chip system includes a processor, may further include a memory, and may further include a communications interface, to implement functions of the network device in the foregoing methods. The chip system may include a chip, or may include a chip and another discrete device.

According to a seventeenth aspect, an embodiment of this application provides a computer program product. The computer program product includes computer program code, and when the computer program code is executed by a computer, the computer is enabled to perform the method according to any one of the first aspect to the fifth aspect, or the computer is enabled to perform the method according to any one of the sixth aspect to the tenth aspect.

According to an eighteenth aspect, an embodiment of this application provides a computer readable storage medium. The computer storage medium stores a computer instruction, and when the computer instruction is executed by a computer, the computer is enabled to perform the method according to any one of the first aspect to the fifth aspect or the method according to any one of the sixth aspect to the tenth aspect.

According to a nineteenth aspect, an embodiment of this application provides a system. The system includes the terminal device according to the thirteenth aspect and the network device according to the fourteenth aspect, or the system includes the apparatus according to the eleventh aspect and the apparatus according to the twelfth aspect.

BRIEF DESCRIPTION OF DRAWINGS

FIG. 1 and FIG. 2 are schematic diagrams of discrete spectrums owned by an operator A;

DETAILED DESCRIPTION OF EMBODIMENTS

Figure 3:
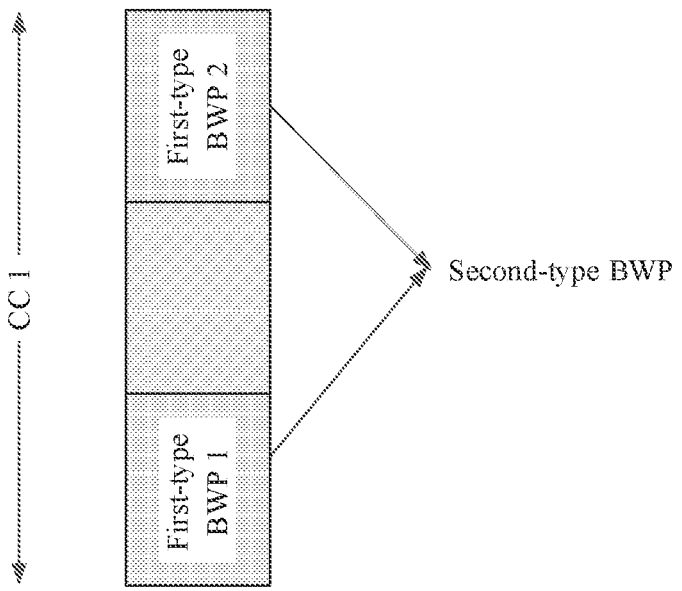
FIG. 3 is a first example diagram of a second-type BWP.

In a mobile communications network, air interface resources may include frequency domain resources, and may further include time domain resources. The frequency domain resources may be located in a specific frequency range. A network device may configure a BWP for a terminal device in frequency domain resources, for example, in system bandwidths.

In a possible design, the BWP includes a segment of contiguous frequency domain resources on a carrier. For example, the BWP may include a positive integer quantity of RBs, and one BWP may be located on one carrier. One or more carriers may be configured for a cell. Optionally, one or more BWPs may be configured for the terminal device in one cell or on one carrier, one BWP may be activated at one moment, and the terminal device may receive or send a signal on the activated BWP. In the embodiments of this application, a BWP including a segment of contiguous frequency domain resources may also be referred to as a segment of frequency domain resources, a first-type BWP, a legacy (existing) BWP, or the like.

In actual operation, frequency domain resources owned by an operator may be discrete spectrums. FIG. 1 and FIG. 2 are schematic diagrams of discrete spectrums owned by an operator A. As shown in FIG. 1, the operator A owns two spectrums, the two spectrums are located on a same carrier CC 1, and a spectrum between the two spectrums is occupied by an operator B. For the operator A, the two spectrums owned by the operator A are discrete spectrums, and the discrete spectrums may be located on a same carrier. As shown in FIG. 2, the operator A owns two spectrums. One spectrum is located on a carrier CC 1, and the other spectrum is located on a carrier CC 2. A spectrum between the two spectrums is occupied by the operator B. For the operator A, the two spectrums owned by the operator A are discrete spectrums, and the discrete spectrums may be located on different carriers.

To resolve a problem in signal transmission on discrete spectrums, in a possible design, a BWP (group) design supporting discrete frequency domain resources is proposed. The design may be a BWP bundle design, a second-type BWP design, or a BWP group design described below.

In BWP bundle, one BWP includes one segment of frequency domain resources or a plurality of segments of frequency domain resources, and the plurality of segments of frequency domain resources include at least two segments of frequency domain resources. Further, any two of the plurality of segments of frequency domain resources may be located on a same carrier, or may be located on different carriers. This is not limited in this application. Through BWP bundle, a signal may be transmitted on discrete frequency domain resources, or may be transmitted on a plurality of carriers. In the BWP bundle, one or more segments of frequency domain resources in the BWP may be all uplink frequency domain resources, or may be all downlink frequency domain resources, or may be both uplink frequency domain resources and downlink frequency domain resources. Alternatively, some segments of frequency domain resources may be uplink frequency domain resources, and some segments of frequency domain resources are downlink frequency domain resources. A terminal device may send a signal to a network device on the uplink frequency domain resources, and the network device may send a signal to the terminal device on the downlink frequency domain resources. In the embodiments of this application, "a plurality of" may be two, three, four, or more, and a plurality of segments may be two, three, four, or more segments. This is not limited in this application. In the embodiments of this application, the BWP in the BWP bundle design may also be referred to as a bundled BWP or may have another name. This is not limited in this application.

The BWP bundle design may alternatively be described as the second-type BWP design: One second-type BWP may include one or more first-type BWPs. One first-type BWP is equivalent to or corresponds to one segment of frequency domain resources in the BWP bundle, and the second-type BWP is equivalent to or corresponds to the BWP in the BWP bundle. Similarly, in a second-type BAT, all first-type BWPs may be all uplink BW or may be all downlink BWPs, or some first-type BWPs are uplink BWPs, and some first-type BWPs are downlink BWPs. The terminal device may send a signal to the network device on the uplink BWPs, and the network device may send a signal to the terminal device on the downlink BWPs. In the embodiments of this application, the second-type BWP may also be referred to as an X-BWP or another name. This is not limited in this application.

Alternatively, the BWP bundle design may be described as the BWP group design: One first-type BWP group may include one or more first-type BWPs. One first-type BWP is equivalent to or corresponds to one segment of frequency domain resources in the BWP bundle, and the first-type BWP group is equivalent to or corresponds to the BWP in the BWP bundle. Similarly, in a first-type BWP group, all first-type BWPs may be all uplink BWPs, or may be all downlink BWPs, or some first-type BWPs are uplink BWPs, and some first-type BWPs are downlink BWPs.

For ease of description, in the embodiments of this application, the second-type BWP design is used as an example for description. A person skilled in the art may easily apply the method provided in the embodiments of this application to the BWP bundle design or the BWP group design.

When one second-type BWP includes a plurality of first-type BWPs, any two of the plurality of first-type BWPs included in the second-type BWP may be located on a same carrier, or may be located on different carriers. For example, a plurality of first-type BWPs included in one second-type BWP may be located on a same carrier, or may be separately located on different carriers, or some first-type BWPs in the second-type BWP may be located on a same carrier. This is not limited in this embodiment of this application.

FIG. 3 is a first example diagram of a second-type BWP. As shown in FIG. 3, the second-type BWP includes two first-type BWP: a first-type BWP 1 and a first-type BWP 2. The first-type BWP 1 and the first-type BWP 2 are located on a same carrier CC 1.

Figure 4:
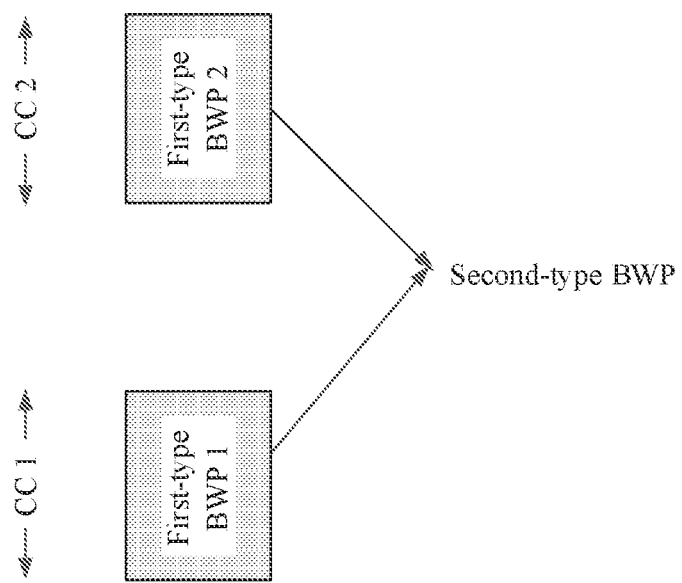
FIG. 4 is a second example diagram of a second-type BWP.

FIG. 4 is a second example diagram of a second-type BWP. As shown in FIG. 4, the second-type BWP includes two first-type BWPs: a first-type BWP 1 and a first-type BWP 2. The first-type BWP 1 and the first-type BWP 2 are located on different carriers. Specifically, the first-type BWP 1 is located on a carrier CC 1, and the first-type BWP 2 is located on a carrier CC 2.

Figure 5:
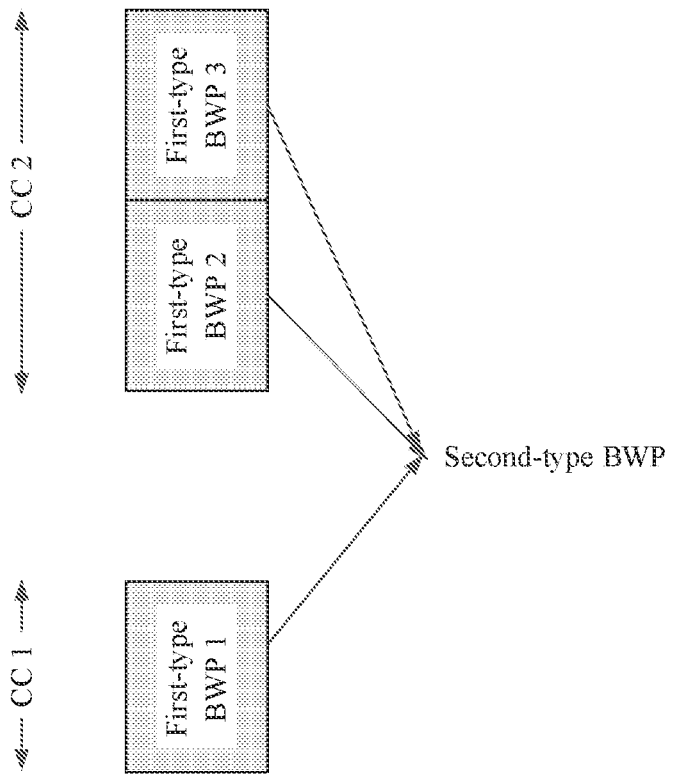
FIG. 5 is a third example diagram of a second-type BWP.

FIG. 5 is a third example diagram of a second-type BWP. As shown in FIG. 5, the second-type BWP includes three first-type BWPs: a first-type BWP 1, a first-type BWP 2, and a first-type BWP 3. The first-type BWP 2 and the first-type BWP 3 are located on a same carrier, and the first-type BWP 1 and the first-type BWP 2 are located on different carriers. Specifically, the first-type BWP 1 is located on a carrier CC 1, and the first-type BWP 2 and the first-type BWP 3 are located on a carrier CC 2.

In addition, for one second-type BWP, two of a plurality of first-type BWPs included in the second-type BWP may be contiguous frequency domain resources, or may be noncontiguous frequency domain resources, or may be frequency domain resources that overlap in frequency domain. This is not limited in this application.

In the example in FIG. 3, there is further a segment of frequency domain resources that do not belong to the second-type BWP between two first-type BWPs (for example, between the first-type BWP 1 and the first-type BWP 2) included in the second-type BWP. That is, the two first-type BWPs included in the second-type BWP are non-contiguous frequency domain resources.

Figure 6:
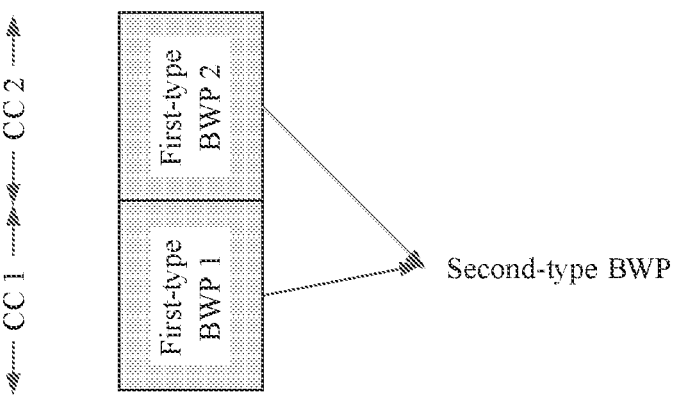
FIG. 6 is a fourth example diagram of a second-type BWP.

FIG. 6 is a fourth example diagram of a second-type BWP. As shown in FIG. 6, the second-type BWP includes two first-type BWPs: a first-type BWP 1 and a first-type BWP 2. The first-type BWP 1 is located on a carrier CC 1, and the first-type BWP 2 is located on a carrier CC 2. The first-type BWP 1 and the first-type BWP 2 are two contiguous segments of frequency domain resources. That is, the two first-type BWPs included in the second-type BWP may form contiguous frequency domain resources.

In addition, in a second-type BWP, one or more of first-type BWPs may be all uplink BWPs, or may be all downlink BWPs, or may be both uplink BWPs and downlink BWPs, or some of the first-type BWPs are uplink BWPs, and some of the first-type BWPs are downlink BWPs.

Figure 7:
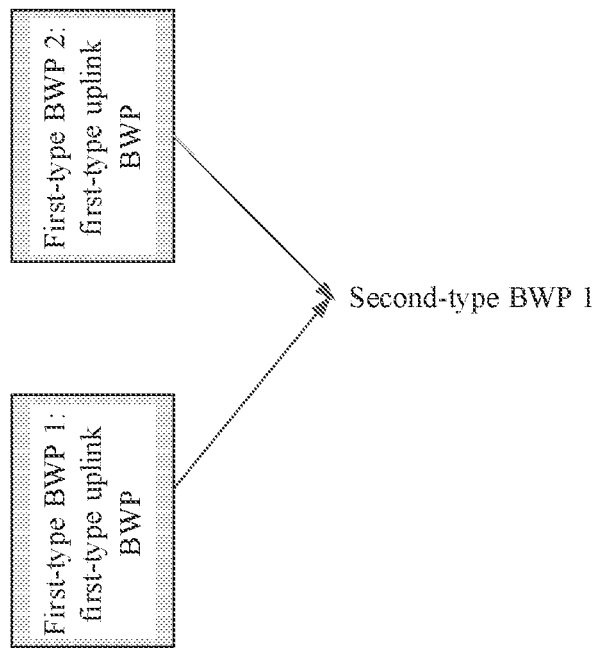
FIG. 7 is a fifth example diagram of a second-type BWP.

FIG. 7 is a, fifth example diagram of a second-type BWP. As shown in FIG. 7, a second-type BWP 1 includes two first-type BWPs: a first-type BWP 1 and a first-type BWP 2. The first-type BWP 1 and the first-type BWP 2 are both first-type uplink BWPs.

Figure 8:
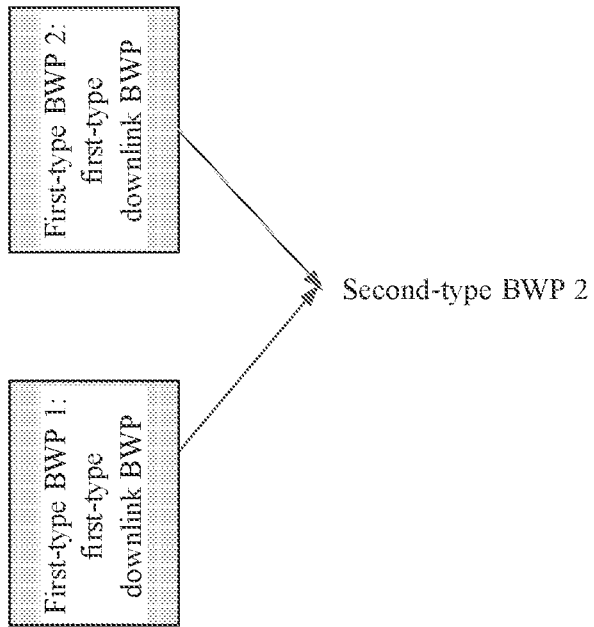
FIG. 8 is a sixth example diagram of a second-type BWP.

FIG. 8 is a sixth example diagram of a second-type BWP. As shown in FIG. 8, a second-type BWP 2 includes two first-type BWPs: a first-type BWP 1 and a first-type BWP 2. The first-type BWP 1 and the first-type BWP 2 are both first-type downlink BWPs.

Figure 9:
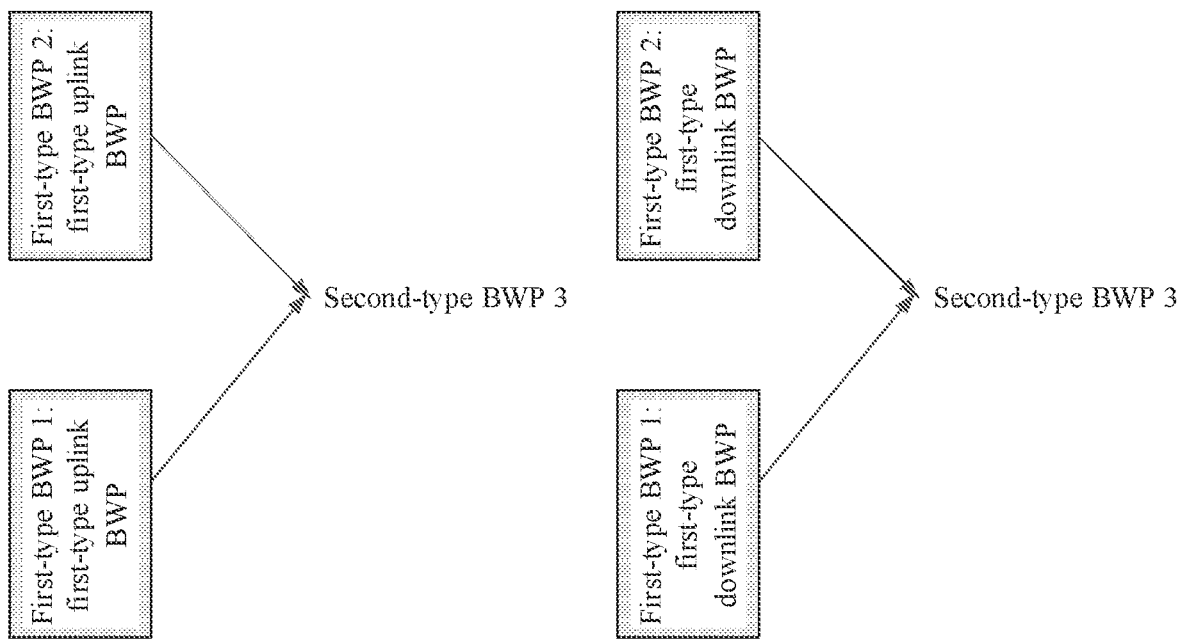
FIG. 9 is a seventh example diagram of a second-type BWP.

FIG. 9 is a seventh example diagram of a second-type BWP. As shown in FIG. 9, a second-type BWP 3 includes two first-type BWPs: a first-type BWP 1 and a first-type BWP 2. The first-type BWP 1 is both a first-type uplink BWP and a first-type downlink BWP, and the first type of BWP 2 is both a first-type uplink BWP and a first-type downlink BWP.

Figure 10:
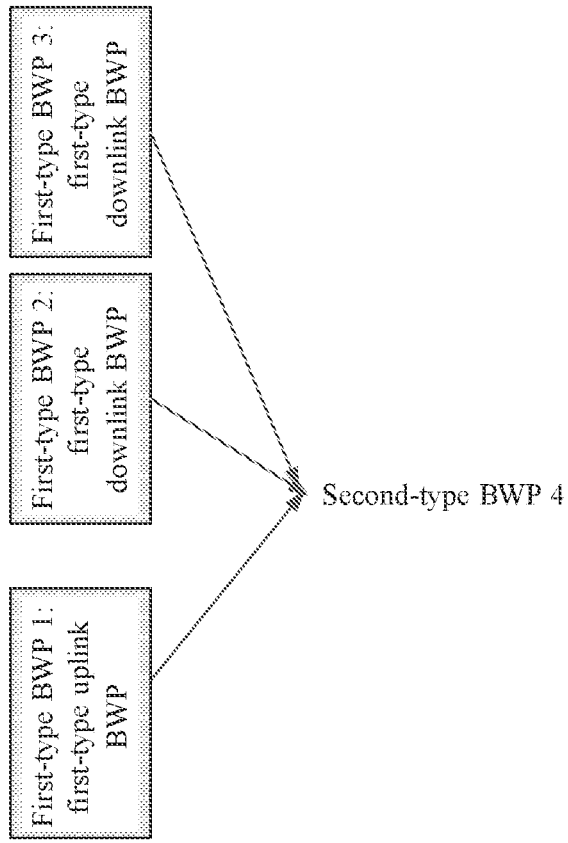
FIG. 10 is an eighth example diagram of a second-type BWP.

FIG. 10 is an eighth example diagram of a second-type BWP. As shown in FIG. 10, the second-type BWP 4 includes three first-type BWPs: a first-type BWP 1, a first-type BWP 2, and a first-type BWP 3. The first-type BWP 1 is a first-type uplink BWP, and the first-type BWP 2 and the first-type BWP 3 are first-type downlink BWPs.

In the embodiments of this application, signal transmission may be uplink signal transmission (for example, the terminal device sends a signal to the network device), or may be downlink signal transmission (for example, the network device sends a signal to the terminal device). In the embodiments of this application, signal transmission may be signal sending, or may be signal receiving.

Optionally, one or more second-type BWPs may be configured fix the terminal device. A plurality of second-type BWPs are configured for the terminal device in the following scenarios:

(1) A plurality of second-type BWPs may be configured for a Uu interface (universal UE to network interface) between the network device and the terminal device.

(2) One or more second-type BWPs may be configured for a Uu interface between the network device and the terminal device, and one or more second-type BWPs may be configured for a sidelink between terminal devices.

(3) A plurality of second-type BWPs may be configured for a sidelink between terminal devices.

The Uu interface is used to implement communication between the terminal device and the network device, and the sidelink is used to implement communication between the terminal devices.

Optionally, BWPs may be activated or deactivated in one first-type BWP, and the network device and the terminal device may transmit a signal on an activated first-type BWP. Activation and deactivation of the first-type BWP may involve or cause switching of the first-type BWP. An activated first-type BWP may be understood as a bandwidth part on which a terminal currently works. The terminal may receive at least one signal or channel in a downlink reference signal (including a downlink demodulation reference signal (DMARS) and a channel state information-reference signal (CSI-RS)), a physical downlink control channel (PDCCH), and a physical downlink shared channel (PDSCH) on an activated first-type downlink BWP, and the terminal may send at least one signal or channel in an uplink reference signal (including an uplink LAIRS), a physical uplink control channel (PUCCH), and a physical uplink shared channel (PUSCH) on an activated first-type uplink BWP. In the embodiments of this application, the at least one signal or channel may be one, two, three, or more signals or channels.

Optionally, BWPs may be activated or deactivated in one second-type BWP, and the network device and the terminal device may transmit a signal on an activated second-type BWP. Activation and deactivation of the second-type BWP may involve or cause switching of the second-type BWP. The activated second-type BWP may be understood as a second-type BWP on which the terminal currently works. The terminal device may receive at least one signal or channel of a downlink reference signal (including a downlink DMRS and a CSI-RS), a PDCCH, and a PDSCH on a first-type downlink BWP in the activated second-type BWP, the terminal device may send at least one signal or channel of an uplink reference signal (including an uplink DMRS), a PUCCH, and a PUSCH on a first-type uplink BWP in the activated second-type BWP.

When the network device and the terminal device transmit a signal, the network device may configure a second-type BWP for the terminal device, and may allocate resources in the configured second-type BWP to the terminal device. The allocated resources may be used by the network device and the terminal device to transmit a signal. Therefore, how to allocate resources to the terminal device in the second-type BWP is an important research topic. In the embodiments of this application, the network device may configure same or different second-type BWPs for different terminal devices. Quantities of first-type BWPs included in the second-type BWPs configured by the network device for different terminal devices may be the same or different. This is not limited in this application.

The technical solutions in the embodiments of this application are intended to resolve a problem in resource allocation and signal transmission on the second-type BWP.

Optionally, the second-type BWP described in the following embodiments of this application may also be described as a BWP. The BWP is the BWP in the BWP bundle design, and the BWP may include N segments of frequency domain resources, where N is an integer greater than or equal to 2. Any two of the N segments of frequency domain resources may be noncontiguous frequency domain resources.

Figure 11:
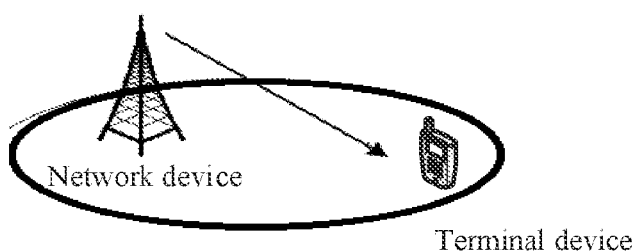
FIG. 11 is an example system architectural diagram of a signal transmission method according to an embodiment of this application.

FIG. 11 is an example system architectural diagram of a signal transmission method according to an embodiment of this application. As shown in FIG. 11, the method relates to signal transmission between a terminal device and a network device.

The terminal device in the embodiments of this application may be a device that provides a user with voice and/or data connectivity, a handheld device with a wireless connection function, or another processing device connected to a wireless modem. The terminal device may communicate with one or more core networks through a radio access network (RAN). The terminal device may be a mobile terminal device such as a mobile phone (or referred to as a "cellular" phone) and a computer with a mobile terminal device, for example, may be a portable, pocket-sized, handheld, computer built-in, or vehicle-mounted mobile apparatus, which exchanges voice and/or data with the radio access network. For example, the terminal device may be a personal communication service (PCS) phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal device may also be referred to as a system, a subscriber unit, a subscriber station, a mobile station, a mobile console, a remote station, an access point, a remote terminal, an access terminal, a user terminal, a user agent, a user device, or user equipment.

In the embodiments of this application, the network device may be a base station. The base station may be a device that is deployed in the radio access network and that can perform wireless communication with the terminal device. The base station may be configured to perform conversion between a received radio frame and an IP packet and serve as a router between the terminal device and a rest portion of the access network. The rest portion of the access network may include an internet protocol (IP) network. The base station may further coordinate attribute management of an air interface. For example, the base station may be a base transceiver station (BTS) in a global system for mobile communications (GSM) or a code division multiple access (CDMA) network, or may be an NB (NodeB) in wideband code division multiple access (WCDMA), or may be an evolved NodeB (eNB, or e-NodeB) in LTE, or may be a gNB in NR. Alternatively, the base station may be a radio controller in a cloud radio access network (CRN) scenario, or may be a relay station, an access point, a vehicle-mounted device, a wearable device, a network device in a 5G network, a network device in a future evolved PLMN network, or the like. This is not limited in the embodiments of this application.

In addition, the base station may be a macro base station, or may be a micro base station.

The method in this application is applicable to both a homogeneous network scenario and a heterogeneous network scenario. In addition, there is no limitation on a transmission point. For example, coordinated multipoint transmission between macro base stations, between micro base stations, and between a macro base station and a micro base station may be supported. In addition, the method in this application may be applied to a frequency division duplex (FDD) system, or may be applied to a time division duplex (TDD) system. In addition, the method in this application is also applicable to both a low-frequency (lower than 6 GHz) scenario and a high-frequency (higher than 6 GHz) scenario.

Figure 12:
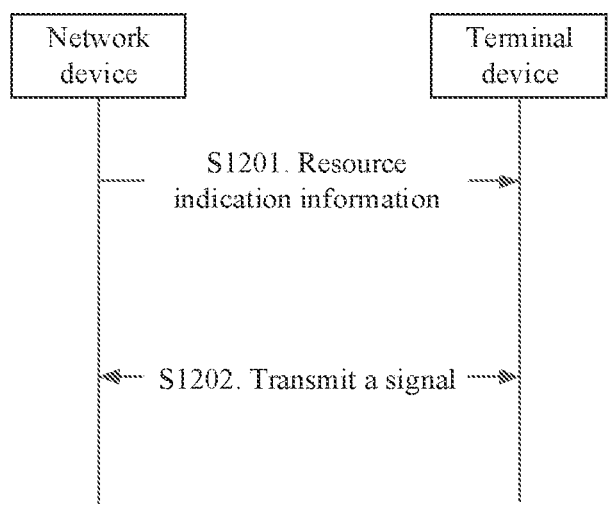
FIG. 12 is an example diagram of an interaction procedure of signal transmission between a terminal device and a network device according to an embodiment of this application.

FIG. 12 is an example diagram of an interaction procedure of signal transmission between a terminal device and a network device according to an embodiment of this application. As shown in FIG. 12, a process of signal transmission between the terminal device and the network device is as follows:

S1201. The network device sends resource indication information to the terminal device.

The resource indication information is used to indicate resources allocated to the terminal device in a second-type BWP.

S1202. The terminal device transmits a signal to the network device on the resources allocated by the network device.

Optionally, the resource indication information may be used to indicate RBs allocated to the terminal device in the second-type BWP, or the resource indication information may be used to indicate resource block groups (RBG) allocated to the terminal device in the second-type BWP. The second-type BWP may include one or more first-type BWPs, and each first-type BWP may include one or more RBs. Alternatively, each first-type BWP may include one or more RBGs, and one RBG may include one or more RBs.

It should be noted that the RB in this application may be a physical resource block or a virtual resource block. This is not limited in this application.

Figure 13:
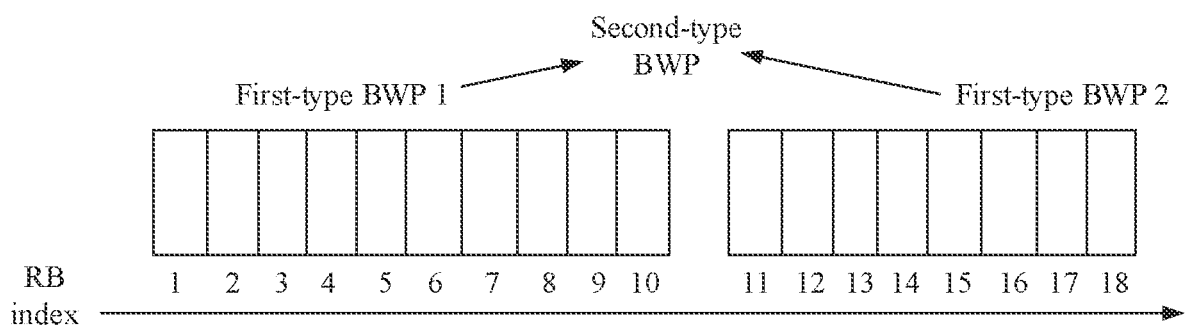
FIG. 13 is an example diagram of jointly numbering RBs in a second-type BWP.

In an optional implementation, if the resource indication information is used to indicate the RBs allocated to the terminal device in the second-type BWP, the network device may jointly number RBs included in the second-type BWP. For example, RB indexes may start to increase from a lowest frequency location of the second-type BWP. FIG. 13 is an example diagram of jointly numbering the RBs in the second-type BWP. As shown in FIG. 13, the second-type BWP includes a first-type BWP 1 and a first-type BWP 2. The first-type BWP 1 includes 10 RBs, and the first-type BWP 2 includes eight RBs. After the RBs in the first-type BWP 1 and the first-type BWP 2 are jointly numbered, RB indexes in the first-type BWP 1 are sequentially 1, 2, 3, 4, 5, 6, 7, 8, 9, and 10, and RB indexes in the first-type BWP 2 are sequentially 11, 12, 13, 14, 15, 16, 17, and 18. Alternatively, the RB indexes may be numbered from 0. This is not limited in this application. For example, RB indexes in the first-type BWP 1 are sequentially 0, 1, 2, 3, 4, 5, 6, 7, 8, and 9, and RB indexes in the first-type BWP 2 are sequentially 10, 11, 12, 13, 14, 15, 16, and 17.

In this embodiment of this application, when allocating RB resources in the second-type BWP to the terminal device, the network device may allocate a start RB and a length of RBs with consecutive indexes (namely, a quantity of RBs with consecutive indexes) to the terminal device. For example, the second-type BWP shown in FIG. 13 is used as an example. The network device may allocate resources with a start RB whose identifier is 3 and with an RB length 4 to the terminal device. In other words, the resources allocated by the network device to the terminal device are RB resources whose indexes are 3, 4, 5, and 6.

In this embodiment of this application, the network device may use the resource indication information to carry an identifier of the start RB and the length of the RBs with consecutive indexes that are allocated to the terminal device. For example, the network device may use a manner of jointly indicating the start RB and the length of the RBs, or may use a manner of separately indicating the start RB and the length of the RB. After receiving the resource indication information, the terminal device transmits a signal on the RBs indicated by the resource indication information.

Optionally, during resource indication, the network device may indicate, by using a resource indication value (RIV), the start RB and the length of RBs with consecutive indexes of the resources allocated to the terminal device. For example, the start RB and the length of the RBs may be determined based on the RIV according to the following formula:

If $(L_{RBs}-1) \leq \lfloor N_{BWP}^{size}/2 \rfloor$, $RIV = N_{BWP}^{size}(L_{RBs}-1) + RB_{start}$ Otherwise, $RIV = N_{BWP}^{size}(N_{BWP}^{size} - L_{RBs} + 1) + (N_{BWP}^{size} - 1 - RB_{start})$.

Herein $RB_{start}$ is the start RB of the resources allocated to the terminal device in the second-type BWP, $L_{RBs}$ is the length of the RBs of the resources allocated to the terminal device in the second-type BWP, and $L_{RBs} \geq 1$ and does not exceed $N_{BWP}^{size} - RB_{start}$. $N_{BWP}^{size}$ is a bandwidth of the second-type BWP. The bandwidth of the second-type BWP may be a quantity of RBs included in the second-type BWP. To be specific, $L_{RBs}$ with consecutive indexes starting from $RB_{start}$ of the second-type BWP are allocated to the terminal device.

After receiving the RIV, the terminal device may determine, based on a correspondence between the RIV and the start RB and the length of the RBs with consecutive indexes, the start RB and the length of the RBs with consecutive indexes, or may determine the resources allocated by the network device to the terminal device. The terminal device may transmit a signal to the network device on frequency domain resources starting from the start RB with a length that is the length of the RBs with consecutive indexes.

In another optional implementation, if the resource indication information is used to indicate RBGs allocated to the terminal device in the second-type BWP, the network device may allocate resources to the terminal device in a preset RBG allocation manner, and use the resource indication information to carry an allocation result.

In this embodiment of this application, when the network device indicates the allocated RBGs to the terminal device by using the resource indication information, the resource indication information may include a bitmap. One bit in the bitmap corresponds to one RBG or one RBG index. When a value of the bit is t1, the resources allocated by the network device to the terminal device include the RBG corresponding to the bit. When the value of the bit is not t1 or is t2, the resources allocated by the network device to the terminal device do not include the RBG corresponding to the bit, where t1 and t2 are integers. For example, t1 is 1. For example, the first bit in the bitmap corresponds to an RBG with an index 1, the second bit corresponds to an RBG with an index is 2, and so on. Further, the resources allocated to the terminal may be determined based on a bit value of a bit. For example, if an RBG corresponds to a bit with a bit value 1 in the bitmap, it indicates that the network device allocates the RBG resource corresponding to the bit to the terminal device. If an RBG corresponds to a bit with a bit value 0 in the bitmap, it indicates that the network device does not allocate the RBG resource corresponding to the bit to the terminal device. After receiving the bitmap, the terminal device determines, based on bits with bit values 1 in the bitmap, the RBGs allocated to the terminal device.

In this embodiment of this application, RBGs included in the second-type BWP may be jointly numbered, to obtain RBG indexes in the second-type BWP. Optionally, each RBG in the second-type BWP has a unique index. In other words, one RBG index corresponds to one RBG, For example, the RBG indexes may start to increase from a lowest frequency location of the second-type BWP.

Further, the terminal device may determine, based on the RBGs allocated by the network device to the terminal device and an RBG size, the resources allocated by the network device to the terminal device, and transmit a signal to the network device on the resources allocated to the terminal device.

Therefore, in this optional manner, during signal transmission or resource allocation, the network device and the terminal device need to determine RBGs in the second-type BWP, for example, determine RBG indexes, a quantity of RBGs, or an RBG size.

A process of determining the RBGs in the second-type BWP is described in detail in the following embodiments of this application.

In this embodiment of this application, the RBGs included in the second-type BWP may be jointly numbered, to determine the RBG indexes in the second-type BWP. The following describes a method for jointly numbering the RBGs by using an example.

Figure 14:
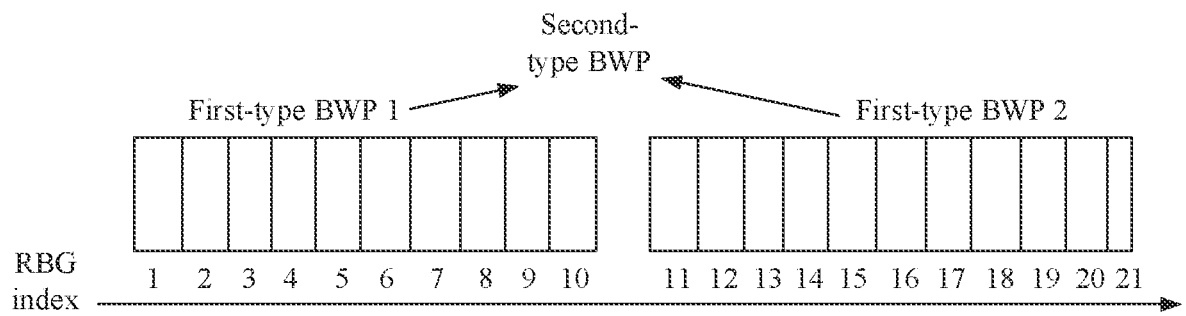
FIG. 14 is an example diagram of jointly numbering RBGs in a second-type BWP.

FIG. 14 is an example diagram of jointly numbering the RBGs in the second-type BWP. As shown in FIG. 14, the second-type BWP includes a first-type BWP 1 and a first-type BWP 2. The first-type BWP 1 includes 10 RBGs, and the first-type BWP 2 includes 11 RBGs. After the RBGs in the first-type BWP 1 and the first-type BWP 2 are jointly numbered, RBG indexes in the first-type BWP 1 are sequentially 1, 2, 3, 4, 5, 6, 7, 8, 9, and 10, and RBG indexes in the first-type BWP 2 are sequentially 11, 12, 13, 14, 15, 16, 17, 18, 19, 20 and 21. Alternatively, the RBG indexes may be numbered from 0. This is not limited in this application. For example, RBG indexes in the first-type BWP 1 are sequentially 0, 1, 2, 3, 4, 5, 6, 7, 8, and 9, and RBG indexes in the first-type BWP 2 are sequentially 10, 11, 12, 13, 14, 15, 16, 17, 18, 19 and 20.

After the joint numbering, each RBG in the second-type BWP has a unique index different from that of another RBG.

The following specifically describes how to determine the quantity of RBGs included in the second-type BWP and a size of each RBG.

In this embodiment of this application, the quantity of RBGs included in the second-type BWP may be determined based on a quantity of RBGs included in each first-type BWP in the second-type BWP. Specifically, the quantity of RBGs included in the second-type BWP is equal to a sum of quantities of RBGs included in all first-type BWPs in the second-type BWP. The quantity of RBGs included in each first-type BWP may be determined based on a start location of the first-type BWP and a bandwidth of the first-type BWP.

It should be noted that the bandwidth of the first-type BWP in this embodiment of this application may be a quantity of RBs included in the first-type BWP. The bandwidth of the first-type BWP may also be referred to as a bandwidth size of the first-type BWP, a size of the first-type BWP, or another name. This is not limited in this application.

Optionally, the determining a size of an RBG in the second-type BWP includes: determining a size of an RBG in the first-type BWP in the second-type BWP. For example, when the size of each RBG in the second-type BWP is to be determined, a size of each RBG in each first-type BWP in the second-type BWP needs to be determined. The determining a size of an RBG in a first-type BWP in the second-type BWP includes: determining a size of a first RBG, a size of a second RBG, and a size of an RBG other than the first RBG and the second RBG in the first-type BWP.

Optionally, for the first-type BWP, the first RBG may be the $1^{st}$ RBG in the first-type BWP, and the second RBG may be the last RBG in the first-type BWP.

For ease of description, for the first-type BWP, the size of the RBG other than the first RBG and the second RBG is referred to as an RBG size of the first-type BWP in the following embodiment of this application, and the RBG size is marked as P.

Optionally, the RBG size P of the first-type BWP in the second-type BWP may be determined based on a sum of bandwidths of N first-type BWPs included in the second-type BWP, or may be determined based on the bandwidth of the second-type BWP, where N is an integer greater than or equal to 1.

Optionally, the size of the first RBG may be determined based on the start location of the first-type BWP including the first RBG and P.

Optionally, the size of the second RBG is determined based on the start location of the first-type BWP including the second RBG, the bandwidth of the first-type BWP, and P.

The following separately describes, based on the foregoing two optional determining manners of P, processes of determining the quantity of RBGs in the second-type BWP and the RBG size.

It should be noted that the following embodiment for determining the quantity of RBGs in the second-type BWP and the size of each RBG may be an independent embodiment, or may be combined with another embodiment in this application. Specifically, this is not limited in this application.

1. For a first-type BWP in the second-type BWP, an RBG size P of the first-type BWP is determined based on the sum of the bandwidths of the N first-type BWPs included in the second-type BWP.

In this manner, for the first-type BWP in the second-type BWP, the RBG size of the first-type BWP is determined based on the sum of the bandwidths of the N first-type BWPs included in the second-type BWP, namely, the bandwidth of the second-type BWP.

For example, a correspondence between P and the sum of the bandwidths of the N first-type BWPs may be shown in Table 1.

1. TABLE 1

| Bandwidth of the second-type BWP (a quantity of RBs) | P (configuration 1) | P (configuration 2) |
|---|---|---|
| 1-36 | 2 | 4 |
| 37-72 | 4 | 8 |
| 73-144 | 8 | 16 |
| 145-275 | 16 | 16 |

The configuration 1 and the configuration 2 are two configuration manners. The network device may indicate, to the terminal device, a specific configuration manner to be used. If the network device does not indicate a configuration manner to the terminal device in advance, a predefined manner may be used. For example, the predefined manner may be the configuration 1 or the configuration 2.

It should be noted that Table 1 is merely an example of the correspondence between the bandwidth of the second-type BWP and the RBG size, or another correspondence between the bandwidth of the second-type BWP and the RBG size may be selected as required. This is not limited in this embodiment of this application.

In an example, it is assumed that the configuration 1 is predefined for use, and the second-type BWP includes a first-type BWP 1 and a first-type BWP 2. A bandwidth of the first-type BWP 1 is 40 RBs, and a bandwidth of the first-type BWP 2 is 50 RBs. In this case, the bandwidth of the second-type BWP is a sum of the bandwidth of the first-type BWP 1 and the bandwidth of the first-type BWP 2, that is, 90 RBs. That is, the bandwidth of the second-type BWP falls within the range "73-144" in Table 1. Correspondingly, a value of P is a value in the configuration 1 corresponding to the range, that is, P=8.

In an optional manner, the sum of the bandwidths of the N first-type BWPs in the second-type BWP is equal to a sum of quantities of RBs included in all the first-type BWPs.

In another optional manner, optionally, for the sum of the bandwidths of the N first-type BWPs, if there is no overlapping RB in the N first-type BWPs, the sum of the bandwidths of the N first-type BWPs is equal to a sum of quantities of RBs included in all the first-type BWPs. However, if there are overlapping RBs in the N first-type BWPs, the sum of the bandwidths of the N first-type BWPs is equal to the sum of quantities of RBs included in the N first-type BWPs minus a quantity of overlapping RBs.

The overlapping RBs include an RB on which a first first-type BWP and a second first-type BWP in the N first-type BWPs overlap.

The first first-type BWP and the second first-type BWP are any two first-type BWPs that have overlapping RBs in the N first-type BWPs.

Figure 15:
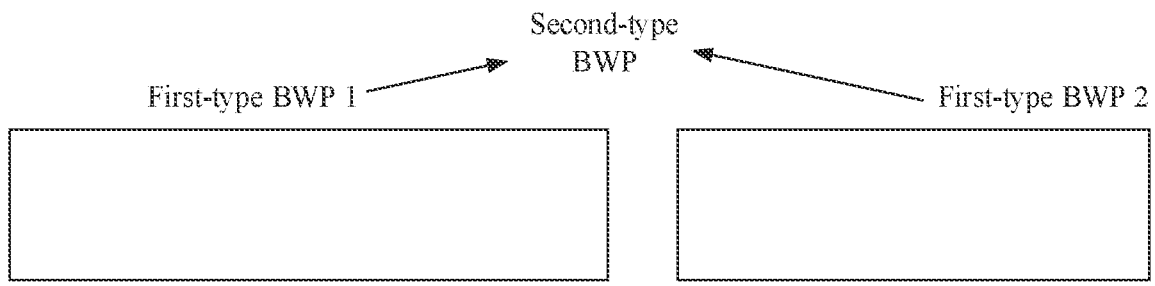
FIG. 15 is an example diagram in which there is no overlapping RB in N first-type BWPs in a second-type BWP.

FIG. 15 is an example diagram in which there is no overlapping RB in the N first-type BWPs in the second-type BWP. As shown in FIG. 15, the second-type BWP includes a first-type BWP 1 and a first-type BWP 2. In this case, there is no overlapping RB in the first-type BWP 1 and the first-type BWP 2. In this case, a sum of bandwidths of the two first-type BWPs is equal to a sum of a quantity of RBs included in the first-type BWP 1 and a quantity of RBs included in the first-type BWP 2.

For example, assuming that the first-type BWP 1 includes 40 RBs, and the first-type BWP 2 includes 50 RBs, the sum of the bandwidths of the two first-type BWPs is 40+50. That is, the sum of the bandwidths of the two first-type BWPs is 90.

Figure 16:
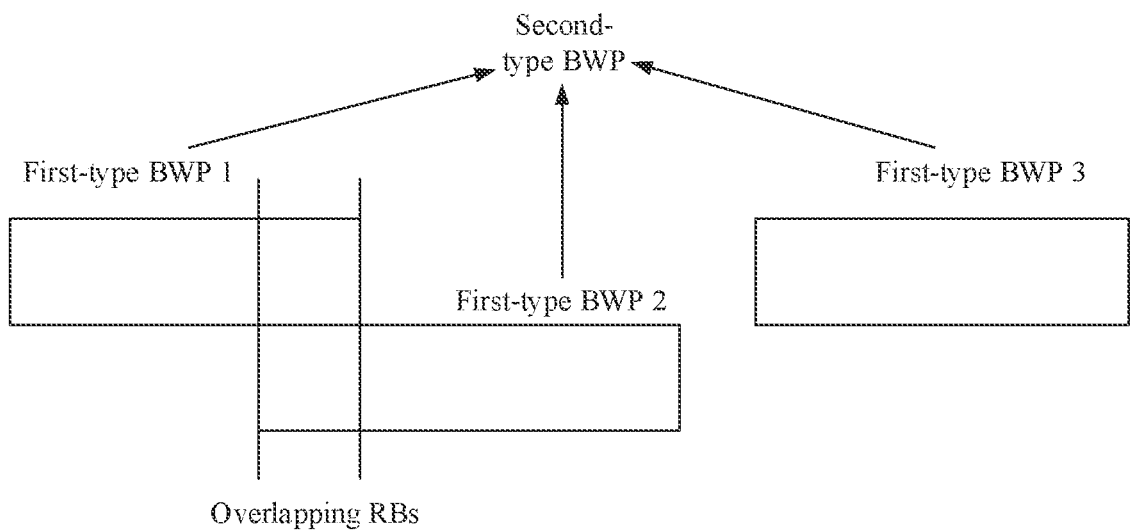
FIG. 16 is an example diagram in which there are overlapping RBs in N first-type BWPs in a second-type BWP.

FIG. 16 is an example diagram in which there are overlapping RBs in the N first-type BWPs in the second-type BWP. As shown in FIG. 16, the second-type BWP includes a first-type BWP 1, a first-type BWP 2, and a first-type BWP 3. In this case, there are overlapping RBs in the first-type BWP 1 and the first-type BWP 2. In this case, a sum of bandwidths of the three first-type BWPs may be equal to a sum of quantities of RBs included in the first-type BWP 1, the first-type BWP 2, and the first-type BWP 3 minus a quantity of overlapping RBs in the first-type BWP 1 and the first-type BWP 2.

For example, the first-type BWP 1 includes 40 RBs, the first-type BWP 2 includes 50 RBs, the first-type BWP 3 includes 30 RBs, and there are 25 overlapping RBs in the first-type BWP 2 and the first-type BWP 1. Therefore, the sum of the bandwidths of the three first-type BWPs is 40+50+30−25. That is, the sum of the bandwidths of the three first-type BWPs is 95.

Figure 17:
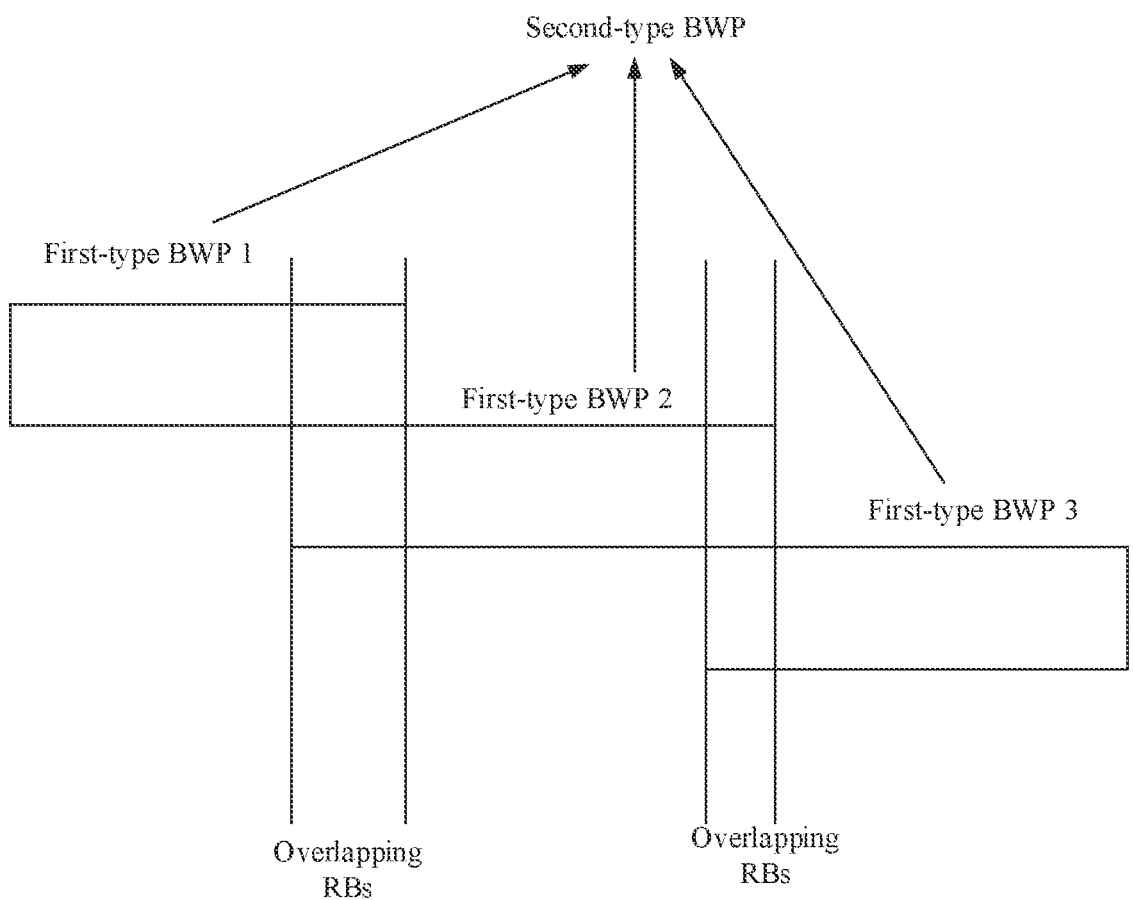
FIG. 17 is another example diagram in which there are overlapping RBs in N first-type BWPs in a second-type BWP.

FIG. 17 is another example diagram in which there are overlapping RBs in the N first-type BWPs in the second-type BWP. As shown in FIG. 17, the second-type BAT includes a first-type BWP 1, a first-type BWP 2, and a first-type BWP 3. There are overlapping RBs in the first-type BWP 1 and the first-type BWP 2, and there are overlapping RBs in the first-type BWP 3 and the first-type BWP 2. In this case, a sum of bandwidths of the three first-type BWPs is equal to a sum of quantities of RBs included in the first-type BWP 1, the first-type BWP 2, and the first-type BWP 3 minus a quantity of overlapping RBs in the first-type BWP 1 and the first-type BWP 2 and a quantity of overlapping RBs in the first-type BWP 2 and the first-type BWP 3.

For example, it is assumed that the first-type BWP 1 includes 40 RBs, the first-type BWP 2 includes 50 RBs, the first-type BWP 3 includes 30 RBs, and there are 25 overlapping RBs in the first-type BWP 2 and the first-type BWP 1, and 15 overlapping RBs in the first-type BWP 3 and the first-type BWP 2. The sum of the bandwidths of the three first-type BWPs is 40+50+30−25−15. That is, the sum of the bandwidths of the three first-type BWPs is 80.

After P is determined in the foregoing process, sizes of RBGs other than the first RBG and the second RBG in the first-type BWP in the second-type BWP are determined, and the sizes of these RBGs are all equal to P.

P is an integer greater than or equal to 1.

Based on this, the size of the first RBG and the size of the second RBG may be determined.

Optionally, the size of the first RBG is an integer less than or equal to P, and the size of the second RBG is an integer less than or equal to P.

The following describes a process of determining the size of the first RBG.

An embodiment for determining the size of the first RBG may be an independent embodiment, or may be combined with another embodiment in this application. Specifically, this is not limited in this application.

Optionally, the size of the first RBG ma be determined based on the start location of the first-type BWP including the first RBG and P.

The start location of the first-type BWP including the first RBG is an index of a start RB of the first-type BWP.

It should be noted that in the formulas shown in the following embodiment of this application, BWP(t1) is used to represent the first-type BWP.

Optionally, it is assumed that the first-type BWP including the first RBG is a first-type BWP i, where i is an integer greater than or equal to 0. A start location of the first-type BWP i is $N_{BWP(t1),i}^{start}$ or may be represented as $N_{BWP(t1),i}^{start,\mu}$, where μ is an identifier or index of a sub-carrier spacing of the first-type BWP i. A size of the first RBG in the first-type BWP may be determined according to the following formula (1):

$$RBG_0^{size} = P - N_{BWP(t1),i}^{start} \bmod P \qquad (1)$$

Optionally, a subscript 0 in the symbol $RBG_0^{size}$ of the size of the first RBG in the first-type BWP i is an RBG number of the first RBG in the first-type BWP i. Optionally, the RBG number of the first RBG in the first-type BWP i may be 0 or another number, or there may be no number. Specifically, this is not limited in this embodiment of this application.

For example, it is assumed that the second-type BWP includes the first-type BWP i and a first-type BWP j, where i and j are integers greater than or equal to 0. The size of the first RBG in the first-type BWP i may be determined according to the foregoing formula (1), and a size of a first RBG in the first-type BWP j may be determined according to the following formula (2), where $N_{BWP(t1),j}^{start}$ is a start location of the first-type BWP j:

$$RBG_{[(N_{BWP(t1),i}^{size}+N_{BWP(t1),j}^{start} \bmod P))/P]}^{size} = P - N_{BWP(t1),j}^{start} \bmod P \qquad (2)$$

Optionally, a subscript $[(N_{BWP(t1),i}^{size}+(N_{BWP(t1),j}^{start} \bmod P))/P]$ in the symbol $RBG_{[(N_{BWP(t1),i}^{size}+(N_{BWP(t1),j}^{start} \bmod P))/P]}^{size}$ of the size of the first RBG in the first-type BWP j is an RBG number of the first RBG in the first-type BWP j. Optionally, the RBG number of the first RBG in the first-type BWP j may be $[(N_{BWP(t1),i}^{size}+(N_{BWP(t1),j}^{start} \bmod P))/P]$ or another number, or there may be no number. Specifically, this is not limited in this embodiment of this application.

$N_{BWP(t1),i}^{size}$ is a bandwidth of the first-type BWP i, and $N_{BWP(t1),j}^{size}$ is a bandwidth of the first-type BWP j.

It is assumed that the second-type BWP in the foregoing example includes the first-type BWP i and the first-type BWP j, where i and j are integers greater than or equal to 0. The second-type BWP includes $N_{RBG}$ RBGs, and $N_{RBG}$ may be determined according to the following formula (3):

$$N_{RBG} = \lceil (N_{BWP(t1),i}^{size}+(N_{BWP(t1),i}^{start} \bmod P))/P \rceil + \lceil (N_{BWP(t1),j}^{size}+(N_{BWP(t1),j}^{start} \bmod P))/P \rceil \qquad (3)$$

The first-type BWP i includes $\lceil (N_{BWP(t1),i}^{size}+(N_{BMP(t1),i}^{start} \bmod P))/P \rceil$ RBGs, and the first-type BWP j includes $\lceil (N_{BWP(t1),j}^{size}+(N_{BWP(t1),j}^{start} \bmod P))/P \rceil$ RBGs.

$N_{BWP(t1),i}^{start}$ is the start location of the first-type BWP i, $N_{BWP(t1),j}^{start}$ is the start location of the first-type BWP j, $N_{BWP(t1),i}^{size}$ is the bandwidth of the first-type BWP i, and $N_{BWP(t1),j}^{size}$ is the bandwidth of the first-type BWP j.

Optionally, for the first-type BWP in the second-type BWP, the start location of the first-type BWP may be determined based on a reference point of the first-type BWP, or may be determined based on a reference point of the second-type BWP including the first-type BWP. Descriptions are separately provided below.

When the start location of the first-type BWP is determined based on the reference point of the first-type BWP, the N first-type BWPs included in the second-type BWP including the first-type BWP may each have a corresponding reference point, and the terminal device determines a start location of each first-type BWP based on the reference point.

For example, fir the first-type BWP in the second-type BWP, the terminal device determines the reference point of the first-type BWP based on a reference frequency location and a first offset relative to the reference frequency location. The reference frequency location may be indicated by the network device, or may be obtained by the terminal device by searching for a signal when the terminal device accesses a cell. The first offset may be indicated by the network device. Further, the terminal device determines a location of a start RB on a carrier based on the reference point of the first-type BWP and a second offset. Further, the terminal device determines the start location of the first-type BWP based on the location of the start RB on the carrier and a third offset. The third offset is used to indicate an offset of the start location of the first-type BWP relative to the location of the start RB on the carrier. For example, the terminal device may add the second offset and the third offset, and use an addition result as the start location of the first-type BWP.

When the start location of the first-type BWP is determined based on the reference point of the second-type BWP including the first-type BWP, the second-type BWP has one reference point. In other words, the N first-type BWPs included in the second-type BWP have one common reference point. The terminal device determines the start location of each first-type BWP based on the common reference point.

Optionally, the terminal device determines the reference point of the second-type BWP based on a reference frequency location and a first offset relative to the reference frequency location. Further, for each first-type BWP in the second-type BWP, the start location of each first-type BWP is determined based on the reference point. For a specific process, refer to the foregoing description. Details are not described again.

Optionally, the network device may also notify the terminal device of the reference point and the start location of each first-type BWP relative to the reference point.

Figure 18:
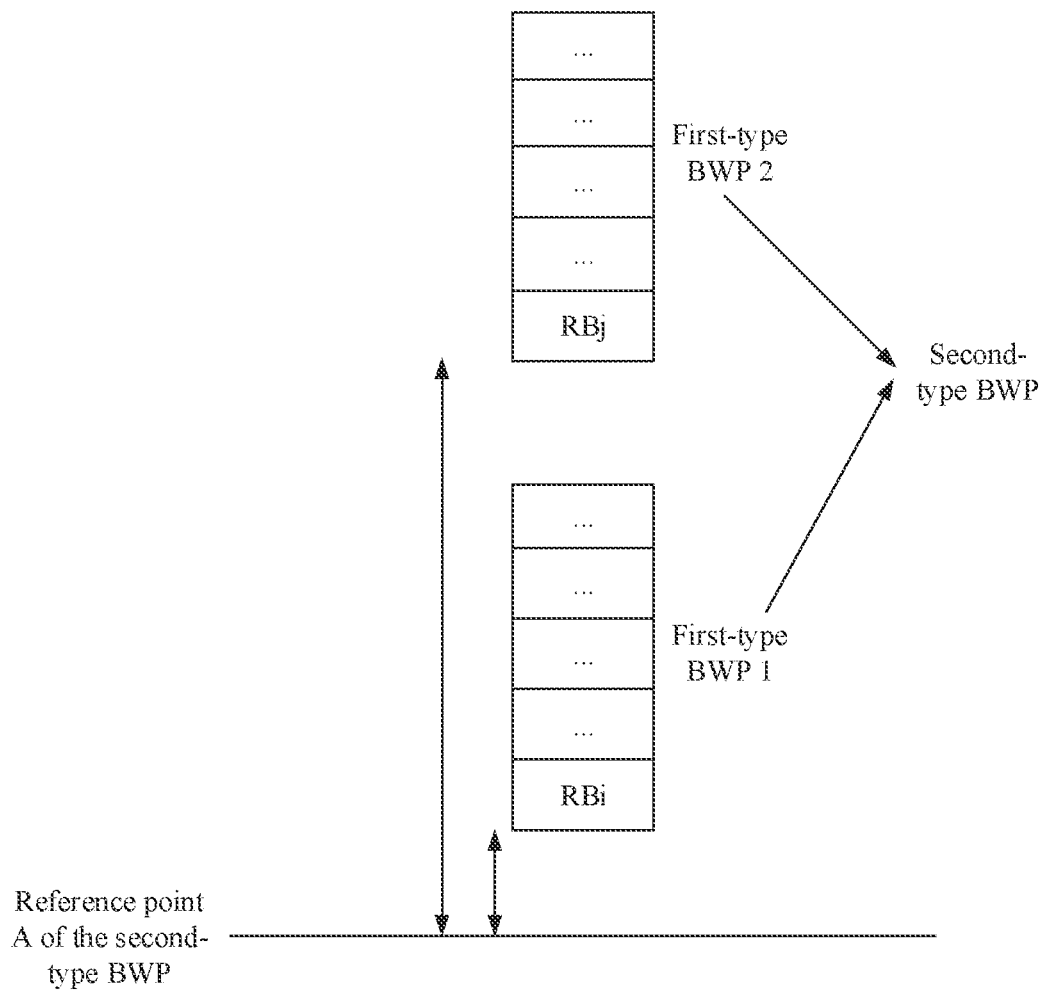
FIG. 18 is a schematic diagram of frequency domain resources when a second-type BWP has one reference point.

FIG. 18 is a schematic diagram of frequency domain resources when the second-type BWP has one reference point. As shown in FIG. 18, for example, the second-type BWP includes a first-type BWP 1 and a first-type BWP 2, and the second-type BWP has a reference point A. Respective start locations of the first-type BWP 1 and the first-type BWP 2 are determined based on the reference point A.

For example, as shown in FIG. 18, based on the shown reference point A, a start location of the first-type BWP 1 is an RB i, and a start location of the first-type BWP 2 is an RB j, where i and j are integers greater than or equal to 0.

Figure 19:
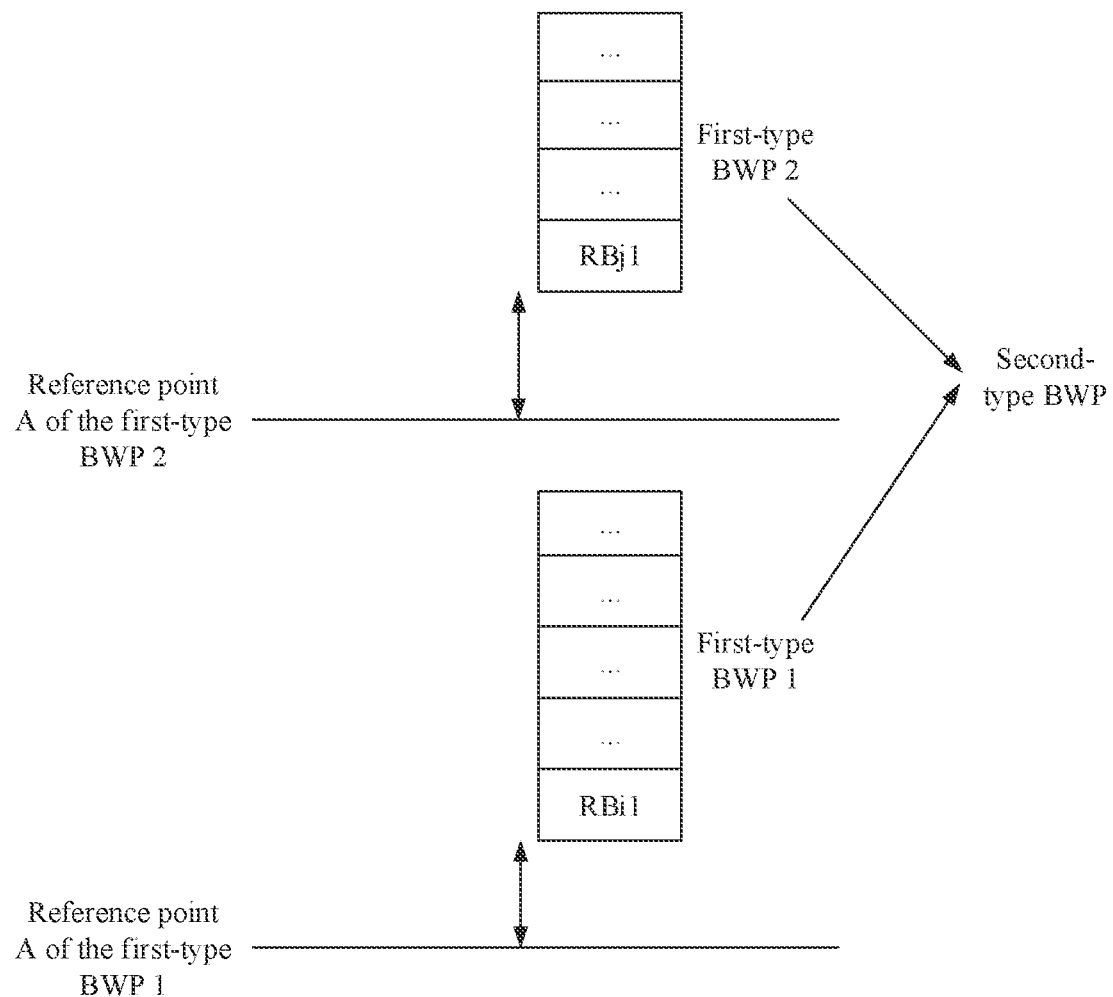
FIG. 19 is a schematic diagram of frequency domain resources when each first-type BWP in a second-type BWP has one reference point.

FIG. 19 is a schematic diagram of frequency domain resources when each first-type BWP in the second-type BWP has one reference point. As shown in FIG. 19, for example, the second-type BWP includes a first-type BWP 1 and a first-type BWP 2, the first-type BWP 1 has a reference point A, and the first-type BWP 2 has another reference point A. Respective start locations of the first-type BWP 1 and the first-type BWP 2 are determined based on the respective reference points.

For example, as shown in FIG. 19, based on the shown reference point A of the first-type BWP 1, a start location of the first-type BWP 1 is an RB i1. Based on the shown reference point A of the first-type BWP 2, a start location of the first-type BWP 2 is an RB j1, where i1 and j1 are integers greater than or equal to 0.

The following describes a process of determining the size of the second. RBG in the first-type BWP.

An embodiment for determining the size of the second RBG may be an independent embodiment, or may be combined with another embodiment in this application. Specifically, this is not limited in this application.

Optionally, the size of the second RBG is determined based on the start location of the first-type BWP including the second RBG, the bandwidth of the first-type BWP, and P.

A method for determining the start location of the first-type BWP and P is the same as the foregoing method for determining the size of the first RBG. That is, P may be determined based on the sum of the bandwidths of the N first-type BWPs in the second-type BWP including the first-type BWP. Alternatively, another method for determining P may be used. This is not limited in this application. Alternatively, another method for determining the start location may be used. This is not limited in this application.

Optionally, the start location of the first-type BWP may be determined based on the reference point of the first-type BWP, or may be determined based on the reference point of the second-type BWP. For a specific implementation, refer to the foregoing embodiment. Details are not described herein again.

Optionally, the bandwidth of the first-type BWP is the quantity of RBs included in the first-type BWP.

Optionally, it is assumed that the first-type BWP is a first-type BWP i, where i is an integer greater than or equal to 0. A start location of the first-type BWP i is $N_{BWP(t1),i}^{start}$, or may be represented as $N_{BWP(t1),i}^{start,\mu}$, where $\mu$ is an identifier or index corresponding to a subcarrier spacing of the BWP i. A correspondence between $\mu$ and the subcarrier spacing may be described in Table 2.

2. TABLE 2

| $\mu$ | Subcarrier spacing $\Delta f = 2^{\mu} \cdot 15$ [kHz] |
|---|---|
| 0 | 15 |
| 1 | 30 |
| 2 | 60 |
| 3 | 120 |
| 4 | 240 |

If a bandwidth of the first-type BWP i is $N_{BWP(t1),i}^{size}$, the size of the second RBG may be determined according to the following formula (4):

$$RBG_{[(N_{BWP(t1),i}^{size}+N_{BWP(t1),i}^{start} \bmod P))/P]-1}^{size} = (N_{BWP(t1)}^{start}+N_{BWP(t1),i}^{size}) \bmod P \qquad (4)$$

A subscript $[(N_{BWP(t1),i}^{size}+(N_{BWP(t1),i}^{start} \bmod P))/P]-1$ in the symbol $RBG_{[(N_{BWP(t1),i}^{size}+(N_{BWP(t1),i}^{start} \bmod P))/P]-1}^{size}$ of the size of the second RBG in the first-type BWP i is a number of the size of the second RBG in the first-type BWP i. Optionally, the number of the size of the second RBG in the first-type BWP i may be $[(N_{BWP(t1),i}^{size}+(N_{BWP(t1),i}^{start} \bmod P))/P]-1$ or another number, or there may be no number. Specifically, this is not limited in this embodiment of this application.

If a calculation result of the foregoing formula (4) is 0, the size of the second. RBG in the first-type BWP i is P.

For example, it is assumed that the second-type BWP includes the first-type BWP i and a first-type BWP j. The size of the second RBG in the first-type BWP i may be determined according to the foregoing formula (4), and a size of a second RBG in the first-type BWP j may be determined according to the following formula (5), where $N_{BWP(t1),j}^{start}$ is a start location of the first-type BWP j, and $N_{BWP(t1),j}^{size}$ is a bandwidth of the first-type BWP j:

$$RBG_{last}^{size}=(N_{BWP(t1),j}^{start}+N_{BWP(t1),j}^{size}) \bmod P \qquad (5)$$

A subscript last in the symbol $RBG_{last}^{size}$ of the size of the second RBG in the first-type BWP j is a number of the size of the second RBG in the first-type BWP j. For example, last represents the last RBG in the first-type BWP j. Optionally, the number of the size of the second RBG in the first-type BWP j may be a number of the last RBG or another number, or there may be no number. Specifically, this is not limited in this embodiment of this application.

If a calculation result of the foregoing formula (5) is 0, the site of the second RBG is P.

It may be learned from the foregoing process that for the first-type BWP i and the first-type BWP j (i and j are integers greater than or equal to 0) in the second-type BWP, a process of determining the size of the first RBG, the size of the second RBG, and the quantity of RBGs in the second-type BWP is as follows:

(1) The quantity of RBGs in the second-type BWP is determined according to the foregoing formula (3).
(2) The size of the first RBG in the first-type BWP i is determined according to the foregoing formula (1).
(3) The size of the second RBG in the first-type BWP i is determined according to the foregoing formula (4).
(4) The size of the first RBG in the first-type BWP j is determined according to the foregoing formula (2).
(5) The size of the second RBG in the first-type BWP j is determined according to the foregoing formula (5).
(6) A size of another RBG is P.

It should be noted that an execution sequence of (1) to (6) is not limited in this embodiment of this application.

The following further describes, by using two examples, a process of determining RBGs in the second-type BWP.

First Example

In this example, the start location of the first-type BWP in the second-type BWP is determined based on the reference point of the second-type BWP.

Figure 20:
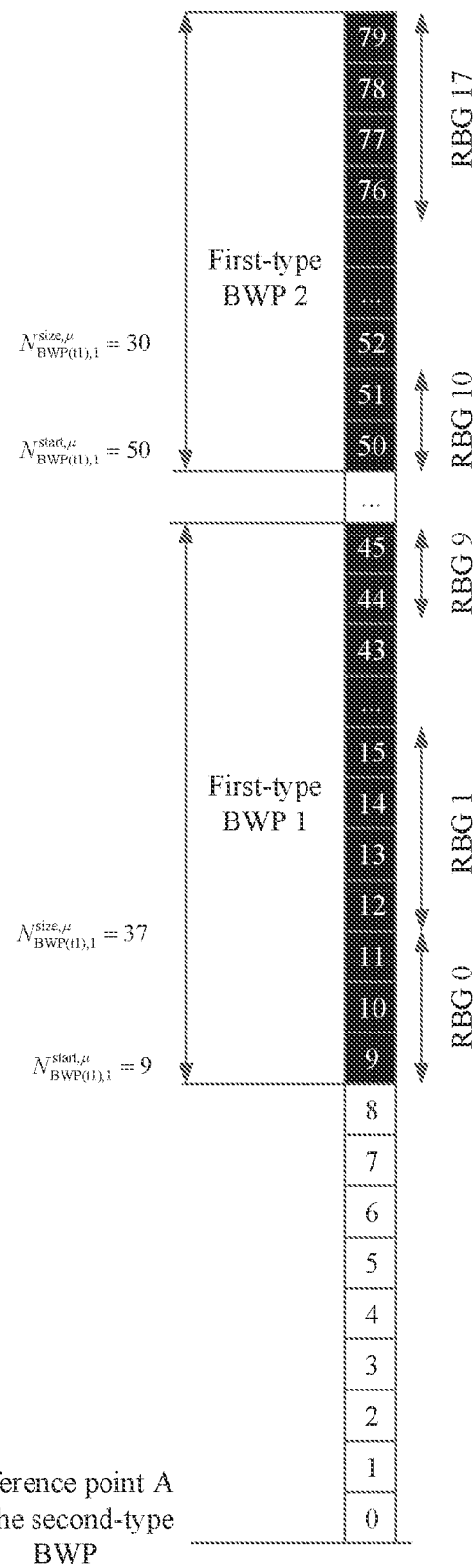
FIG. 20 is a schematic diagram 1 of frequency domain resource allocation in a second-type BWP in a first example.

FIG. 20 is a schematic diagram 1 of frequency domain resource allocation of the second-type BWP in the first example. As shown in FIG. 20, it is assumed that the second-type BWP includes a first-type BWP 1 and a first-type BWP 2. A start location of the first-type BWP 1 is an RB 9, a bandwidth of the first-type BWP 1 is 37 RBs, a start location of the first-type BWP 2 is an RB 50, and a bandwidth of the first-type BWP 2 is 30 RBs. According to the method for determining an RBG size in the foregoing embodiment, a bandwidth of the second-type BWP 1 is 67 RBs, and in the configuration 1 shown in Table 1, the RBG size is 4, that is, P=4. The RBGs included in the second-type BWP are as follows:

According to the foregoing formula (3), a quantity of RBGs is calculated as follows:

$$N_{RGB} = \lceil (N_{BWP(t1),i}^{size} + (N_{BWP(t1),i}^{start} \bmod P))/P \rceil + \lceil (N_{BWP(t1),j}^{size} + (N_{BWP(t1),j}^{start} \bmod P))/P \rceil = \lceil (37+(9 \bmod 4))/4 \rceil + \lceil (30+(50 \bmod 4))/4 \rceil = 10+8 = 18.$$

It may be learned from the calculation result that the first-type BWP 1 includes 10 RBGs, and the first-type BWP 2 includes eight RBGs.

For example, the RBGs in the second-type BWP are jointly numbered, and RBG numbers in the second-type BWP may be an RBG 0 to an RBG 17.

According to the foregoing formula (1), a size of a first RBG in the first-type BWP 1 is calculated as follows: $RBG_0^{size} = P - N_{BWP(t1),i}^{start} \bmod P = 3$.

According to the foregoing formula (4), a size of a second RBG in the first-type BWP 1 is calculated as follows:

$$RBG_{\lceil (N_{BWP(t1),i}^{size} + (N_{BWP(t1),i}^{start} \bmod P))/P \rceil - 1}^{size} = (N_{BWP(t1),i}^{start} + N_{BWP(t1),i}^{size}) \bmod P = RBG_9^{size} = 2.$$

According to the foregoing formula (2), a size of a first RBG in the first-type BWP 2 is calculated as follows:

$$RBG_{\lceil (N_{BWP(t1),i}^{size} + (N_{BWP(t1),i}^{start} \bmod P))/P \rceil}^{size} = P - N_{BWP(t1),j}^{start} \bmod P = RBG_{10}^{size} = 2.$$

According to the foregoing formula (5), a size of a second RBG in the first-type BWP 2 is calculated as follows: $RBG_{last}^{size} = (N_{BWP(t1),j}^{start} + N_{BWP(t1),j}^{size}) \bmod P = 0$. Therefore, according to the foregoing description of the formula (5), the size of the second RBG in the first-type BWP 2 is 4, that is, $RBG_{17}^{size} = 2$.

A size of another RBG is P=4.

Second Example

In this example, for the first-type BWP in the second-type BWP, the start location of the first-type BWP is determined based on the reference point of the first-type BWP.

Figure 21:
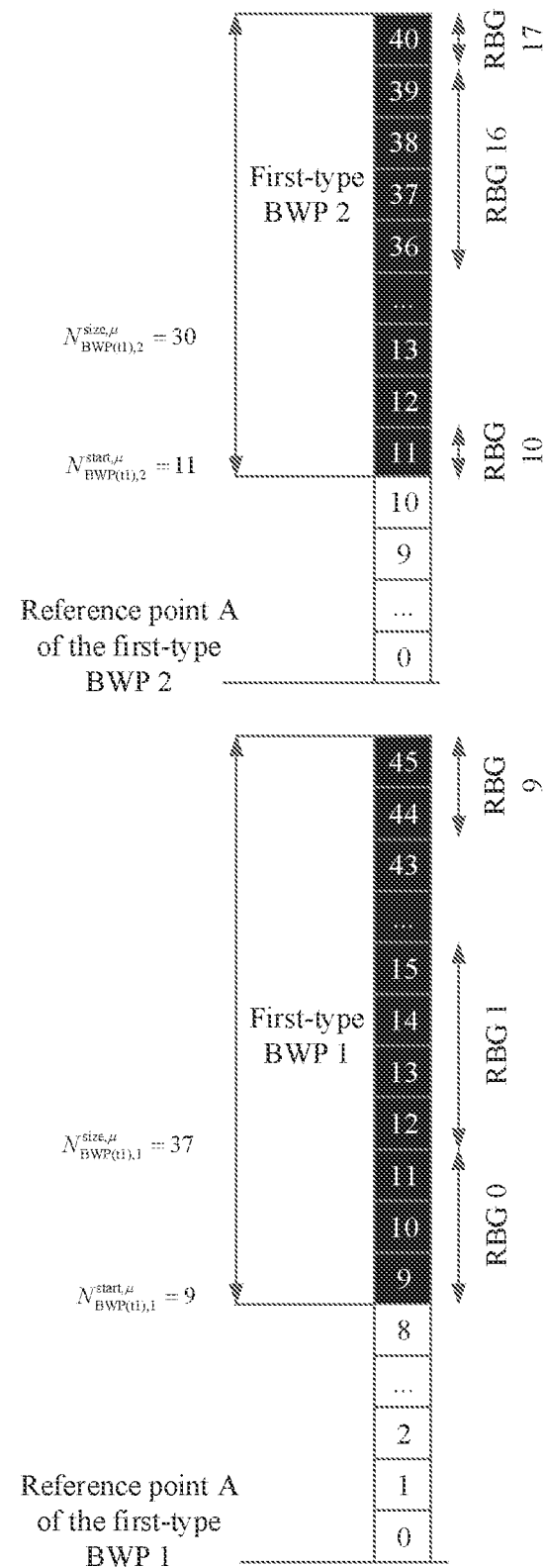
FIG. 21 is a schematic diagram 1 of frequency domain resource allocation in a second-type BWP in a second example.

FIG. 21 is a schematic diagram of frequency domain resource allocation of the second-type BWP in the second example. As shown in FIG. 21, it is assumed that the second-type BWP includes a first-type BWP 1 and a first-type BWP 2. A start location of the first-type BWP 1 is an RB 9 relative to a reference point A of the first-type BWP 1, and a bandwidth of the first-type BWP 1 is 37 RBs. A start location of the first-type BWP 2 is an RB 11 relative to a reference point A of the first-type BWP 2, and a bandwidth of the first-type BWP 2 is 30 RBs. According to the method for determining an RBG size in the foregoing embodiment, a bandwidth of the second-type BWP is 67 RBs, and in the configuration 1 shown in Table 1, the RBG size is 4, that is, P=4. The RBGs included in the second-type BWP are as follows:

According to the foregoing formula (3), a quantity of RBGs is calculated as follows:

$$N_{RGB} = \lceil (N_{BWP(t1),i}^{size} + (N_{BWP(t1),i}^{start} \bmod P))/P \rceil + \lceil (N_{BWP(t1),j}^{size} + (N_{BWP(t1),j}^{start} \bmod P))/P \rceil = \lceil (37+(9 \bmod 4))/4 \rceil + \lceil (30+(50 \bmod 4))/4 \rceil = 10+8=18.$$

It may be learned from the calculation result that the first-type BWP 1 includes 10 RBGs, and the first-type BWP 2 includes eight RBGs.

For example, the RBGs in the second-type BWP are jointly numbered, and RBG numbers in the second-type BWP may be an RBG 0 to an RBG 17.

According to the foregoing formula (1), a size of a first RBG in the first-type BWP 1 is calculated as follows: $RBG_0^{size} = P - N_{BWP(t1),i}^{start} \bmod P = 3$.

According to the foregoing formula (4), a size of a second RBG in the first-type BWP 1 is calculated as follows:

$$RBG_{\lceil (N_{BWP(t1),i}^{size} + (N_{BWP(t1),i}^{start} \bmod P))/P \rceil - 1}^{size} = (N_{BWP(t1),i}^{start} + N_{BWP(t1),i}^{size}) \bmod P = RBG_9^{size} = 2.$$

According to the foregoing formula (2), a size of a first RBG in the first-type BWP 2 is calculated as follows:

$$RBG_{\lceil (N_{BWP(t1),i}^{size} + (N_{BWP(t1),i}^{start} \bmod P))/P \rceil}^{size} = P - N_{BWP(t1),j}^{start} \bmod P = RBG_{10}^{size} = 1.$$

According to the foregoing formula (5), a size of a second RBG in the first-type BWP 2 is calculated as follows: $RBG_{last}^{size} = (N_{BWP(t1),j}^{start} + N_{BWP(t1),j}^{size}) \bmod P = 1$, that is $RBG_{17}^{size} = 1$.

A size of another RBG is P=4.

2. An RBG size P of each first-type BWP is determined based on a bandwidth of each first-type BWP in the second-type BWP.

Optionally, for a first-type BWP in the second-type BWP, an RBG size P of the first-type BWP may be determined based on a bandwidth of the first-type BWP.

For example, a correspondence between the bandwidth of the first-type BWP and P may be shown in Table 3.

3. TABLE 3

| Bandwidth of a frequency domain resource (a quantity of RBs) | P (configuration 1) | P (configuration 2) |
|---|---|---|
| 1-36 | 2 | 4 |
| 37-72 | 4 | 8 |
| 73-144 | 8 | 16 |
| 145-275 | 16 | 16 |

The configuration 1 and the configuration 2 are two configuration manners. The network device may indicate, to the terminal device, a specific configuration manner to be used. If the network device does not indicate a configuration manner to the terminal device in advance, a predefined manner may be used. For example, the predefined manner may be the configuration 1 or the configuration 2. It should be noted that Table 3 is merely an example of the correspondence between the bandwidth of the first-type BWP and the RBG size, or another correspondence between the bandwidth of the first-type BWP and the RBG size may be selected as required. This is not limited in this application.

In an example, it is assumed that the configuration 1 is predefined for use, and the second-type BWP includes a first-type BWP 1 and a first-type BWP 2. A bandwidth of the first-type BWP 1 is 40 RBs, and a bandwidth of the first-type BWP 2 is 30 RBs. In this case, the bandwidth of the first-type BWP 1 falls within the range "37-72" in Table 3, and a value of an RBG size corresponding to the first-type BWP 1 is a value corresponding to the range in the configuration 1. That is, the RBG size corresponding to the first-type BWP 1 is equal to 4. The bandwidth of the first-type BWP 2 falls within the range "1-36" in Table 3, and a value of an RBG size corresponding to the first-type BWP 2 is a value corresponding to the range in the configuration 1. That is, the RBG size corresponding to the first-type BWP 2 is equal to 2.

For the first-type BWP in the second-type BWP, after P is determined in the foregoing process, sizes of RBGs other than a first RBG and a second RBG in the first-type BWP in the second-type BWP are determined, and the sizes of these RBGs are all equal to P.

P is an integer greater than or equal to 1.

Based on this, a size of the first RBG and a size of the second RBG may be determined.

Optionally, the size of the first RBG is an integer less than or equal to P, and the size of the second RBG is an integer less than or equal to P.

The following describes a process of determining the size of the first RBG.

An embodiment for determining the size of the first RBG may be an independent embodiment, or may be combined with another embodiment in this application. Specifically, this is not limited in this application.

Optionally, the size of the first RBG may be determined based on a start location of the first-type BWP including the RBG and the RBG size corresponding to the first-type BWP.

The start location of the first-type BWP is an index of a start RB of the first-type BWP.

For a method for determining the start location of the first-type BWP, refer to the method described in the section "For a first-type BWP in the second-type BWP, an RBG size P of the first-type BWP is determined based on the sum of the bandwidths of the N first-type BWPs included in the second-type BWP". The RBG size may be determined based on the bandwidth of the first-type BWP. Alternatively, another method for determining an RBG size may be used. This is not limited in this application. Alternatively, another method for determining a start location may be used. This is not limited in this application.

Optionally, the start location of the first-type BWP may be determined based on a reference point of the first-type BWP, or may be determined based on a reference point of the second-type BWP including the first-type BWP. For an example of the reference point of the first-type BWP and the reference point of the second-type BWP, and a process of determining the start location of the first-type BWP in the two manners, refer to the description in the embodiment of determining the RBG size of the first-type BWP based on the sum of the bandwidths of the N first-type BWPs included in the second-type BWP. Details are not described herein again.

Optionally, it is assumed that the first-type BWP including the first RBG is a first-type BWP i, where i is an integer greater than 0. A start location of the first-type BWP i is $N_{BWP(t1),i}^{start}$, or may be represented as $N_{BWP(t1),i}^{start,\mu}$, where $\mu$ is a subcarrier spacing of the first-type BWP i. An RBG size corresponding to the first-type BWP i is $P_i$, and a size of the first RBG in the first-type BWP may be determined according to the following formula (6):

$$RBG_0^{size} = P_i - N_{BWP(t1),i}^{start} \bmod P_i \qquad (6)$$

Optionally, a subscript 0 in the symbol $RBG_0^{size}$ of the size of the first RBG in the first-type. BWP i is an RBG number of the first RBG in the first-type BWP i. Optionally, the RBG number of the first RBG in the first-type BWP i may be 0 or another number, or there may be no number. Specifically, this is not limited in this embodiment of this application.

For example, it is assumed that the second-type BWP includes the first-type BWP i and a first-type BWP j, where i and j are integers greater than or equal to 0. The size of the first RBG in the first-type BWP i may be determined according to the foregoing formula (6), and a size of a first RBG in the first-type BWP j may be determined according to the following formula (7), where $N_{BWP(t1),j}^{start}$ is a start location of the first-type BWP j, and $P_j$ is an RBG size corresponding to the first-type BWP j:

$$RBG_{[(N_{BWP(t1),j}^{size}+(N_{BWP(t1),j}^{start} \bmod P_j))/P_j]}^{size} = P_j - N_{BWP(t1),j}^{start} \bmod P_j \qquad (7)$$

Optionally, a subscript in the symbol $RBG_{[(N_{BWP(t1),j}^{size}+(N_{BWP(t1),j}^{start} \bmod P_j))/P_j]}^{size}$ of the size of the first RBG in the first-type BWP j is an RBG number of the first RBG in the first-type BWP j. Optionally, the RBG number of the first RBG in the first-type BWP j may be $[(N_{BWP(t1),i}^{size}+(N_{BWP(t1),i}^{start} \bmod P_i))/P_i]$ or another number, or there may be no number. Specifically, this is not limited in this embodiment of this application.

$N_{BWP(t1),i}^{size}$ is a bandwidth of the first-type BWP i, and $N_{BWP(t1),j}^{size}$ is a bandwidth of the first-type BWP j.

It is assumed that the second-type BWP in the foregoing example includes the first-type BWP 1 and the first-type BWP j, where i and j are integers greater than or equal to 0. The second-type BWP includes $N_{RBG}$ RBGs, and $N_{RBG}$ may be determined according to the following formula (8):

$$N_{RBG} = [(N_{BWP(t1),i}^{size}+(N_{BWP(t1),i}^{start} \bmod P_i))/P_i] + [(N_{BWP(t1),j}^{size}+(N_{BWP(t1),j}^{start} \bmod P_j))/P_j] \qquad (8)$$

The first-type BWP i includes $[(N_{BWP(t1),i}^{size}+(N_{BWP(t1),i}^{start} \bmod P_i))/P_i]$ RBGs, and the first-type BWP j includes $[(N_{BWP(t1),j}^{size}+(N_{BWP(t1),j}^{start} \bmod P_j))/P_j]$ RBGs.

$N_{BWP(t1),i}^{start}$ is the start location of the first-type BWP i, $N_{BWP(t1),j}^{start}$ is the start location of the first-type BWP j, $N_{BWP(t1),i}^{size}$ is the bandwidth of the first-type BWP i, and $N_{BWP(t1),j}^{size}$ is the bandwidth of the first-type BWP j.

The following describes a process of determining the size of the second RBG in the first-type BWP.

An embodiment for determining the size of the second RBG may be an independent embodiment, or may be combined with another embodiment in this application. Specifically, this is not limited in this application.

Optionally, the size of the second RBG may be determined based on the start location of the first-type BWP including the second RBG the bandwidth of the first-type BWP, and the RBG size corresponding to the first-type BWP.

A method for determining the start location of the first-type BWP and the RBG size corresponding to the first-type BWP is the same as the foregoing method for determining the size of the first RBG. In other words, the RBG size may be determined based on the bandwidth of the first-type BWP. Alternatively, another method for determining an RBG size may be used. This is not limited in this application. Alternatively, another method for determining a start location may be used. This is not limited in this application.

Optionally, the start location of the first-type BWP may be determined based on the reference point of the first-type BWP, or may be determined based on the reference point of the second-type BWP. For a specific implementation, refer to the foregoing embodiment. Details are not described herein again.

Optionally, the bandwidth of the first-type BWP is a quantity of RBs included in the first-type BWP.

Optionally, it is assumed that the first-type BAT is a first-type BWP i, where i is an integer greater than 0. A start location of the first-type BWP i is $N_{BWP(t1),i}^{start}$, or may be represented as $N_{BWP(t1),i}^{start,\mu}$, where $\mu$ is a subcarrier spacing of the first-type BWP i. A bandwidth of the first-type BWP i is $N_{BWP(t1),i}^{size}$, an RBG size corresponding to the first-type BWP i is $P_i$, and a size of the second RBG in the first-type BWP may be determined according to the following formula (9):

$$RBG_{[(N_{BWP(t1),i}^{size}+N_{BWP(t1),i}^{start} \mod P_i))/P_i]-1}^{size} = (N_{BWP(t1),i}^{start}+N_{BWP(t1),i}^{size}) \mod P_i \quad (9)$$

A subscript $\lceil(N_{BWP(t1),i}^{size}+(N_{BWP(t1),i}^{start} \mod P))/P\rceil-1$ the symbol $RBG_{[(N_{BWP(t1),i}^{size}+(N_{BWP(t1),i}^{start} \mod P_i))/P_i]-1}$ of the size of the second RBG in the first-type BWP i is a number of the size of the second RBG in the first-type BWP i. Optionally, the number of the size of the second RBG in the first-type BWP i may be $\lceil(N_{BWP(t1),i}^{size}+(N_{BWP(t1),i}^{start} \mod P_i))/P_i\rceil-1$ or another number, or there may be no number. Specifically, this is not limited in this embodiment of this application.

If a calculation result of the foregoing formula (9) is 0, the size of the second RBG the first-type BWP i is $P_i$.

For example, it is assumed that the second-type BWP includes the first-type BWP and a first-type BWP j, where i and j are integers greater than or equal to 0. The size of the second RBG in the first-type BWP i may be determined according to the foregoing formula (9), and a size of a second RBG in the first-type BWP j may be determined according to the following formula (10), where $N_{BWP(t1),j}^{start}$ is a start location of the first-type BWP j, $N_{BWP(t1),j}^{size}$ is a bandwidth of the first-type BWP j, and $P_j$ is an RBG size corresponding to the first-type BWP j:

$$RBG_{last}^{size} = (N_{BWP(t1),j}^{start}+N_{BWP(t1),j}^{size}) \mod P_j \quad (10)$$

A subscript last in the symbol $RBG_{last}^{size}$ last oft the size of the second RBG in the first-type BWP j is a number of the size of the second RBG in the first-type BWP j. For example, last represents the last RBG. Optionally, the number of the size of the second RBG in the first-type BWP j may be a number of the last RBG or another number, or there may be no number. Specifically, this is not limited in this embodiment of this application.

If a calculation result of the foregoing formula (10) is 0, the size of the second RBG in the first-type BWP j is $P_j$.

It may be learned from the foregoing process that for the first-type BWP i and the first-type BWP j (i and j are integers greater than or equal to 0) in the second-type BWP, a process of determining the size of the first RBG, the size of the second RBG, and the quantity of RBGs in the second-type BWP is as follows:

(1) The quantity of RBGs in the second-type BWP is determined according to the foregoing formula (8).
(2) The size of the first RBG in the first-type BWP i is determined according to the foregoing formula (6).
(3) The size of the second RBG in the first-type BWP i is determined according to the foregoing formula (9),
(4) The size of the first RBG in the first-type BWP j is determined according to the foregoing formula (7).
(5) The size of the second RBG in the first-type BWP j is determined according to the foregoing formula (10),
(6) A size of another RBG in the first-type BWP 1 is $P_i$, and a size of another RBG in the first-type BWP 2 is $P_j$.

It should be noted that an execution sequence of (1) to (6) is not limited in this embodiment of this application.

The following further describes, by using two examples, a process of determining RBGs in the second-type BWP.

First Example

In this example, the start location of the first-type BWP in the second-type BWP is determined based on the reference point of the second-type BWP.

Figure 22:
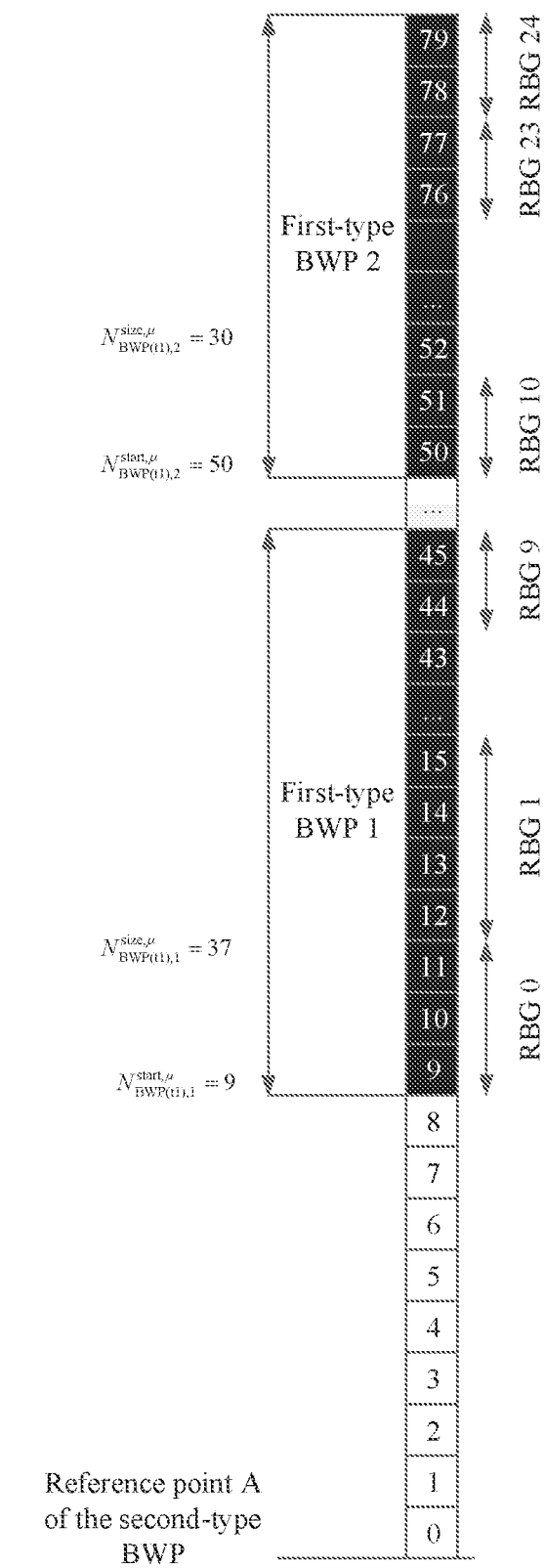
FIG. 22 is a schematic diagram 2 of frequency domain resource allocation in a second-type BWP in a first example.

FIG. 22 is a schematic diagram of frequency domain resource allocation of the second-type BWP in the first example. As shown in FIG. 22, it is assumed that the second-type BWP includes a first-type BWP 1 and a first-type BWP 2. A start location of the first-type BWP 1 is an RB 9, a bandwidth of the first-type BWP 1 is 37 PM, a start location of the first-type BWP 2 is an RB 50, and a bandwidth of the first-type BWP 2 is 30 RBs. According to the method for determining an RBG size in the foregoing embodiment, in the configuration 1 shown in Table 2, the RBG size of the first-type BWP 1 is 4, that is, $P_i$=4, and the RBG size of the first-type BWP 2 is 2, that is, $P_j$=2, where i=1, and j=2. The RBGs included in the second-type BWP are as follows:

According to the foregoing formula (8), a quantity of RBGs is calculated as follows:

$$N_{RBG} = \lceil(N_{BWP(t1),i}^{size}+(N_{BWP(t1),i}^{size} \mod P_i))/P_i\rceil + \lceil(N_{BWP(t1),j}^{size}=(N_{BWP(t1),j}^{size} \mod P_j))/P_j\rceil = \lceil(37+(9 \mod 4))/4\rceil+\lceil(30+(50 \mod 2))/2\rceil=10+15=25.$$

It may be learned from the calculation result that the first-type BWP 1 includes 10 RBGs, and the first-type BWP 2 includes 15 RBGs.

For example, the RBGs in the second-type BWP are jointly numbered, and RBG numbers in the second-type BWP may be an RBG 0 to an RBG 24.

According to the foregoing formula (6), a size of a first RBG in the first-type BWP 1 is calculated as follows: $RBG_0^{size}=P_i-N_{BWP(t1),j}^{start} \mod P_i=3$.

According to the foregoing formula (9), a size of a second RBG in the first-type BWP 1 is calculated as follows:

$$RGB_{[(N_{BWP(t1),i}^{size}+N_{BWP(t1),i}^{size} \mod P_j))/P_i]-1}^{size} = N_{BWP(t1),i}^{size}+(N_{BWP(t1),i}^{size} \mod P_i))/P = RGB_9^{size} = 2.$$

According to the foregoing formula (7), a size of a first RBG in the first-type BWP 2 is calculated as follows:

$$RGB_{[(N_{BWP(t1),j}^{size}(N_{BWP(t1),j}^{start} \mod P_j))/P_j]}^{size} = P_j - N_{BWP(t1),j}^{start} \mod P_j = RGB_{10}^{size} = 1.$$

According to the foregoing formula (10), a size of a second RBG in the first-type BWP 2 is calculated as follows: $RBG_{last}^{size} = (N_{BWP(t1),j}^{start} + N_{BWP(t1),j}^{size}) \mod P_j = 1$, that is $RBG_{24}^{size} = 1$.

A size of another RBG in the first-type BWP 1 is $P_i = 4$, and a size of another RBG in the first-type BWP 2 is $P_j = 2$.

Second Example

In this example, for the first-type BWP in the second-type BWP, the start location of the first-type BWP is determined based on the reference point of the first-type BWP.

Figure 23:
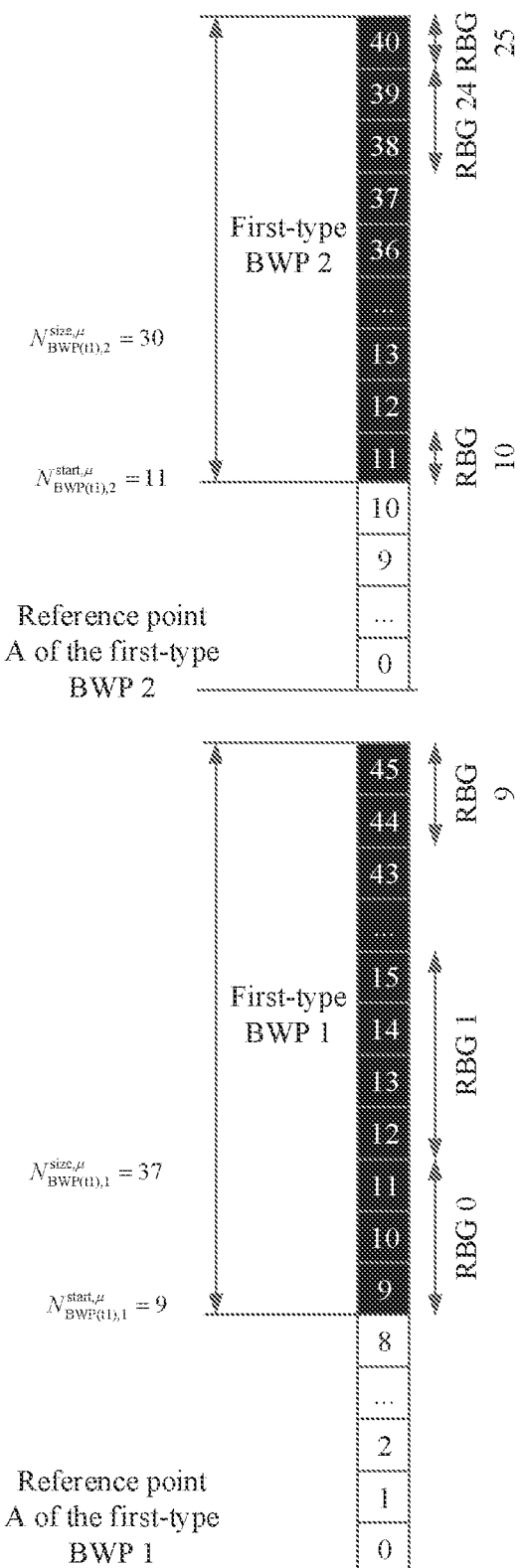
FIG. 23 is a schematic diagram 2 of frequency domain resource allocation in a second-type BWP in a second example.

FIG. 23 is a schematic diagram of frequency domain resource allocation of a second-type BWP in the second example. As shown in FIG. 23, it is assumed that the second-type BWP includes a first-type BWP 1 and a first-type BWP 2. A start location of the first-type BWP 1 is an RB 9 relative to a reference point A of the first-type BWP 1, and a bandwidth of the first-type BWP 1 is 37 RBs. A start location of the first-type BWP 2 is an RB 11 relative to a reference point A of the first-type BWP 2, and a bandwidth of the first-type BWP 2 is 30 RBs. According to the method for determining an RBG size in the foregoing embodiment, the bandwidth of the second-type BWP is 67 RBs, in the configuration 1 shown in Table 2, the RBG size of the first-type BWP 1 is 4, that is, $P_i = 4$, and the RBG size of the first-type BWP 2 is 2, that is, $P_j = 2$, where i=1, and j=2, The RBGs included in the second-type BWP are as follows:

According to the foregoing formula (8), the quantity of RBGs is calculated as follows:

$$N_{RGB} = \lceil (N_{BWP(t1),i}^{size} + (N_{BWP(t1),i}^{size} \mod P_i))/P_i \rceil + \lceil (N_{BWP(t1),j}^{size} + (N_{BWP(t1),j}^{size} \mod P_j))/P_j \rceil = \lceil (37+(9 \mod 4))/4 \rceil + \lceil (30+(11 \mod 2)/2 \rceil = 10 + 16 = 26.$$

It may be learned from the calculation result that the first-type BWP 1 includes 10 RBGs, and the first-type BWP 2 includes 16 RBGs.

For example, the RBGs in the second-type BWP are jointly numbered, and RBG numbers in the second-type BWP may be an RBG 0 to an RBG 25.

According to the foregoing formula (6), a size of a first RBG in the first-type BWP 1 is calculated as follows: $RGB_0^{size} = P_i - N_{BWP(t1),i}^{start} \mod P_i = 3$.

According to the foregoing formula, (9), a size of a second RBG in the first-type BWP 1 is calculated as follows: $RBG_{[(N_{BWP(t1),i}^{size}+(N_{BWP(t1),i}^{size} \mod P_j))/P_i]-1}^{size} = (N_{BWP(t1),i}^{start}+N_{BWP(t1),i}^{size}) \mod P_i = RBG_9^{size} = 2.$ According to the foregoing formula (7), a size of a first RBG in the first-type BWP 2 is calculated as follow: $RBG_{[(N_{BWP(t1),j}^{size}+(N_{BWP(t1),j}^{start} \mod P_j))/P_j]}^{size} = P_j - N_{BWP(t1),j}^{start} \mod P_j = RBG_{10}^{size} = 1.$ According to the foregoing formula (10), a size of a second RBG in the first-type BWP 2 is calculated as follows: $RBG_{last}^{size} = (N_{BWP(t1),j}^{start} + N_{BWP(t1),j}^{size}) \mod P_j = 1$, that is $RBG_{24}^{size} = 1$.

A size of another RBG in the first-type BWP 1 is $P_i = 4$, and a size of another RBG in the first-type BWP 2 is $P_j = 2$.

In a specific implementation process, the resource indication information may be indicated by using higher layer signaling, or may be indicated by using downlink control information (DCI). This is not limited in this application.

For the N first-type BWPs included in the second-type BWPs, there may be no overlapping resource in the first-type BWPs in the N first-type BWPs, or there may be overlapping resources in a plurality of first-type BWPs in the N first-type BWPs.

That there are overlapping resources in a plurality of first-type BWPs of the N first-type BWPs may mean that RBs included in two RBGs of the N first-type BWPs completely overlap, or all RBs included in an RBG in the N first-type BWPs are some RBs included in another RBG. That is, the another RBG includes the RBG.

Figure 24:
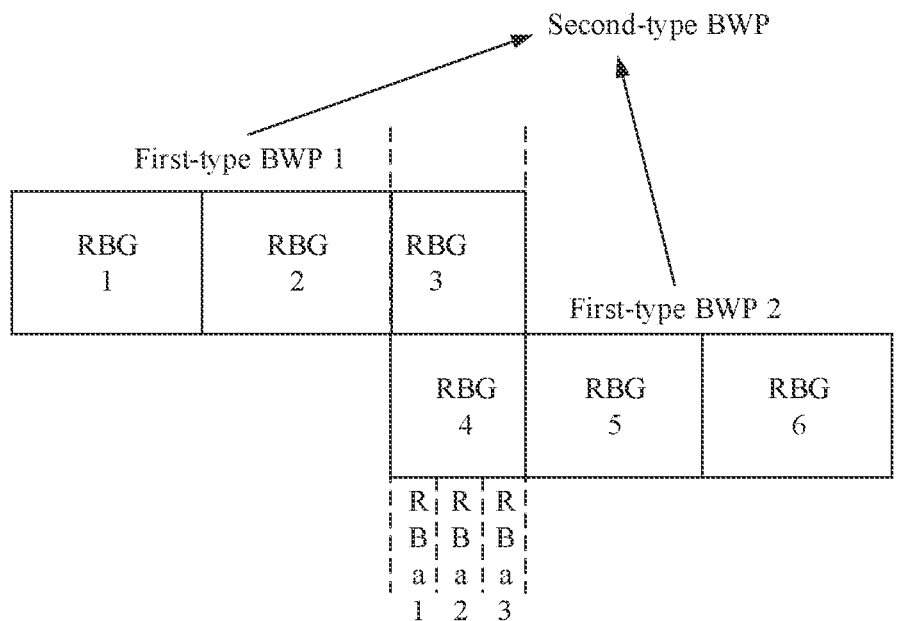
FIG. 24 shows an example in which two RBGs include the same RBs.

FIG. 24 is an example in which RBs included in two RBGs completely overlap. As shown in FIG. 24, a second-type BWP includes a first-type BWP 1 and a first-type BWP 2, the first-type BWP 1 includes three RBGs: an RBG 1, an RBG 2, and an RBG 3, and the first-type BWP 2 includes three RBGs: an RBG 4, an RBG 5, and an RBG 6. The RBG 3 and the RBG 4 each include an RB a1, an RB a2, and an RB a3. That is, RBs included in the RBG 3 and the RBG 4 completely overlap, and there are overlapping resources in the RBG 3 and the RBG 4. In this figure, a1, a2, and a3 are integers.

In this example, there are overlapping resources in the first-type BWP 1 and the first-type BWP 2 in the second-type BWP, and the overlapping resources are the RB a1, the RB a2, and the RB a3.

Figure 25:
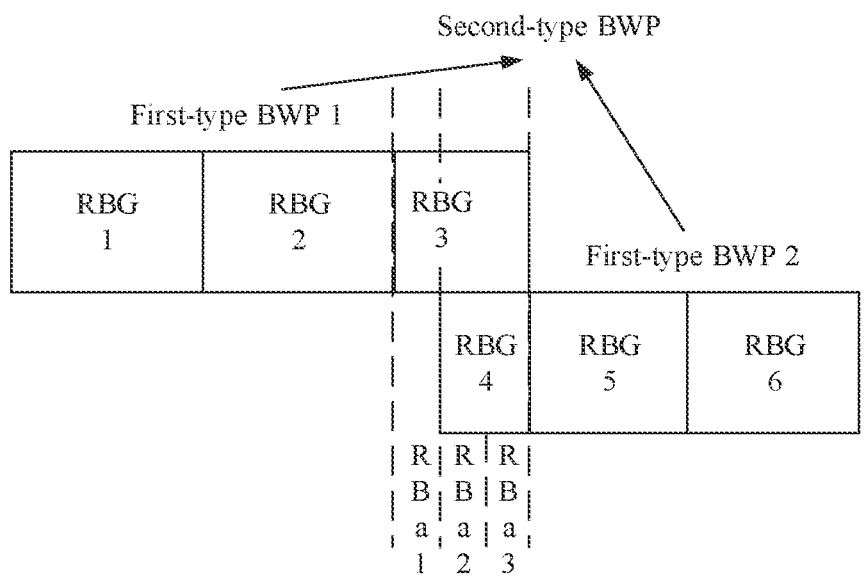
FIG. 25 shows an example in which resources in two of N first-type BWPs overlap.

FIG. 25 is an example in which there are overlapping resources in two of the N first-type BWPs. As shown in FIG. 25, a second-type BWP includes a first-type BWP 1 and a first-type BWP 2, the first-type BWP 1 includes three RBGs: an RBG 1, an RBG 2, and an RBG 3, and the first-type BWP 2 includes three RBGs: an RBG 4, an RBG 5, and an RBG 6. The RBG 3 includes an RB a1, an RB a2, and an RB a3, and the RBG 4 includes the RB a2 and the RB a3. That is, all RBs included in the RBG 4 are some RBs included in the RBG 3. It may also be considered that the RBG 3 includes the RBG 4. In this figure, a1, a2, a3, and a4 are integers.

In this example, there are overlapping resources in the first-type BWP 1 and the first-type BWP 2 in the second-type BWP, and the overlapping resources are the RB a2 and the RB a3.

Figure 26:
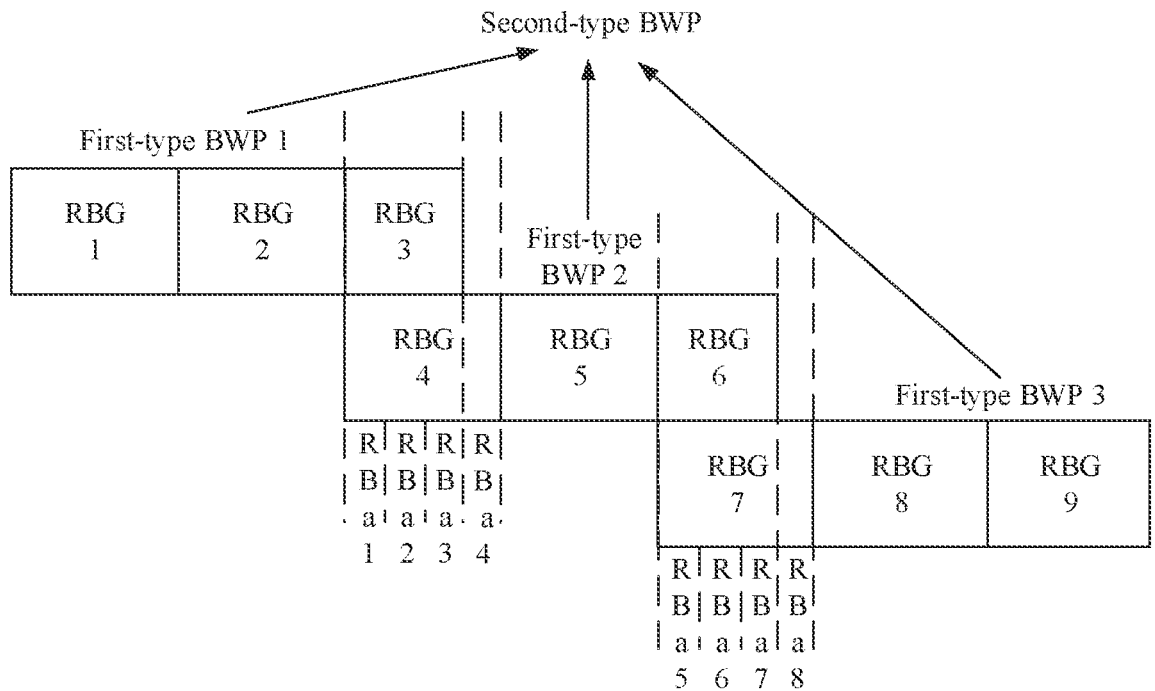
FIG. 26 shows an example in which resources in three of N first-type BWPs overlap.

FIG. 26 is an example in which there are overlapping resources in three of the N first-type BWPs. As shown in FIG. 26, a second-type BWP includes a first-type BWP 1, a first-type BWP 2, and a first-type BWP 3. The first-type BWP 1 includes three RBGs: an RBG 1, an RBG 2, and an RBG 3, the first-type BWP 2 includes three RBGs: an RBG 4, an RBG 5, and an RBG 6, and the first-type BWP 3 includes three RBGs: an RBG 7, an RBG 8, and an RBG 9. The RBG 3 includes an RB a1, an RB a2, and an RB a3, and the RBG 4 includes the RB a1, the RB a2, the RB a3, and an RB a4. That is, all RBs included in the RBG 3 are some RBs included in the RBG 4. It may also be considered that the RBG 4 includes the RBG 3. In addition, the RBG 6 includes an RB a5, an RB a6, and an RB a7, and the RBG 7 includes the RB a5, the RB a6, the RB a7, and an RB a8. That is, all RBs included in the RBG 6 are some RBs included in the RBG 7. It may also be considered that the RBG 7 includes the RBG 6. In this figure, a1, a2, a3, a4, a5, a6, a7, and a8 are integers.

In this example, there are overlapping resources in the first-type BWP 1, the first-type BWP 2, and the first-type BWP 3 in the second-type BWP, and the overlapping resources are the RB a1, the RB a2, the RB a3, the RB a5, the RB a6, and the RB a7.

Optionally, if there are overlapping resources in the plurality of first-type BWPs of the N first-type BWPs in the second-type BWP as described above, when the network device indicates the RBGs by using the resource indication information, the overlapping resources may be numbered only once, or may be numbered for a plurality of times based on RBG numbers corresponding to the overlapping resources.

In an optional manner, if the overlapping resources are numbered only once, one RBG index uniquely corresponds to one RBG.

Figure 27:
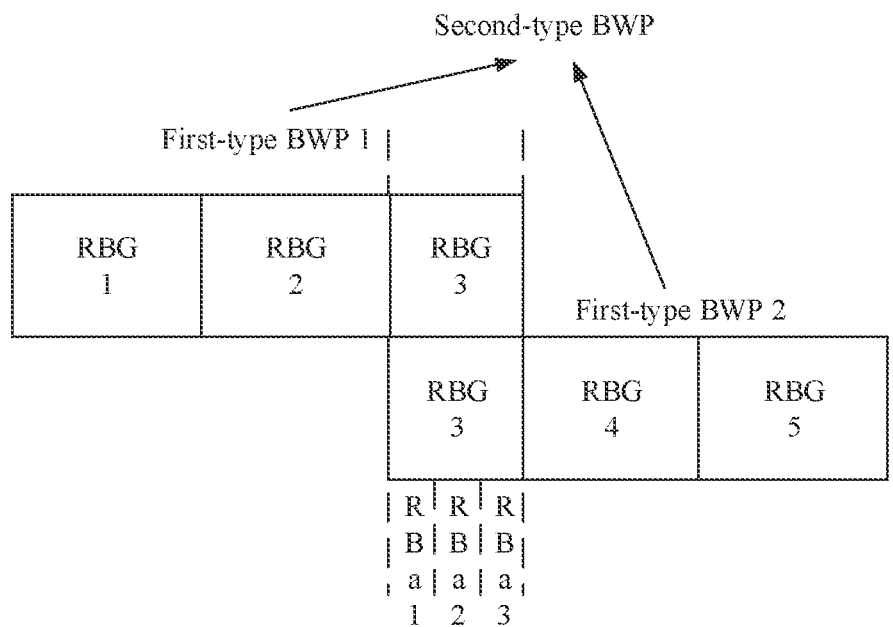
FIG. 27 is a diagram of an example in which overlapping resources are numbered once.

FIG. 27 is a diagram of an example in which overlapping resources are numbered once. As shown in FIG. 27, a second-type BWP includes a first-type BWP 1 and a first-type BWP 2, and the third RBG in the first-type BWP 1 and the first RBG in the first-type BWP 2 completely overlap. According to the method for numbering overlapping resources once, the overlapping RBG is numbered as an RBG index: RBG 3. Based on this, when the resource indication information indicates the RBG index, the RBG index uniquely corresponds to the RBG including an RB a1, an RB a2, and an RB a3, where a1, a2, and a3 are integers.

In another optional manner, if the overlapping resources are numbered for a plurality of times, a plurality of RBG indexes correspond to one RBG.

Referring to FIG. 24, FIG. 25, and FIG. 26, the overlapping resources shown in the three figures are numbered for a plurality of times in the RBGs including the overlapping resources. For example, the RBG 3 and the RBG 4 in FIG. 24 correspond to a same RBG, but the overlapping resources are numbered as the RBG 3 in the first-type BWP 1, and are numbered as the RBG 4 in the first-type BWP 2.

Optionally, in this manner, when a plurality of RBG indexes correspond to one RBG, the RBG is overlapping resources in a plurality of first-type BWPs of the N first-type BWPs. For example, RBGs corresponding to the RBG 3 and the RBG 4 in FIG. 24 are overlapping resources in the first-type BWP 1 and the first-type BWP 2.

Optionally, the overlapping resources may be an overlapping RBG or an overlapping RB.

Optionally, that when a plurality of RBG indexes correspond to one RBG, the RBG is overlapping resources in a plurality of first-type BWPs of the N first-type BWPs may mean that when the plurality of RBG indexes correspond to one RBG, resources in the RBG may include the overlapping resources in the plurality of first-type BWPs of the N first-type BWPs.

The following resource indication information design method may be used as an independent embodiment, or may be combined with another embodiment in this application, Specifically, this is not limited in this application.

In a specific implementation process, when the resource indication information is used to indicate the resources allocated to the terminal device in the second-type BWP, the resource indication information may include N information fields, and the N information fields one-to-one correspond to the N first-type BWPs in the second-type BWP. Each of the N information fields is used to determine resources allocated to the terminal device in each of the N first-type BWPs.

In an optional manner (a resource indication manner A), the N information fields may be carried in one resource indication field in an indication message, and the indication message may be included in higher layer signaling or a DCI message. For example, the N information fields may be carried in one bit field in one piece of DCI. Correspondingly, the N information fields may be N segments of bits in the bit field, Each of the N segments of bits includes at least one bit.

In another optional manner (a resource indication manner B), the N information fields may be carried in a plurality of resource indication fields in an indication message. For example, the N information fields may be carried in a plurality of bit fields in one piece of DCI, and each information field corresponds to one bit field in the DCI.

Optionally, during resource allocation, the network device generates the resource indication information and sends the resource indication information to the terminal device, where the resource indication information includes the N information fields. The terminal device determines, based on the N information fields in the resource indication information, frequency domain resources to be allocated to the terminal device, and transmits a signal on the allocated frequency domain resources.

Optionally, when the network device sends the resource indication information, an information field carried in the resource indication information needs to meet a specific requirement. In an example, a quantity of bits in the resource indication information needs to be equal to a quantity of bits preconfigured or predefined in a protocol. In another example, in a scenario in which the second-type BWP is dynamically switched, a quantity of bits in the resource indication information obtained after the second-type BWP is dynamically switched needs to be equal to a quantity of bits in the resource indication information existing before the second-type BWP is dynamically switched. In still another example, in a scenario in which the second-type BWP is activated, a quantity of bits in the resource indication information obtained after the second-type BWP is activated needs to be equal to a quantity of bits in the resource indication information existing before the second-type BWP is activated. Limiting a quantity of bits in an information field can reduce complexity of blindly detecting control information of the terminal device. The second-type BWP before switching may be referred to as a source second-type BWP, and the second-type BWP after switching may be referred to as a target second-type BWP.

In the foregoing case, the quantity of bits in the resource indication information may be different from a quantity of required bits. The quantity of required bits is a quantity of bits required to indicate the resources that are in the N first-type BWPs in the second-type BWP and that are allocated to the terminal device.

Therefore, in the foregoing case, both the network device and the terminal device need to perform corresponding processing, so that the resource indication information can meet a specific requirement, and the terminal device can correctly determine the frequency domain resources allocated to the terminal device.

The following embodiment of this application separately describes processing processes on a terminal device side and a network device side.

Optionally, the quantity of required bits in this embodiment of this application may be a quantity of bits required by the resource indication information, or may be a quantity of bits required by one of the N information fields in the resource indication information. The quantity of bits required by the resource indication information may also be referred to as a quantity of bits required by the second-type BWP. For one of the N information fields in the resource indication information, a quantity of bits required by the information field may also be referred to as a quantity of bits required by a first-type BWP corresponding to the information field. In this case, optionally, a total quantity of bits required by the N information fields may be understood as a quantity of bits required by the resource indication information including the N information fields.

When the quantity of required bits represents the quantity of bits required by the second-type BWP, if there are overlapping resources in the N first-type BWPs included in the second-type BWP, the quantity of required bits may be determined based on whether the overlapping resources are numbered once or for a plurality of times. For example, if the overlapping resource is numbered once, a quantity of bits corresponding to the overlapping resource in the quantity of required bits is 1; or if the overlapping resource is numbered for a plurality of times, the quantity of bits corresponding to the overlapping resource in the quantity of required bits is 2. Numbering the overlapping resource once may reduce the quantity of bits required to indicate the second-type BWP.

Optionally, the quantity of bits required by the second-type BWP may be determined based on a quantity of RBs or a quantity of RBGs included in the second-type BWP. For example, in a method in which resources are indicated in one RBG, when a bitmap is used to indicate an RBG, one bit corresponds to one RBG. Therefore, the quantity of required bits is a quantity of RBGs. Specifically, for example, if RBG numbers in the second-type BWP are an RBG 0 to an RBG n-1, the quantity of required bits may be n. The quantity of bits required by the second-type BWP may also be referred to as a quantity of bits required by the N first-type BWPs included in the second-type BWP.

Optionally, a quantity of bits required by a first-type BWP corresponding to an information field may be determined based on a quantity of RBs or a quantity of RBGs included in the first-type BWP corresponding to the information field. For example, in a method in which resources are indicated in one RBG, when a bitmap is used to indicate an RBG, one bit corresponds to one RBG. Therefore, the quantity of required bits is a quantity of RBGs. Specifically, for example, if RBG numbers in the first-type BWP are an RBG 0 to an RBG m-1, the quantity of required bits may be m. A first-type BWP corresponding to an information field may also be referred to as a quantity of bits required by an information field for short, or may be referred to as a quantity of bits required by a first-type BWP for short.

Optionally, a specified quantity of bits in this application may be a quantity of bits required when the quantity of bits is limited.

Optionally, a specified quantity of bits in the resource indication information in this application is a quantity of bits in the resource indication information that meets a specific requirement.

Optionally, when the specified quantity of bits in the resource indication information is M, and when the resource indication information includes N information fields, a specified quantity of bits in each information field may be equally divided, or may be determined based on a quantity of bits required by each information field.

For example, when the specified quantity of bits in each information field is equally divided, that is, the specified quantity of bits in the information field is M/N, or a rounded-up value or a rounded-down value of M/N.

For example, when the specified quantity of bits in each information field is determined based on the quantity of bits required by each information field, the specified quantity of bits in each information field may be specifically determined in the following manner.

In a first possible manner, a specified quantity of bits in an information field may be determined based on a ratio of a quantity of bits required by a first-type BWP corresponding to the information field to a quantity of bits required by a second-type BWP including the first-type BWP.

For example, if a quantity of bits required by a first-type BWP corresponding to an information field is r1, and a quantity of bits required by a second-type BWP including the first-type BWP is T, a ratio of the quantity of bits required by the information field to the quantity of bits required by the second-type BWP including the first-type BWP corresponding to the information field is r1/T. Because the resource indication information is used to indicate resources that are in the second-type BWP and that are allocated to the terminal device, an information field is used to indicate resources that are in the first-type BWP corresponding to the information field and that are allocated to the terminal device. In this case, calculation is performed according to a ratio of a quantity of required bits. That is, the specified quantity of bits in the information field is obtained by multiplying the specified quantity of bits in the resource indication information by r1/T, or may be a value obtained by rounding up or rounding down the quantity of specified bits in the resource indication information multiplied by r1/T.

For example, a quantity of bits required by a first-type BWP corresponding to an information field is 5, and a quantity of bits required by a second-type BWP including the first-type BWP is 20. The quantity of bits required by the first-type BAT corresponding to the information field is ¼ of the quantity of bits required by the second-type BWP. If a specified quantity of bits in the resource indication information is 20, a specified quantity of bits in the information field is the specified quantity of bits in the resource indication information multiplied by ¼, that is, the specified quantity of bits in the information field is 20×¼=5 bits.

In a second possible manner, a specified quantity of bits in an information field may be determined based on a ratio of a quantity of bits required by a first-type BWP corresponding to the information field to a quantity of bits required by a first-type BWP corresponding to another information field. The following uses two information fields as an example. A case of another information field is similar to that of the two information fields, and details are not described again.

For another example, if a quantity of bits required by a first-type BWP corresponding to an information field is r1, and a quantity of bits required by a first-type BWP corresponding to another information field is r2, a ratio of the quantity of bits required by the first-type BWP corresponding to the information field to the quantity of bits required by the first-type BWP corresponding to the another information field is r1/r2. In this case, a specified quantity of bits in the information field is obtained by multiplying a specified quantity of bits in the resource indication information by r1/(r1+r2), or may be a value obtained by rounding up or rounding down the specified quantity of bits in the resource indication information multiplied by r1/(r1+r2), In this case, a specified quantity of bits in the another information field is obtained by multiplying a specified quantity of bits in the resource indication information by r2/(r1+r2), or may be a value obtained by rounding up or rounding down the specified quantity of bits in the resource indication information multiplied by r2/(r1+r2).

For another example, a quantity of bits required by a first-type BWP corresponding to an information field is 5, and a quantity of bits required by a first-type BWP corresponding to another information field is 10. If a specified quantity of bits in the resource indication information is 18, a specified quantity of bits in the information field is the specified quantity of bits in the resource indication information multiplied by $5/(5+10)=1/3$, that is, the specified quantity of bits in the information field is $18 \times 1/3=6$. A specified quantity of bits in the another information field is the specified quantity of bits in the resource indication information multiplied by $10/(5+10)=2/3$, that is, the specified quantity of bits in the another information field is $18 \times 2/3=12$ bits.

When a specified quantity of bits is determined based on a ratio, different bandwidths of first-type BWPs in the N first-type BWPs may be considered, to avoid unbalance of quantities of actually valid bits required by the first-type BWPs, and avoid inflexible resource allocation.

In the following embodiment, a bit may be removed from a plurality of information fields in the resource indication information as required, to ensure balance of valid bits in the information fields, and avoid limited resource allocation.

In the following embodiment, a bit 0 may be added to a plurality of information fields in the resource indication information as required, to facilitate obtaining prior information and improve decoding performance.

The network device sends, to the terminal device, the resource indication information that meets the specified quantity of bits or the N information fields included in the resource indication information. Therefore, the quantity of bits in the resource indication information is different from the quantity of required bits.

The following first describes a processing process on the terminal device side. The terminal device receives the resource indication information sent by the network device.

In a possible scenario, the quantity of bits in the resource indication information is greater than the quantity of required bits.

In an optional manner, if the quantity of bits in the resource indication information is L greater than the quantity of required bits, for one of the N information fields, X1 bits in the information field are used to indicate resources allocated to the terminal device in a first-type BWP corresponding to the information field, where X1 is equal to a quantity of bits in the information field minus Y1, and Y1 is a value obtained by equally dividing L by N, is determined based on L and a ratio of the quantity of bits in the information field to the quantity of bits in the resource indication information.

Specifically, if the quantity of bits in the resource indication information is L greater than the quantity of required bits, for the information field in the resource indication information, the terminal device may remove Y1 redundant bits from bits corresponding to the information field, to obtain remaining X1 bits. The X1 bits are bits used to indicate the corresponding first-type BWP.

In the foregoing optional manner, when determining the Y1 bits, the terminal device may determine the Y1 bits based on the L redundant bits and the N information fields. For example, L is equally divided in the N information fields, to obtain a quantity of bits that need to be removed from each information field. Alternatively, Y1 may be determined based on the ratio of the quantity of bits in the information field to the quantity of bits in the resource indication information.

Optionally, a removed bit may be a most significant bit in the information field, or may be a least significant bit in the information field, or may be a bit in another location. This is not specifically limited in this embodiment of this application.

Optionally, a location of the removed bit may be predefined in a protocol, or may be notified by the network device to the terminal device through signaling. Specifically, this is not limited in this application.

The following is an example in which L is equally divided in the N information fields to remove redundant bits. That is, Y1 is a value obtained by equally dividing L by N. The following uses only two information fields as an example. Solutions of a plurality of other information fields are similar, and details are not described herein again.

It is assumed that the quantity of bits in the resource indication information is M, and the quantity of required bits is T. In the second-type BWP, the first first-type BWP uses P1 bits, the second first-type BWP uses P2 bits, and P1+P2=M. In this case, (M−T)=L bits may be equally divided.

Optionally, if the resource indication information includes the N information fields, (L/N) bits, or bits whose quantity is a rounded-up value of (L/N), or bits whose quantity is a rounded-down value of (L/N) may be removed from an information field.

In this manner, if the quantity of bits in the resource indication information is L greater than the quantity of required bits, for one of the N information fields, X1 bits in the information field are used to indicate resources allocated to the terminal device in a first-type BWP corresponding to the information field, where X1 is equal to a quantity of bits in the information field minus Y1, and Y1 may be (L/N), or a rounded-up value of (L/N), or a rounded-down value of (L/N).

For example, assuming that M−T=L=4, there are two information fields, a quantity of bits in the first information field is P1, and a quantity of bits in the second information field is P2, 4/2=2 bits may be removed from each information field. That is, two most significant bits in P1 bits may be removed, and two most significant bits in P2 bits may be removed.

To be specific, when the quantity of bits in the resource indication information is four greater than the quantity of required bits, for the first information field in the resource indication information, P1-2 bits in the first information field are used to indicate resources allocated to the terminal device in a first-type BWP corresponding to the first information field. P1-2 is equal to the quantity P1 of bits in the first information field minus Y1, and Y1 may be 4/2=2. For the second information field in the resource indication information, P2-2 bits in the second information field are used to indicate resources allocated to the terminal device in a first-type BWP corresponding to the second information field. P2-2 is equal to the quantity P2 of bits in the second information field minus Y1, and Y1 may be 4/2=2.

The following uses an example in which Y1 is determined based on the ratio of the quantity of bits in the information field to the quantity of bits in the resource indication information. In other words, Y1 is determined based on L and the ratio of the quantity of bits in the information field to the quantity of bits in the resource indication information. The following uses only two information fields as an example. Solutions of a plurality of other information fields are similar, and details are not described herein again.

It is assumed that the quantity of bits in the resource indication information is M, and the quantity of required bits is T. In the second-type BWP, the first first-type BWP uses P1 bits, the second first-type BWP uses P2 bits, and P1+P2=M.

In this case, a ratio of a quantity of bits in the first information field to the quantity of bits in the resource indication information is P1/M, and a ratio of a quantity of bits in the second information field to the quantity of bits in the indication information is P2/M.

It is assumed that P1/M=m1 and P2/M=m2, where m1+m2=1.

Optionally, if the resource indication information includes two information fields, L×m1 bits or bits whose quantity is a rounded-up value or a rounded-down value of L×m1 may be removed from the first information field, and L×m2 bits or bits whose quantity is a rounded-up value or a rounded-down value of L×m2 may be removed from the second information field In this manner, if the quantity of bits in the resource indication information is L greater than the quantity of required bits, for one of the N information fields, to be specific. X1 bits in the information field are used to indicate resources allocated to the terminal device in a first-type BWP corresponding to the information field, where X1 is equal to a quantity of bits in the information field minus Y1. Y1 may be one of the following values: L×m1, L×m2, the rounded-up value or the rounded-down value of L×m1, or the rounded-up value or the rounded-down value of L×m2.

For example, assuming that M−T=L=6, there are two information fields, a quantity of bits in the first information field is P1, and a quantity of bits in the second information field is P2, P1/M=⅔, P2/M=⅓, 6×⅔=4 bits may be removed from the first information field, and 6×⅓=2 bits may be removed from the second information field. That is, four most significant bits in P1 bits may be removed, and two most significant bits in P2 bits may be removed.

To be specific, when the quantity of bits in the resource indication information is six greater than the quantity of required bits, for the first information field in the resource indication information, P1-4 bits in the first information field are used to indicate resources allocated to the terminal device in a first-type BWP corresponding to the first information field. P1-4 is equal to the quantity P1 of bits in the first information field minus Y1, and Y1 may be 6×2/3=4. For the second information field in the resource indication information, P2-2 bits in the second information field are used to indicate resources allocated to the terminal device in a first-type BWP corresponding to the second information field. P2-2 is equal to the quantity P2 of bits in the second information field minus Y1, and Y1 may be 6×1/3=2.

Optionally, the following uses an example in which Y1 is determined based on a ratio between quantities of bits in a plurality of information fields in the resource indication information. In other words, Y1 is determined based on L and a ratio of a quantity of bits in an information field to a quantity of bits in another information field. The following uses only two information fields as an example. Solutions of a plurality of other information fields are similar, and details are not described herein again.

It is assumed that [P1/P2]=f1 or [P2/P1]=f2, where [ ] may represent rounding up or rounding down, the (M−T) bits may be divided according to a ratio, and f1 and f2 are positive integers.

Optionally, if the resource indication information includes two information fields, L×f1/(f1+1) bits or bits whose quantity is a rounded-up value or a rounded-down value of L×f1/(f1+1) may be removed from the first information field, and L×1/(f1+1) bits or bits whose quantity is a rounded-up value or a rounded-down value of L×1/(f1+1) may be removed from the second information field.

Optionally, if the resource indication information includes two information fields, L×1/(f2+1) bits or bits whose quantity is a rounded-up value or a rounded-down value of L×1/(f2+1) may be removed from the first information field, and L×f2/(f2+1) bits or bits whose quantity is a rounded-up value or a rounded-down value of L×f2/(f2+1) may be removed from the second information field.

In this manner, if the quantity of bits in the resource indication information is L greater than the quantity of required bits, for one of the N information fields, to be specific, X1 bits in the information field are used to indicate resources allocated to the terminal device in a first-type BWP corresponding to the information field, where X1 is equal to a quantity of bits in the information field minus Y1. Y1 may be one of the following values: L×f1/(f1+1), L×1/(f1+1), the rounded-up value or the rounded-down value of L×f1/(f1+1), the rounded-up value or the rounded-down value of L×1/(f1+1), L×1/(f2+1), L×f2/(f2+1), the rounded-up value or the rounded-down value of L×1/(f2+1), or the rounded-up value or the rounded-down value of L×f2/(f2+1).

For example, assuming that M−T=6, [P1/P2]=2, there are two information fields, a quantity of bits in the first information field is P1, and a quantity of bits in the second information field is P2, 6×2/(2+1)=4 bits may be removed from the first information field, and 6×1/(2+1)=2 bits may be removed from the second information field. That is, four most significant bits in P1 bits may be removed, and two most significant bits in P2 bits may be further removed.

To be specific, when the quantity of bits in the resource indication information is six greater than the quantity of required bits, for the first information field in the resource indication information. P1-4 bits in the first information field are used to indicate resources allocated to the terminal device in a first-type BWP corresponding to the first information field. P1-4 is equal to the quantity of bits P1 in the first information field minus Y1, and Y1 may be 6×2/(2+1)=4. For the second information field in the resource indication information, P2-2 bits in the second information field are used to indicate resources allocated to the terminal device in a first-type BWP corresponding to the second information field. P2-2 is equal to the quantity of bits P2 in the second information field minus Y1, and Y1 may be 6×1/(2+1)=2.

In another optional manner, if the quantity of bits in the resource indication information is L greater than the quantity of required bits, X bits in the resource indication information are used to indicate the resources allocated to the terminal device in the second-type BWP, where X is equal to the quantity of bits in the resource indication information minus L.

Specifically, if the quantity of bits in the resource indication information is L greater than the quantity of required bits, the terminal device may remove the redundant L bits from the bits carried in the resource indication information, to obtain the remaining X bits. The X bits are bits used to indicate the second-type BWP.

Optionally, the removed L bits may be L most significant bits in the resource indication information, or may be L least significant bits in the resource indication information, or may be bits in other locations. This is not specifically limited in this embodiment of this application.

Optionally, locations of the removed L bits may be predefined in a protocol, or may be notified by the network device to the terminal device through signaling. Specifically, this is not limited in this application.

For example, assuming that the quantity of required bits is 10, and the quantity of bits in the resource indication information is 12, that is, assuming that the quantity of bits in the resource indication information is two greater than the quantity of required bits, the terminal device may remove two most significant bits from the resource indication information, and the remaining 10 bits are bits used to indicate the second-type BWP.

In another optional manner, if the quantity of bits in the resource indication information is L greater than the quantity of required bits, the terminal device may use least significant bits that are in an information field in the resource indication information and whose quantity is the same as the quantity of required bits. The quantity of required bits is used to indicate bits required by a first-type BWP corresponding to the information field. The terminal device may determine, based on the least significant bits that are in the information field and whose quantity is the same as the quantity of required bits, resources allocated to the terminal device in the first-type BWP.

Specifically, if the quantity of bits in the resource indication information is L greater than the quantity of required bits, the terminal device may use X1 least significant bits in the information field in the resource indication information, and the X1 bits are used to indicate the bits required by the corresponding first-type BWP. The terminal device may determine, based on the X1 least significant bits, the resources allocated to the terminal device in the first-type BWP.

For example, if the quantity of bits required by the first-type BWP is 10, and a quantity of bits in the information field corresponding to the first-type BWP in the resource indication information is 2 greater than the quantity of bits required by the first-type BWP, the terminal device uses 10 least significant bits in the information field in the resource indication information, and determines, based on the 10 bits, the resources allocated to the terminal device in the first-type BWP.

In another optional manner, if the quantity of bits in the resource indication information is L greater than the quantity of required bits, the terminal device may use least significant bits that are in the resource indication information and whose quantity is the same as the quantity of required bits. The least significant bits that are in the resource indication information and whose quantity is the same as the quantity of required bits are used to indicate bits required by the second-type BWP, The terminal device may determine, based on the least significant bits that are in the resource indication information and whose quantity is the same as the quantity of required bits, the resources allocated to the terminal device in the second-type BWP.

Specifically, if the quantity of bits in the resource indication information is L greater than the quantity of required bits, the terminal device may use the least significant bits that are in the bits carried in the resource indication information and whose quantity is the same as the quantity of required bits.

For example, if the quantity of bits in the resource indication information is M, the quantity of required bits is T, and M−T=L, the terminal device may determine, based on T least significant bits, the resources allocated to the terminal device.

In another possible scenario, a quantity of bits in the resource indication information is less than a quantity of required bits.

In an optional manner, if the quantity of bits in the resource indication information is S less than the quantity of required bits, for one of the N information fields, bits obtained after Y2 bits 0 are added to bits in the information field are used to indicate resources allocated to the terminal device in a first-type BWP corresponding to the information field, where Y2 is a value obtained by equally dividing S by N, or Y2 is determined based on S and a ratio of a quantity of bits in the information field to the quantity of bits in the resource indication information.

Specifically, if the quantity of bits in the resource indication information is S less than the quantity of required bits, for the information field in the resource indication information, the terminal device may add the Y2 bits to bits corresponding to the information field, and the bits obtained after the Y2 bits are added are the bits used to indicate the resources allocated to the terminal device in the first-type BWP corresponding to the information field.

In the foregoing optional manner, when determining the Y2 bits, the terminal device may determine the Y2 bits based on the S bits and the N information fields. For example, S is equally divided in the N information fields, to obtain a quantity of bits 0 that need to be added to each information field. Alternatively, Y2 may be determined based on the ratio of the quantity of bits in the information field to the quantity of bits in the resource indication information.

Optionally, when a bit 0 is to be added to an information field, the bit 0 may be added to a most significant bit in the information field, or the bit 0 may be added to a least significant bit in the information field, or the bit 0 may be added in another location. This is not specifically limited in this embodiment of this application.

Optionally, when a bit 0 is to be added to an information field of the resource indication information, the bit 0 may be added to a most significant bit in the information field, or the bit 0 may be added to a least significant bit in the information field, or the bit 0 may be added in another location. This is not specifically limited in this embodiment of this application.

Optionally, a location in which a bit 0 is added may be predefined in a protocol, or may be notified by the network device to the terminal device through signaling. Specifically, this is not limited in this application.

The following is an example in which S is equally divided in the N information fields for adding a bit 0. That is, Y2 is a value obtained by equally dividing S by N. The following uses only two information fields as an example. Solutions of a plurality of other information fields are similar, and details are not described herein again.

It is assumed that the quantity of bits in the resource indication information is M, and the quantity of required bits is T. In the second-type BWP, the first first-type BWP uses P1 bits, the second first-type BWP uses P2 bits, and P1+P2=M. In this case, (T−M)=S bits may be equally divided.

Optionally, if the resource indication information includes the N information fields, (S/N) bits 0, or bits 0 whose quantity is a rounded-up value of (S/N), or bits 0 whose quantity is a rounded-down value of (S/N) may be added to an information field.

In this manner, if the quantity of bits in the resource indication information is S less than the quantity of required bits, for one of the N information fields, the bits obtained after Y2 bits 0 are added to bits in the information field are used to indicate the resources allocated to the terminal device in the first-type BWP corresponding to the information field, where Y2 may be (S/N), or the rounded-up value of (S/N), or the rounded-down value of (S/N).

For example, assuming that T−M=4, there are two information fields, a quantity of bits in the first information field is P1, and a quantity of bits in the second information field is P2, two bits 0 may be added to each information field. To be specific, two bits are added to most significant bits in P1 bits, and values of the two added bits are 0; two bits are added to most significant bits in P2 bits, and values of the two added bits are 0.

To be specific, when the quantity of bits in the resource indication information is four less than the quantity of required bits, for the first information field in the resource indication information, bits obtained after two bits 0 are added to the first information field are used to indicate resources allocated to the terminal device in a first-type BWP corresponding to the first information field. For the second information field in the resource indication information, bits obtained after two bits 0 are added to the second information field are used to indicate resources allocated to the terminal device in a first-type BWP corresponding to the second information field.

The following uses an example in which Y2 is determined based on the ratio of the quantity of bits in the information field to the quantity of bits in the resource indication information.

It is assumed that the quantity of bits in the resource indication information is M, and the quantity of required bits is T. In the second-type BWP, the first first-type BWP uses P1 bits, the second first-type BWP uses P2 bits, and P1+P2=M.

In this case, a ratio of a quantity of bits in the first information field to the quantity of bits in the resource indication information is P1/M, and a ratio of a quantity of bits in the second information field to the quantity of bits in the indication information is P2/M.

It is assumed that P1/M=m1 and P2/M=m2, where m1+m2=1.

Optionally, if the resource indication information includes two information fields, L×m1 bits or bits whose quantity is a rounded-up value or a rounded-down value of L×m1 may be added to the first information field, and L×m2 bits or bits whose quantity is a rounded-up value or a rounded-down value of L×m2 may be added to the second information field.

In this manner, if the quantity of bits in the resource indication information is S less than the quantity of required bits, for one of the N information fields, the bits obtained after Y2 bits 0 are added to bits in the information field are used to indicate the resources allocated to the terminal device in the first-type BWP corresponding to the information field, where Y2 may be one of the following values: L×m1, L×m2, the rounded-up value or the rounded-down value of L×m1, or the rounded-up value or the rounded-down value of L×m2.

For example, assuming that T−M=S=6, there are two information fields, a quantity of bits in the first information field is P1, and a quantity of bits in the second information field is P2, P1/M=2/3, P2/M=1/3, 6×2/3=4 bits 0 may be added to the first information field, and 6×1/3=2 bits 0 may be added to the second information field. To be specific, four bits 0 may be added to most significant bits in P1 bits, and two bits 0 may be added to most significant bits in P2 bits.

To be specific, when the quantity of bits in the resource indication information is six less than the quantity of required bits, for the first information field in the resource indication information, bits obtained after four bits 0 are added to bits in the first information field are used to indicate resources allocated to the terminal device in a first-type BWP corresponding to the first information field. Y2 may be 6×2/3=4. For the second information field in the resource indication information, bits obtained after two bits 0 are added to bits in the second information field are used to indicate resources allocated to the terminal device in a first-type BWP corresponding to the second information field. Y2 may be 6×1/3=2.

Optionally, the following uses an example in which Y2 is determined based on a ratio between quantities of bits in a plurality of information fields in the resource indication information. In other words, Y2 is determined based on S and a ratio of a quantity of bits in an information field to a quantity of bits in another information field. The following uses only two information fields as an example. Solutions of a plurality of other information fields are similar, and details are not described herein again.

It is assumed that [P1/P2]=f1 or [P2/P1]=f2, where [ ] may represent rounding up or rounding down, the (T−M) bits may be divided according to a ratio, and f1 and f2 are positive integers.

Optionally, if the resource indication information includes two information fields, L×f1/(f1+1) bits 0 or bits 0 whose quantity is a rounded-up value or a rounded-down value of L×f1/(f1+1) may be added to the first information field, and L×1/(f1+1) bits 0 or bits 0 whose quantity is a rounded-up value or a rounded-down value of L×1/(f1+1) may be added to the second information field.

Optionally, if the resource indication information includes two information fields, L×1/(f2+1) bits 0 or bits 0 whose quantity is a rounded-up value or a rounded-down value of L×1/(f2+1) may be added to the first information field, and L×f2/(f2+1) bits 0 or bits 0 whose quantity is a rounded-up value or a rounded-down value of L×f2/(f2+1) may be added to the second information field.

In this manner, if the quantity of bits in the resource indication information is S less than the quantity of required bits, for one of the N information fields, to be specific, bits obtained after Y2 bits 0 are added to bits in the information field are used to indicate resources allocated to the terminal device in a first-type BWP corresponding to the information field, where Y2 may be one of the following values: L×f1/(f1+1), L×1/(f1+1), the rounded-up value or the rounded-down value of L×f1/(f1+1), the rounded-up value or the rounded-down value of L×1/(f1+1) L×1/(f2+1), L×f2/(f2+1), the rounded-up value or the rounded-down value of L×1/(f2+1), or the rounded-up value or the rounded-down value of L×f2/(f2+1).

For example, assuming that T−M=6, there are two information fields, a quantity of bits in the first information field is P1, and a quantity of bits in the second information field is P2, 6×2/(2+1)=4 bits 0 may be added to the first information field, and 6×1/(2+1)=2 bits 0 may be added to the second information field. To be specific, four bits may be added to most significant bits in P1 bits, and values of the four added bits may be 0; two bits are also added to most significant bits in P2 bits, and values of the two added bits are 0.

To be specific, when the quantity of bits in the resource indication information is six less than the quantity of required bits, for the first information field in the resource indication information, bits obtained after four bits 0 are added to the first information field are used to indicate resources allocated to the terminal device in a first-type BWP corresponding to the first information field. Y2 may be 6×2/(2+1)=4. For the second information field in the resource indication information, bits obtained after two bits 0 are added to the second information field are used to indicate resources allocated to the terminal device in a first-type BWP corresponding to the second information field. Y2 may be 6×1/(2+1)=2.

In another optional manner, if the quantity of bits in the resource indication information is S less than the quantity of required bits, bits obtained after S bits 0 are added to the bits in the resource indication information are used to indicate the resources allocated to the terminal device in the second-type BWP. The terminal device may determine, based on the bits obtained after the bits 0 are added, the resources allocated to the terminal device in the second-type BWP.

Specifically, if the quantity of bits in the resource indication information is S less than the quantity of required bits, the terminal device needs to add the S bits to the bits carried in the resource indication information, and the bits obtained after the S bits are added are bits used to indicate the second-type BWP. The terminal device determines, based on the bits obtained after the bits 0 are added, the resources allocated by the network device to the terminal device in the second-type BWP.

Optionally, when a bit 0 is to be added to the resource indication information, the bit 0 may be added to a most significant bit in the resource indication information, or the bit 0 may be added to a least significant bit in the resource indication information, or the bit 0 may be added in another location. This is not specifically limited in this embodiment of this application.

Optionally, a location in which the bit 0 is added may be predefined in a protocol, or may be notified by the network device to the terminal device through signaling. Specifically, this is not limited in this application.

For example, assuming that the quantity of required bits is 12, and the quantity of bits in the resource indication information is 1 that is, assuming that the quantity of bits in the resource indication information is two less than the quantity of required bits, the terminal device may add two bits to most significant bits in the resource indication information, values of the two bits are 0, and the obtained 12 bits are bits used to indicate the second-type BWP. The terminal device determines, based on the bits obtained after the bits 0 are added, the resources allocated by the network device to the terminal device in the second-type BWP.

In another optional manner, if the quantity of bits in the resource indication information is S less than the quantity of required bits, the terminal device may add (or preset) a bit 0 to an information field in the resource indication information until a quantity of bits in the information field is the same as a quantity of bits required to indicate a first-type BWP corresponding to the information field. The terminal device may determine, based on the information field obtained after the bit 0 is added, resources allocated to the terminal device in the first-type BWP corresponding to the information field.

Specifically, if the quantity of bits in the resource indication information is S less than the quantity of required bits, the terminal device may add (or preset) a bit 0 to the information field in the resource indication information until the quantity of bits in the information field is the same as the quantity of bits required to indicate the first-type BWP corresponding to the information field. The terminal device may determine, based on the information field obtained after the bit 0 is added, the resources allocated to the terminal device in the first-type BWP corresponding to the information field.

For example, assuming that the quantity of bits required by the first-type BWP is 12, and the quantity of bits in the information field that is in the resource indication information and that corresponds to the first-type BWP is 10, that is, assuming that the quantity of bits in the information field in the resource indication information is two less than the quantity of bits required by the first-type BWP corresponding to the information field, the terminal device may add a bit 0 to a most significant bit in the first information field in the resource indication information until the quantity of bits in the information field in the resource indication information is the same as the quantity of bits required to indicate the first-type BWP corresponding to the information field. The terminal device determines, based on the information field after the bits 0 are added, the resources allocated to the terminal device in the first-type BWP corresponding to the information field.

In another optional manner, if the quantity of bits in the resource indication information is S less than the quantity of required bits, the terminal device may add (or preset) a bit 0 to the bits carried in the resource indication information until the quantity of bits in the resource indication information is the same as the quantity of required bits. The bits that are in the resource indication information and whose quantity is the same as the quantity of required bits are used to indicate the bits required by the second-type BWP. The terminal device may determine, based on the resource indication information obtained after the bit 0 is added, the resources allocated to the terminal device in the second-type BWP.

Specifically, if the quantity of bits in the resource indication information is S less than the quantity of required bits, the terminal device may add (or preset) a bit 0 to the bits carried in the resource indication information until the quantity of bits in the resource indication information is the same as the quantity of required bits.

For example, assuming that the quantity of bits in the resource indication information is 10, and the quantity of required bits is 12, the terminal device may add a bit 0 to the bits carried in the resource indication information until the quantity of bits in the resource indication information is equal to 12. The terminal device determines, based on the resource indication information obtained after the bits 0 are added, the resources allocated to the terminal device in the second-type BWP.

The following describes the processing on the network device side. The network device sends the resource indication information to the terminal device.

In a possible scenario, the quantity of bits in the resource indication information is greater than the quantity of required bits.

In an optional manner, if the quantity of bits in the resource indication information is greater than the quantity of required bits, for one of the N information fields, bits in the information field are obtained after Y1 bits 0 are added to bits required to allocate resources to the terminal device in a first-type BWP corresponding to the information field, where Y1 is a value obtained by equally dividing L by N, or Y1 is determined based on L and a ratio of a quantity of bits in the information field to the quantity of bits in the resource indication information.

Specifically, on the network device side, the network device needs to send the resource indication information. Therefore, if the quantity of bits in the resource indication information is L greater than the quantity of required bits, the network device needs to add L bits based on the required bits, so that the resource indication information sent by the network device meets a requirement in the foregoing scenario. The L bits need to be divided into the N information fields, and Y1 bits are divided into one information field.

Bits 0 may be added to a plurality of information fields in the resource indication information as required, to facilitate obtaining prior information and improve decoding performance.

In the foregoing optional manner, when determining the Y1 bits, the network device may determine the Y1 bits based on the L bits and the N information fields. For example, L is equally divided in the N information fields, to obtain a quantity of bits 0 that need to be added to each information field. Alternatively, Y1 may be determined based on the ratio of the quantity of bits in the information field to the quantity of bits in the resource indication information.

Optionally, when a bit 0 is to be added to an information field, the bit 0 may be added to a most significant bit in the information field, or the bit 0 may be added to a least significant bit in the information field, or the bit 0 may be added in another location. This is not specifically limited in this embodiment of this application.

Optionally, when a bit 0 is to be added to the resource indication information, the bit 0 may be added to a most significant bit in the resource indication information, or the bit 0 may be added to a least significant bit in the resource indication information, or the bit 0 may be added in another location. This is not specifically limited in this embodiment of this application.

Optionally, a location in which the bit 0 is added may be predefined in a protocol, or may be notified by the network device to the terminal device through signaling. Specifically, this is not limited in this application.

The following is an example in which L is equally divided in the N information fields for adding bits 0. That is, Y1 is a value obtained by equally dividing L by N. The following uses only two information fields as an example. Solutions of a plurality of other information fields are similar, and details are not described herein again.

It is assumed that the quantity of bits in the resource indication information is M, and the quantity of required bits is T. In the second-type BWP, the first first-type BWP uses P1 bits, the second first-type BWP uses P2 bits, and P1+P2=M. In this case, (M−T)=L, bits may be equally divided.

Optionally, if the resource indication information includes the N information fields, (L/N) bits 0, or bits 0 whose quantity is a rounded-up value of (L/N), or bits 0 whose quantity is a rounded-down value of (L/N) may be added to an information field.

In this manner, if the quantity of bits in the resource indication information is L greater than the quantity of required bits, for one of the N information fields, bits in the information field are obtained after Y1 bits 0 are added to bits required to allocate resources to the terminal device in a first-type BWP corresponding to the information field, where Y1 may be (L/N), or the rounded-up value of (L/N), or the rounded-down value of (L/N).

For example, assuming that M−T=4, there are two information fields, a quantity of bits in the first information field is P1, and a quantity of bits in the second information field is P2, two bits 0 may be added to each information field. To be specific, two bits are added to most significant bits in the P1 bits, and values of the two added bits are 0; two bits are added to most significant bits in the P2 bits, and values of the two added bits are 0.

To be specific, when the quantity of bits in the resource indication information is four greater than the quantity of required bits, for the first information field in the resource indication information, the bits in the first information field are obtained after two bits 0 are added to bits required to allocate resources to the terminal device in a first-type BWP corresponding to the first information field. For the second information field in the resource indication information, the bits in the second information field are obtained after two bits 0 are added to bits required to allocate resources to the terminal device in a first-type BWP corresponding to the second information field.

The following uses an example in which Y1 is determined based on the ratio of the quantity of bits in the information field to the quantity of bits in the resource indication information.

It is assumed that the quantity of bits in the resource indication information is M, and the quantity of required bits is T. In the second-type BWP, the first first-type BWP uses P1 bits, the second first-type BWP uses P2 bits, and P1+P2=M.

In this case, a ratio of a quantity of bits in the first information field to the quantity of bits in the resource indication information is P1/M, and a ratio of a quantity of bits in the second information field to the quantity of bits in the indication information is P2/M.

It is assumed that P1/M=m1 and P2/M=m2, where m1+m2=1.

Optionally, if the resource indication information includes two information fields, the first information field P1 is information obtained after L×m1 bits 0 or bits 0 whose quantity is a rounded-up value or a rounded-down value of L×m1 are added to bits required to indicate resources allocated to the terminal device in a first-type BWP corresponding to the information field, and the second information field P2 is information obtained after L×m2 bits 0 or bits 0 whose quantity is a rounded-up value or a rounded-down value of are added to bits required to indicate resources allocated to the terminal device in a first-type BWP corresponding to the information field.

In this manner, if the quantity of bits in the resource indication information is L greater than the quantity of required bits, for one of the N information fields, the bits in the information field are information obtained after Y1 bits 0 are added to the bits required to indicate the resources allocated to the terminal device in the first-type BWP corresponding to the information field, where Y1 may be one of the following values: L×m1, L×m2, the rounded-up value or the rounded-down value of L×m1, or the rounded-up value or the rounded-down value of L×m2.

For example, assuming that M−T=L=6, there are two information fields, a quantity of bits in the first information field is P1, a quantity of bits in the second information field is P2, P1/M=⅔, and P2/M=⅓, the first information field P1 is information obtained after 6×⅔=4 bits 0 are added to bits required to indicate resources allocated to the terminal device in a first-type BWP corresponding to the information field, and the second information field P2 is information obtained after 6×⅓=2 bits 0 are added to bits required to indicate resources allocated to the terminal device in a first-type BWP corresponding to the information field. In other words, four bits 0 may be added to most significant bits in the bits required to indicate the resources allocated to the terminal device in the first-type BWP corresponding to the first information field, and then two bits 0 are added to most significant bits in the bits required to indicate the resources allocated to the terminal device in the first-type BWP corresponding to the second information field.

To be specific, when the quantity of bits in the resource indication information is six greater than the quantity of required bits, for the first information field in the resource indication information, the bits in the first information field are information obtained after four bits 0 are added to the bits required to indicate the resources allocated to the terminal device in the first-type BWP corresponding to the information field. Y1 may be $6 \times 2/3 = 4$. For the second information field in the resource indication information, the bits in the second information field are information obtained after two bits 0 are added to bits required to indicate the resources allocated to the terminal device in the first-type BWP corresponding to the information field. Y1 may be $6 \times 1/3 = 2$.

Optionally, the following uses an example in which Y1 is determined based on a ratio between quantities of bits in a plurality of information fields in the resource indication information. In other words, Y1 is determined based on L and a ratio of a quantity of bits in an information field to a quantity of bits in another information field. The following uses only two information fields as an example. Solutions of a plurality of other information fields are similar, and details are not described herein again.

It is assumed that [P1/P2]=f1 or [P2/P1]=f2, where [ ] may represent rounding up or rounding down, and the (M−T) bits may be divided according to a ratio, and f1 and f2 are positive integers.

Optionally, if the resource indication information includes two information fields, bits in the first information field are information obtained after L×f1/(f1+1) bits 0 or bits whose quantity is a rounded-up value or a rounded-down value of L×f1/(f1+1) are added to bits required to indicate resources allocated to the terminal device in a first-type BWP corresponding to the information field, and bits in the second information field are information obtained after L×1/(f1+1) bits 0 or bits 0 whose quantity is a rounded-up value or a rounded-down value of L×1/(f1+1) are added to bits required to indicate resources allocated to the terminal device in a first-type BWP corresponding to the information field.

Optionally, if the resource indication information includes two information fields, bits in the first information field are information obtained after L×1/(f2+1) bits 0 or bits 0 whose quantity is a rounded-up value or a rounded-down value of L×1/(f2+1) are added to bits required to indicate resources allocated to the terminal device in a first-type BWP corresponding to the information field, and bits in the second information field are information obtained after L×f2/(f2+1) bits 0 or bits 0 whose quantity is a rounded-up value or a rounded-down value of L×f2/(f2+1) are added to bits required to indicate resources allocated to the terminal device in a first-type BWP corresponding to the information field.

In this manner, if the quantity of bits in the resource indication information is L greater than the quantity of required bits, for one of the N information fields, bits in the information field are information obtained after Y1 bits 0 are added to bits required to indicate resources allocated to the terminal device in a first-type BWP corresponding to the information field, where Y1 may be one of the following values: L×f1/(f1+1), L×1/(f1+1), the rounded-up value or the rounded-down value of L×f1/(f1+1), the rounded-up value or the rounded-down value of L×1/(f1+1), L×1/(f2+1), L×2/(f2+1), the rounded-up value or the rounded-down value of L×1/(f2+1), or the rounded-up value or the rounded-down value of L×f2/(12+1).

For example, assuming that M−T=6, there are two information fields, a quantity of bits in the first information field is P1, and a quantity of bits in the second information field is P2, the first information field P1 is information obtained after four bits are added into most significant bits in bits required to indicate resources allocated to the terminal device in a first-type BWP corresponding to the first information field, and values of the four padded bits are 0. The second information field P2 is information obtained after two bits are added into most significant bits in bits required to indicate resources allocated to the terminal device in a first-type BWP corresponding to the second information field, and values of the two padded bits are 0.

To be specific, when the quantity of bits in the resource indication information is six greater than the quantity of required bits, for the first information field in the resource indication information, the bits in the first information field are information obtained after four bits 0 are added to the bits required to indicate the resources allocated to the terminal device in the first-type BWP corresponding to the information field, Y1 may be $6 \times 2/(2+1) = 4$. For the second information field in the resource indication information, the bits in the second information field are information obtained after two bits 0 are added to bits required to indicate the resources allocated to the terminal device in a first-type BWP corresponding to the information field. Y1 may be $6 \times 1/(2+1) = 2$.

In another optional manner, if the quantity of bits in the resource indication information is L greater than the quantity of required bits, the bits in the resource indication information are information obtained after L bits 0 are added to bits required to indicate the resources allocated to the terminal device in the second-type BWP. The network device sends the resource indication information obtained after the bits 0 are added, and the resource indication information is used to indicate the resources allocated to the terminal device in the second-type BWP.

Specifically, if the quantity of bits in the resource indication information is L greater than the quantity of required bits, the network device needs to add the L bits based on the bits required to indicate the resources allocated to the terminal device in the BWP. The resource indication information obtained after the L bits are added is the resource indication information sent by the network device to the terminal device.

Optionally, when a bit 0 is to be added to the resource indication information, the bit 0 may be added to a most significant bit in the resource indication information, or the bit 0 may be added to a least significant bit in the resource indication information, or the bit 0 may be added in another location. This is not specifically limited in this embodiment of this application.

Optionally, a location in which a bit 0 is added may be predefined in a protocol, or may be notified by the network device to the terminal device through signaling. Specifically, this is not limited in this application.

For example, assuming that the quantity of required bits is 10, and the quantity of bits in the resource indication information is 12, that is, assuming that the quantity of bits in the resource indication information is two greater than the quantity of required bits, the network device may add two bits to most significant bits in bits required to indicate the resources allocated to the terminal device in the second-type BWP, values of the two bits is 0, and the obtained 12 bits are the resource indication information sent to the terminal device.

In another optional manner, if the quantity of bits in the resource indication information is L greater than the quantity of required bits, for an information field in the resource indication information, the network device may add a bit 0 to bits required to indicate resources allocated to the terminal device in a first-type BWP corresponding to the information field until a quantity of bits in the information field is the same as a specified quantity of bits in the information field. The network device sends the information field obtained after the bit 0 is added, and the information field is used to indicate the resources allocated to the terminal device in the first-type BWP corresponding to the information field. The specified quantity of bits in the information field is a quantity of bits obtained after Y1 bits 0 are added to a quantity of bits required to indicate the resources allocated to the terminal device in the first-type BWP corresponding to the information field.

Specifically, if the quantity of bits in the resource indication information is L greater than the quantity of required bits, for an information field in the resource indication information, the network device needs to add a bit 0 to the bits required to indicate the resources allocated to the terminal device in the first-type BWP corresponding to the information field until the quantity of bits in the information field is the same as the specified quantity of bits in the information field. The specified quantity of bits in the information field is a quantity of bits obtained after Y1 bits 0 are added to the bits required to indicate the resources allocated to the terminal device in the first-type BWP corresponding to the information field. The information field obtained after the Y1 bits 0 are added is the information field sent by the network device to the terminal device.

For example, assuming that the quantity of bits required by the first-type BWP is 10, and the quantity of bits in the information field that is in the resource indication information and that is used to indicate the first-type BWP is 12, that is, assuming that the quantity of bits in the information field in the resource indication information is two greater than the quantity of bits required by the first-type BWP corresponding to the information field, the network device may add a bit 0 to a most significant bit in the information field in the resource indication information until the quantity of bits in the information field in the resource indication information is the same as the quantity of bits required to indicate the first-type BWP corresponding to the information field. The network device sends, to the terminal device, the information field obtained after the bit 0 is added, and the terminal device determines, based on the information field, the resources allocated to the terminal device in the first-type BWP corresponding to the information field.

In another optional manner, if the quantity of bits in the resource indication information is L greater than the quantity of required bits, the network device needs to add a bit 0 to bits required to indicate the resources allocated to the terminal device in the second-type BWP until the quantity of bits in the resource indication information is the same as a specified quantity of bits. The specified quantity of bits is a quantity of bits obtained after Y bits 0 are added to the bits required to indicate the resources allocated to the terminal device in the second-type BWP.

Specifically, if the quantity of bits in the resource indication information is L greater than the quantity of required bits, the network device may add (or preset) a bit 0 to the bits required to indicate the resources allocated to the terminal device in the second-type BWP until the quantity of bits in the resource indication information is the same as the specified quantity of bits.

For example, assuming that the quantity of bits in the resource indication information is 10, and the quantity of required bits is 12, the network device may add a bit 0 to the bits required to indicate the resources allocated to the terminal device in the second-type BWP until the quantity of bits in the resource indication information is equal to 12. The network device sends, to the terminal device, the resource indication information obtained after the bits 0 are added, and the terminal device determines, based on the resource indication information, the resources allocated to the terminal device in the second-type BWP.

In another possible scenario, the quantity of bits in the resource indication information is less than the quantity of required bits.

In an optional manner, if the quantity of bits in the resource indication information is S less than the quantity of required bits, for one of the N information fields, the information field is used to indicate resources allocated to the terminal device in a first-type BWP corresponding to the information field, where the information field is information obtained by removing Y2 bits from bits required to indicate the resources allocated to the terminal device in the first-type BWP corresponding to the information field, and Y2 is a value obtained by equally dividing S by or Y2 is determined based on S and a ratio of a quantity of bits in the information field to the quantity of bits in the resource indication information.

Specifically, on the network device side, the network device needs to send the resource indication information. Therefore, if the quantity of bits in the resource indication information is S less than the quantity of required bits, the network device needs to remove S bits from the required bits, so that the resource indication information sent by the network device meets a requirement in the foregoing scenario. The S bits need to be divided into the N information fields, and Y2 bits are divided into one information field.

A bit may be removed from a plurality of information fields in the resource indication information as required, to ensure balance of valid bits in the information fields, and avoid limited resource allocation.

In the foregoing optional manner, when determining Y2, the network device may determine Y2 based on the S redundant bits and the N information fields. For example, S is equally divided in the N information fields, to obtain a quantity of bits that need to be removed from each information field. Alternatively, Y2 may be determined based on the ratio of the quantity of bits in the information field to the quantity of bits in the resource indication information.

Optionally, when a bit is to be removed from the information field, a most significant bit in the information field may be removed, or a least significant bit in the information field may be removed, or a bit in another location may be removed. This is not specifically limited in this embodiment of this application.

Optionally, when a bit is to be removed the resource indication information, a most significant bit in the resource indication information may be removed, or a least significant bit in the resource indication information may be removed, or a bit in another location may be removed. This is not specifically limited in this embodiment of this application.

Optionally, a location of the removed bit may be predefined in a protocol, or may be notified by the network device to the terminal device through signaling. Specifically, this is not limited in this application.

The following uses an example in which S is equally divided in the N information fields for removing redundant bits. That is, Y2 is a value obtained by equally dividing S by N. The following uses only two information fields as an example. Solutions of a plurality of other information fields are similar, and details are not described herein again.

It is assumed that the quantity of bits in the resource indication information is M, and the quantity of required bits is T. In the second-type BWP, the first first-type BWP uses P1 bits, the second first-type BWP uses P2 bits, and P In this case, (T−M)=S bits may be equally divided.

Optionally, if the resource indication information includes the N information fields, (S/N) bits, or bits whose quantity is a rounded-up value of (S/N), or bits whose quantity is a rounded-down value of (S/N) may be removed from an information field.

In this manner, if the quantity of bits in the resource indication information is S less than the quantity of required bits, for one of the N information fields, bits obtained after Y2 bits are removed from the bits required to indicate the resources allocated to the terminal device in the first-type BWP corresponding to the information field, the network device sends the information field obtained after the bits are removed, and the information field is used to indicate the resources allocated to the terminal device in the first-type BWP corresponding to the information field, where Y2 may be (S/N), or the rounded-up vale of (S/N), or the rounded-down value of (S/N).

For example, assuming that T−M=4, there are two information fields, a quantity of bits in the first information field is P1, and a quantity of bits in the second information field is P2, two bits may be removed from bits required to indicate resources allocated to the terminal device in a first-type BWP corresponding to each information field. To be specific, two most significant bits may be removed from the bits required to indicate the resources allocated to the terminal device in the first-type BWP corresponding to the first information field, and then two most significant bits are removed from the bits required to indicate the resources allocated to the terminal device in the first-type BWP corresponding to the second information field. In other words, P1 is information obtained after two bits are removed from the bits required to indicate the resources allocated to the terminal device in the first-type BWP corresponding to the first information field, and P2 is information obtained after two bits are removed from the bits required to indicate the resources allocated to the terminal device in the first-type BWP corresponding to the second information field. To be specific, when the quantity of bits in the resource indication information is four less than the quantity of required bits, for the first information field in the resource indication information, the bits in the first information field are information obtained after two bits are removed from the bits required to indicate the resources allocated to the terminal device in the first-type BWP corresponding to the first information field, and the information obtained after the two bits are removed is used to indicate the resources allocated to the terminal device in the first-type BWP corresponding to the first information field. For the second information field in the resource indication information, the bits in the second information field are information obtained after two bits are removed from the bits required to indicate the resources allocated to the terminal device in the first-type BWP corresponding to the second information field, and the information obtained after the two bits are removed is used to indicate the resources allocated to the terminal device in the first-type BWP corresponding to the second information field.

The following uses an example in which Y2 is determined based on the ratio of the quantity of bits in the information field to the quantity of bits in the resource indication information.

It is assumed that the quantity of bits in the resource indication information is M. and the quantity of required bits is T. In the second-type BWP, the first first-type BWP uses P1 bits, the second first-type BWP uses P2 bits, and P1+P2=M.

In this case, a ratio of a quantity of bits in the first information field to the quantity of bits in the resource indication information is P1/M, and a ratio of a quantity of bits in the second information field to the quantity of bits in the indication information is P2/M.

It is assumed that P1/M=m1 and P2/M=m2, where m1+m2=1.

Optionally, if the resource indication information includes two information fields, the first information field is information obtained after L×m1 bits or bits whose quantity is a rounded-up value or a rounded-down value of L×m1 are removed from bits required to indicate resources allocated to the terminal device in a first-type BWP corresponding to the information field, and the second information field is information obtained after L×m2 bits or bits whose quantity is a rounded-up value or a rounded-down value of L×m2 are removed from bits required to indicate resources allocated to the terminal device in a first-type BWP corresponding to the information field.

In this manner, if the quantity of bits in the resource indication information is S less than the quantity of required bits, for one of the N information fields, bits in the information field are information obtained after Y2 bits are removed from bits required to indicate resources allocated to the terminal device in a first-type BWP corresponding to the information field, and the information field is used to indicate the resources allocated to the terminal device in the first-type BWP corresponding to the information field, where Y2 may be one of the following values: L×m1, L×m2, the rounded-up value or the rounded-down value of L×m1, or the rounded-up value or the rounded-down value of L×m2.

For example, assuming that T−M=S=6, there are two information fields, a quantity of bits in the first information field is P1, a quantity of bits in the second information field is P2, P1/M=⅔, and P2/M=⅓, the bits in the first information field are information obtained after 6×⅔=4 bits are removed from the bits required to indicate the resources allocated to the terminal device in the first-type BWP corresponding to the first information field, and the bits in the second information field are information obtained after 6×⅓=2 bits are removed from the bits required to indicate the resources allocated to the terminal device in the first-type BWP corresponding to the second information field. In other words, P1 is information obtained after four bits are removed from the bits required to indicate the resources allocated to the terminal device in the first-type BWP corresponding to the first information field, and P2 is information obtained two bits are removed from the bits required to indicate the resources allocated to the terminal device in the first-type BWP corresponding to the second information field.

To be specific, when the quantity of bits in the resource indication information is six less than the quantity of required bits, for the first information field in the resource indication information, the bits in the first information field are information obtained after four bits are removed from the bits required to indicate the resources allocated to the terminal device in the first-type BWP corresponding to the first information field, and the bits are used to indicate the resources allocated to the terminal device in the first-type BWP corresponding to the first information field. Y2 may be 6×⅔=4. For the second information field in the resource indication information, the bits in the second information field are information obtained after two bits are removed from the bits required to indicate the resources allocated to the terminal device in the first-type BWP corresponding to the second information field, and the bits are used to indicate the resources allocated to the terminal device in the first-type BWP corresponding to the second information field. Y2 may be 6×⅓=2.

Optionally, the following uses an example in which Y2 is determined based on a ratio between quantities of bits in a plurality of information fields in the resource indication information. In other words, Y2 is determined based on S and a ratio of a quantity of bits in an information field to a quantity of bits in another information field. The following uses only two information fields as an example. Solutions of a plurality of other information fields are similar, and details are not described herein again.

It is assumed that [P1/P2]=f1 or [P2/P1]=f2, where [ ] may represent rounding up or rounding down, the (T−M) bits may be divided according to a ratio, and f1 and f2 are positive integers.

Optionally, if the resource indication information includes two information fields, bits in the first information field is information obtained after L×f1/(f1+1) bits or bits whose quantity is a rounded-up value or a rounded-down value of L×f1/(f1+1) are removed from bits required to indicate resources allocated to the terminal device in a first-type BWP corresponding to the first information field, and bits in the second information field is information obtained after L×1/(f1+1) bits or bits whose quantity is a rounded-up value or a rounded-down value of L×1/(f1+1) are removed from bits required to indicate resources allocated to the terminal device in a first-type BWP corresponding to the second information field.

Optionally, if the resource indication information includes two information fields, bits in the first information field is information obtained after L×1/(f2+I) bits or bits whose quantity is a rounded-up value or a rounded-down value of L×1/(f2+1) are removed from bits required to indicate resources allocated to the terminal device in a first-type BWP corresponding to the first information field, and bits in the second information field is information obtained after L×f2/(f2+1) bits or bits whose quantity is a rounded-up value or a rounded-down value of L×f2/(f2+1) are removed from bits required to indicate resources allocated to the terminal device in a first-type BWP corresponding to the second information field.

In this manner, if the quantity of bits in the resource indication information is S less than the quantity of required bits, for one of the N information fields, bits in the information field are bits obtained after Y2 bits are removed from bits required to indicate resources allocated to the terminal device in a first-type BWP corresponding to the information field, the bits are used to indicate the resources allocated to the terminal device in the first-type BWP corresponding to the information field, where Y2 may be one of the following values: L×f1/(f1+1), L×1/(f1+1), the rounded-up value or the rounded-down value of L×f1/(f1+1), the rounded-up value or the rounded-down value of L×f1/(f1+1), L×f1/(f1+1), L×1/(f1+1), the rounded-up value or the rounded-down value of L×f1/(f1+1), the rounded-up value or the rounded-down value of L×1/(f1+1), L×1/(f2+1), L×f2/(f2+1), the rounded-up value or the rounded-down value of L×1/(f2+1), or the rounded-up value or the rounded-down value of L×f2/(f2+1).

For example, assuming that T−M=6, there are two information fields, a quantity of bits in the first information field is P1, a quantity of bits in the second information field is P2, the bits in the first information field are information obtained after 6×2/(2+1)=4 bits are removed from the bits required to indicate the resources allocated to the terminal device in the first-type BWP corresponding to the first information field, and the bits in the second information field are information obtained after 6×1/(2+1)=2 bits are removed from the bits required to indicate the resources allocated to the terminal device in the first-type BWP corresponding to the second information field. In other words, P1 is information obtained after four most significant bits are removed from the bits required to indicate the resources allocated to the terminal device in the first-type BWP corresponding to the first information field, and P2 is information obtained two most significant bits are removed from the bits required to indicate the resources allocated to the terminal device in the first-type BWP corresponding to the second information field.

In another optional manner, if the quantity of bits in the resource indication information is S less than the quantity of required bits, X bits in the resource indication information are used to indicate the resources allocated to the terminal device in the second-type BWP, where X is equal to the quantity of bits required to indicate the second-type BWP minus S.

Specifically, if the quantity of bits in the resource indication information is S less than the quantity of required bits, the network device needs to remove the S bits from the bits required to indicate the resources allocated to the terminal device in the second-type BWP, to obtain the X bits that meet a specified quantity of bits. The X bits are bits included in the resource indication information sent by the network device to the terminal device, and the resource indication information is used to indicate the resources allocated to the terminal device in the second-type BWP.

Optionally, the removed S bits may be S most significant bits in the resource indication information, or may be S least significant bits in the resource indication information, or may be bits in other locations. This is not specifically limited in this embodiment of this application.

Optionally, locations of the removed S bits may be predefined in a protocol, or may be notified by the network device to the terminal device through signaling. Specifically, this is not limited in this application.

For example, assuming that the quantity of required bits is 12, and the quantity of bits in the resource indication information is 10, that is, assuming that the quantity of bits in the resource indication information is two less than the quantity of required bits, the network device may remove two most significant bits from the required bits, and remaining 10 bits are the resource indication information sent to the terminal device.

In another optional manner, if the quantity of bits in the resource indication information is S less than the quantity of required bits, bits in an information field in the resource indication information are bits required to indicate a first-type BWP corresponding to the information field by the network device, and a most significant bit is removed until a quantity of bits in the information field is the same as a specified quantity of bits. The specified quantity of bits is a specified quantity of bits in the first-type BWP corresponding to the information field. The network device sends, to the terminal device, the information field including bits whose quantity is equal to the specified quantity of bits, and the terminal device may determine, based on the bits in the information field, the resources allocated to the terminal device in the first-type BWP corresponding to the information field.

Specifically, if the quantity of bits in the resource indication information is S less than the quantity of required bits, for the information field in the resource indication information, the network device removes a most significant bit from the bits required to indicate the first-type BWP corresponding to the information field, until the quantity of bits in the information field in the resource indication information is the same as the specified quantity of bits. The specified quantity of bits is a specified quantity of bits used to indicate the resources allocated to the terminal device in the first-type BWP corresponding to the information field. The network device sends, to the terminal device, the information field obtained after the most significant bit is removed, and the terminal device may determine, based on the bits in the information field, the resources allocated to the terminal device in the first-type BWP corresponding to the information field.

For example, assuming that the quantity of bits required by the first-type BWP is 12, and the quantity of bits in the information field corresponding to the first-type BWP in the resource indication information is 10, that is, assuming that the quantity of bits in the information field in the resource indication information is two less than the quantity of bits required to indicate the first-type BWP corresponding to the information field, the network device removes a most significant bit from the bits required to indicate the first-type BWP corresponding to the information field, until the quantity of bits in the information field in the resource indication information is the same as the specified quantity of bits. To be specific, two most significant bits in the bits required to indicate the first-type BWP are removed until the quantity of bits in the information field is equal to 10, and remaining 10 bits are the information field sent to the terminal device.

In another optional manner, if the quantity of bits in the resource indication information is S less than the quantity of required bits, the network device removes a most significant bit from the bits required to indicate the resources allocated to the terminal device in the second-type BWP until the quantity of bits in the resource indication information is the same as a specified quantity of bits. The specified quantity of bits is a quantity of bits specified to indicate the resources allocated to the terminal device in the second-type BWP. The network device sends the resource indication information obtained after the most significant bit is removed, and the terminal device may determine, based on the bits in the resource indication information, the resources allocated to the terminal device in the second-type BWP.

Specifically, if the quantity of bits in the resource indication information is S less than the quantity of required bits, the network device may remove a most significant bit from the bits required to indicate the resources allocated to the terminal device in the second-type BWP until the quantity of bits in the resource indication information is the same as the specified quantity of bits.

Specifically, if the quantity of bits in the resource indication information is M, the quantity of required bits is T, M−T=L, the network device may remove a most significant bit from the bits required to indicate the resources allocated to the terminal device in the second-type BWP until the quantity of bits in the resource indication information is the same as the specified quantity of bits, that is, the quantity of bits in the resource indication information is M. The network device sends the resource indication information obtained after the most significant bit is removed, and the terminal device determines, based on the resource indication information, the resources allocated to the terminal device in the second-type BWP.

In the embodiments provided in this application, the methods provided in the embodiments of this application are described from perspectives of the terminal device, the network device, and interaction between the network device and the terminal device. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a specific function of the foregoing functions is performed by the hardware structure, the software module, or the combination of the hardware structure and the software module depends on a specific application and a design constraint of the technical solution.

Figure 28:
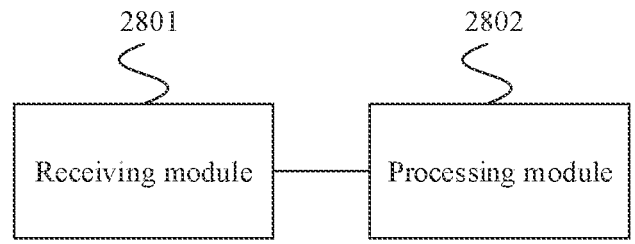
FIG. 28 is a structural diagram of modules of an apparatus according to an embodiment of this application.

FIG. 28 is a structural diagram of modules of an apparatus according to an embodiment of this application. The apparatus may be a terminal device, or may be an apparatus that can support a terminal device in implementing a function of the terminal device in the method provided in the embodiments of this application. For example, the apparatus may be an apparatus or a chip system in a terminal device. As shown in FIG. 28, the apparatus includes a receiving module 2801 and a processing module 2802. In this embodiment of this application, the chip system may include a chip, or may include a chip and another discrete component.

In an optional implementation, the receiving module 2801 is configured to receive resource indication information sent by a network device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1.

For one of the N segments of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP.

The processing module 2802 is configured to transmit a signal on the RBGs allocated to the terminal device.

In another optional implementation, the receiving module 2802 is configured to receive resource indication information sent by a network device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1.

For one of the N segments of frequency domain resources, a size of the last RBG in the segment of frequency domain resources is determined based on a start location of the segment of frequency domain resources, a bandwidth of the segment of frequency domain resources, and P, where the start location of the segment of frequency domain resources is determined based on a reference point of the segment of frequency domain resources, or the start location of the segment of frequency domain resources is determined based on a reference point of the BWP.

The processing module 2802 is configured to transmit a signal on the RBGs allocated to the terminal device.

In the foregoing optional implementations, the sum of the bandwidths of the N frequency domain resources is:

a value obtained after a quantity of overlapping RB are subtracted from a total quantity of RBs included in the N segments of frequency domain resources, where the overlapping RBs include an RB on which a first segment of frequency domain resources and a second segment of frequency domain resources in the N segments of frequency domain resources overlap. The descriptions of the first section and the second section herein are used for distinguishing, and do not indicate a specific sequence or order.

In another optional implementation, the receiving module 2801 is configured to receive resource indication information sent by a network device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a bandwidth of the segment of frequency domain resources, where P is an integer greater than or equal to 1.

For the segment of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP.

The processing module 2802 is configured to transmit a signal on the resource block groups RBGs allocated to the terminal device.

In another optional implementation, the receiving module 2801 is configured to receive resource indication information sent by a network device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a bandwidth of the segment of frequency domain resources, where P is an integer greater than or equal to 1.

For the segment of frequency domain resources, a size of the last RBG in the segment of frequency domain resources is determined based on a start location of the segment of frequency domain resources, the bandwidth of the segment of frequency domain resources, and P, where the start location of the segment of frequency domain resources is determined based on a reference point of the segment of frequency domain resources, or the start location of the segment of frequency domain resources is determined based on a reference point of the BWP.

The processing module 2802 is configured to transmit a signal on the resource block groups RBGs allocated to the terminal device.

In the foregoing optional implementations, when the resource indication information is used to indicate the RBGs allocated to the terminal device in the BWP, one information bit in the resource indication information corresponds to one RBG index, and when a value of the information bit is t1, the RBGs allocated to the terminal device include an RBG corresponding to the RBG index, or when a value of the information bit is not t1 or is t2, the RBGs allocated to the terminal device do not include an RBG corresponding to the RBG index, where t1 and t2 are integers. For example, t1 is 1.

One RBG index uniquely corresponds to one RBG, or a plurality of RBG indexes correspond to one RBG.

When a plurality of RBG indexes correspond to one RBG, the RBG is an overlapping resource in a plurality of segments of frequency domain resources in the N segments of frequency domain resources.

In another optional implementation, the receiving module 2801 is configured to receive resource indication information sent by a network device, where the resource indication information is used to determine resources allocated to the terminal device in a bandwidth part BWP, the BWP includes N segments of frequency domain resources, and N is an integer greater than or equal to 2.

The resource indication information includes N information fields, the N information fields one-to-one correspond to the N segments of frequency domain resources, and each of the N information fields is used to determine resources allocated to the terminal device in each of the N segments of frequency domain resources.

If a quantity of bits in the resource indication information is L greater than a quantity of required bits, for one of the N information fields, X1 bits in the information field are used to indicate resources allocated to the terminal device in a segment of frequency domain resources corresponding to the information field, where X1 is equal to a quantity of bits in the information field minus Y1, and Y1 is a value obtained by equally dividing L by N, or Y1 is determined based on L and a ratio of the quantity of bits in the information field to the quantity of bits in the resource indication information; or if a quantity of bits in the resource indication information is S less than a quantity of required bits, for one of the N information fields, bits obtained after Y2 bits 0 are added to bits in the information field are used to indicate resources allocated to the terminal device in a segment of frequency domain resources corresponding to the information field, where Y2 is a value obtained by equally dividing S by N, or Y2 is determined based on S and a ratio of a quantity of bits in the information field to the quantity of bits in the resource indication information.

Figure 29:
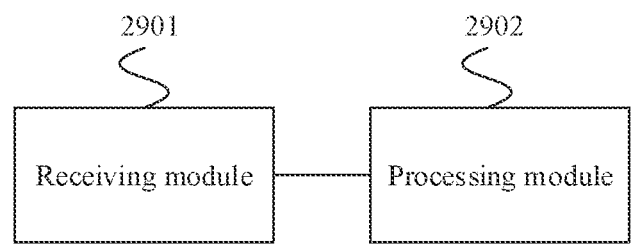
FIG. 29 is another structural diagram of modules of an apparatus according to an embodiment of this application.

The processing module 2802 is configured to transmit a signal on the resources allocated to the terminal device, FIG. 29 is a structural diagram of modules of an apparatus according to an embodiment of this application. The apparatus may be a network device, or may be an apparatus that can support a network device in implementing a function of the network device in the method provided in the embodiments of this application. For example, the apparatus may be an apparatus or a chip system in a network device. As shown in FIG. 29, the apparatus includes a sending module 2901 and a processing module 2902.

In an optional implementation, the sending module 2901 is configured to send resource indication information to a terminal device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1.

For one of the N segments of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP.

The processing module 2902 is configured to transmit a signal to the terminal device on the RBGs allocated to the terminal device.

In another optional implementation, the sending module 2901 is configured to send resource indication information to a terminal device, where the resource indication information is used to indicate resource block groups RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a sum of bandwidths of the N segments of frequency domain resources, where P is an integer greater than or equal to 1.

For one of the N segments of frequency domain resources, a size of the last RBG in the segment of frequency domain resources is determined based on a start location of the segment of frequency domain resources, a bandwidth of the segment of frequency domain resources, and P, where the start location of the segment of frequency domain resources is determined based on a reference point of the segment of frequency domain resources, or the start location of the segment of frequency domain resources is determined based on a reference point of the BWP.

The processing module 2902 is configured to transmit a signal to the terminal device on the RBGs allocated to the terminal device.

In the foregoing implementations, the sum of the bandwidths of the N frequency domain resources is:

a value obtained after a quantity of overlapping RBs is subtracted from a total quantity of RBs included in the N segments of frequency domain resources, where the overlapping RBs include an RB on which a first segment of frequency domain resources and a second segment of frequency domain resources in the N segments of frequency domain resources overlap. The descriptions of the first section and the second section herein are used for distinguishing, and do not indicate a specific sequence or order.

In another optional implementation, the sending module 2901 is configured to send resource indication information to a terminal device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a bandwidth of the segment of frequency domain resources, where P is an integer greater than or equal to 1.

For the segment of frequency domain resources, a size of the first RBG in the segment of frequency domain resources is determined based on a start location of the segment of frequency domain resources and P, where the start location of the segment of frequency domain resources is determined based on a reference point of the segment of frequency domain resources, or the start location of the segment of frequency domain resources is determined based on a reference point of the BWP.

The processing module 2902 is configured to transmit a signal to the terminal device on the RBGs allocated to the terminal device.

In another optional implementation, the sending module 2901 is configured to send resource indication information to a terminal device, where the resource indication information is used to indicate RBGs allocated to the terminal device in a bandwidth part BWP, the BWP includes N segments of frequency domain resources, and N is an integer greater than or equal to 2.

For one of the N segments of frequency domain resources, a size P of an RBG other than the first RBG and the last RBG in the segment of frequency domain resources is determined based on a bandwidth of the segment of frequency domain resources, where P is an integer greater than or equal to 1.

For the segment of frequency domain resources, a size of the last RBG in the segment of frequency domain resources is determined based on a start location of the segment of frequency domain resources, the bandwidth of the segment of frequency domain resources, and P, where the start location of the segment of frequency domain resources is determined based on a reference point of the segment of frequency domain resources, or the start location of the segment of frequency domain resources is determined based on a reference point of the BWP.

The processing module 2902 is configured to transmit a signal to the terminal device on the RBGs allocated to the terminal device.

In the foregoing optional implementations, when the resource indication information is used to indicate the RBGs allocated to the terminal device in the BWP, one information bit in the resource indication information corresponds to one RBG index, and when a value of the information bit is if, the RBGs allocated to the terminal device include an RBG corresponding to the RBG index, or when a value of the information bit is not t1 or is t2, the RBGs allocated to the terminal device do not include an RBG corresponding to the RBG index.

One RBG index uniquely corresponds to one RBG, or a plurality of RBG indexes correspond to one RBG.

When a plurality of RBG indexes correspond to one RBG, the RBG is an overlapping resource in a plurality of segments of frequency domain resources in the N segments of frequency domain resources.

In another optional implementation, the sending module 2091 is configured to send resource indication information to a terminal device, where the resource indication information is used to indicate resources allocated to the terminal device in a bandwidth part BWP, the BWP includes N segments of frequency domain resources, and N is an integer greater than or equal to 2.

The resource indication information includes N information fields, the N information fields one-to-one correspond to the N segments of frequency domain resources, and each of the N information fields is used to indicate resources allocated to the terminal device in each of the N segments of frequency domain resources.

If a quantity of bits in the resource indication information is L greater than a quantity of required bits, for one of the N information fields, bits in the information field are information obtained after Y1 bits 0 are added to bits required to allocate resources to the terminal device in a segment of frequency domain resources corresponding to the information field, where Y1 is a value obtained by equally dividing L by N, or Y1 is determined based on L and a ratio of a quantity of bits in the information field to the quantity of bits in the resource indication information; or if a quantity of bits in the resource indication information is S less than a quantity of required bits, for one of the N information fields, the information field is used to indicate resources allocated to the terminal device in a segment of frequency domain resources corresponding to the information field, where the information field is information obtained after Y2 bits are removed from bits required to allocate the resources to the terminal device in the segment of frequency domain resources corresponding to the information field, and Y2 is a value obtained by equally dividing S by N, or Y2 is determined based on S and a ratio of a quantity of bits in the information field to the quantity of bits in the resource indication information.

The processing module 2902 is configured to transmit a signal to the terminal device on the RBGs allocated to the terminal device.

In the embodiments of this application, division into modules is an example and is merely logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 30:
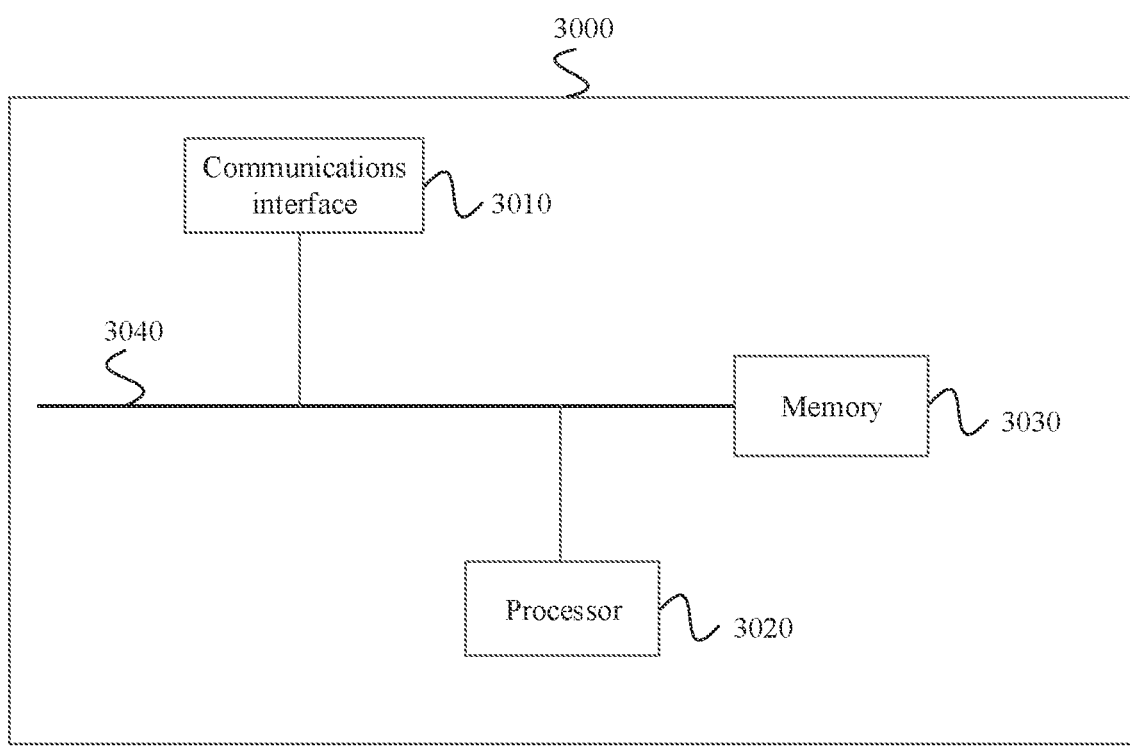
FIG. 30 is an example diagram of an apparatus 3000 according to an embodiment of this application.

FIG. 30 shows an apparatus 3000 according to an embodiment of this application. The apparatus 3000 is configured to implement functions of the terminal device in the foregoing method. The apparatus may be a terminal device, or may be an apparatus that can support the terminal device in implementing a function of the terminal device in the method provided in the embodiments of this application. For example, the apparatus may be an apparatus in the terminal device. The apparatus may be a chip system. The apparatus 3000 includes at least one processor 3020, configured to implement a function of the terminal device in the method provided in the embodiments of this application. For example, the processor 3020 may receive resource indication information and transmit a signal on resources indicated by the resource indication. For details, refer to detailed descriptions in the method example, Details are not described herein again.

The apparatus 3000 may further include at least one memory 3030, configured to store a program instruction and/or data. The memory 3030 is coupled to the processor 3020. Coupling in this embodiment of this application is an indirect coupling or a communication connection between apparatuses, units, or modules, may be in an electrical form, a mechanical form, or another form, and is used for information exchange between the apparatuses, the units, or the modules. The processor 3020 may operate with the memory 3030 together. The processor 3020 may execute the program instruction stored in the memory 3030. At least one of the at least one memory may be included in the processor.

The apparatus 3000 may further include a communications interface 3010, configured to communicate with another device through a transmission medium, so that an apparatus in the apparatus 3000 can communicate with the another device. In the embodiments of this application, the communications interface may be an interface that can perform communication in any form, for example, a module, a circuit, a bus, or a combination thereof. Optionally, the communications interface 3010 may be a transceiver. For example, the another device may be a network device. The processor 3020 receives and sends data through the communications interface 3010, and is configured to implement the method performed by the terminal device in the foregoing method embodiment.

In this embodiment of this application, a specific connection medium between the communications interface 3010, the processor 3020, and the memory 3030 is not limited. In this embodiment of this application, the memory 3030, the processor 3020, and the communications interface 3010 are connected through a bus 3040 in FIG. 30, and the bus is represented by a bold line in FIG. 30. A manner of connection between other components is schematically described, and is not limited thereto. The bus may be classified into an address bus, a data bus, a control bus, and the like. For ease of representation, only one thick line is used to represent the bus in FIG. 30, but this does not mean that there is only one bus or only one type of bus.

Figure 31:
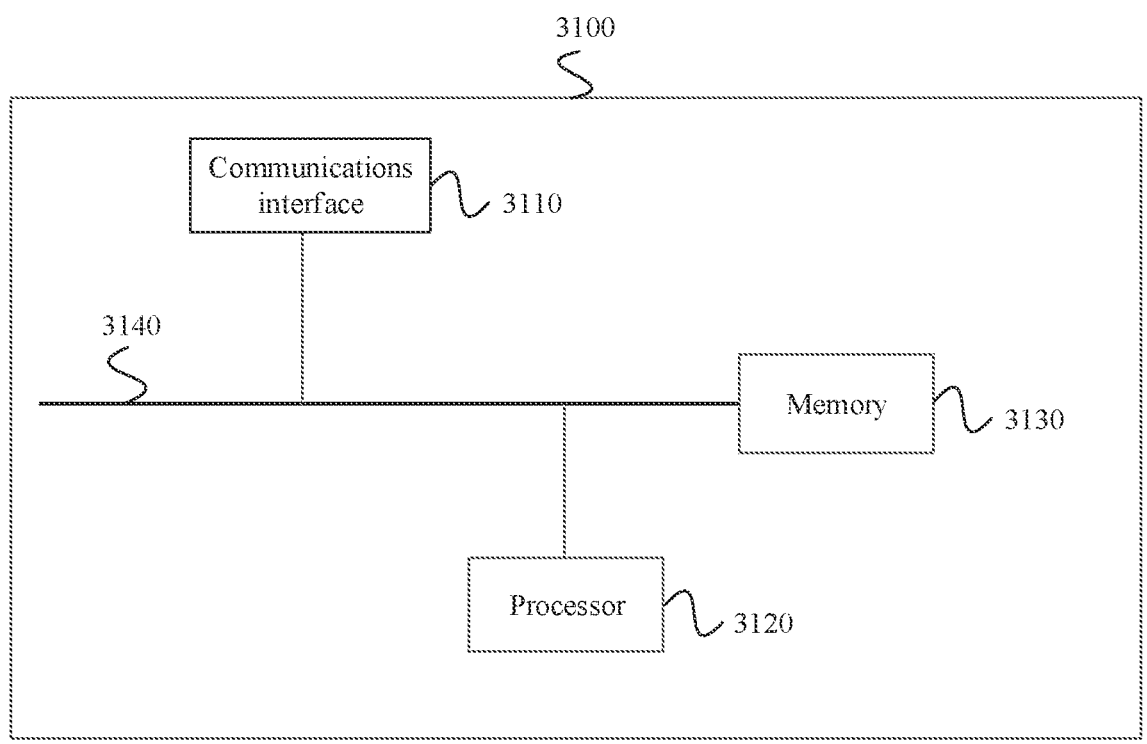
FIG. 31 is an example diagram of an apparatus 3100 according to an embodiment of this application.

FIG. 31 shows an apparatus 3100 according to an embodiment of this application. The apparatus 3100 is configured to implement functions of the network device in the foregoing method. The apparatus may be a network device, or may be an apparatus that can support a network device in implementing a function of the network device in the method provided in the embodiments of this application. For example, the apparatus may be an apparatus in the network device. The apparatus may be a chip system. The apparatus 3100 includes at least one processor 3120, configured to implement a function of the network device in the method provided in the embodiments of this application. For example, the processor 3120 may send resource indication information to a terminal device and transmit a signal to the terminal device on resources indicated by the resource indication. For details, refer to detailed descriptions in the method example. Details are not described herein again.

The apparatus 3100 may further include at least one memory 3130, configured to store a program instruction and/or data. The memory 3130 is coupled to the processor 3120. Coupling in this embodiment of this application is an indirect coupling or a communication connection between apparatuses, units, or modules, may be in an electrical form, a mechanical form, or another form, and is used for information exchange between the apparatuses, the units, or the modules. The processor 3120 may operate with the memory 3130 together. The processor 3120 may execute the program instruction stored in the memory 3130. At least one of the at least one memory may be included in the processor.

The apparatus 3100 may further include a communications interface 3110, configured to communicate with another device through a transmission medium, so that an apparatus in the apparatus 3000 can communicate with the another device. Optionally, the communications interface 3110 may be a transceiver. For example, the another device may be a terminal device. The processor 3120 receives and sends data through the communications interface 3110, and is configured to implement the method performed by the network device in the foregoing method embodiment.

In this embodiment of this application, a specific connection medium between the communications interface 3110, the processor 3120, and the memory 3130 is not limited. In this embodiment of this application, the memory 3130, the processor 3120, and the communications interface 3110 are connected through a bus 3140 in FIG. 31, and the bus is represented by a bold line in FIG. 31. A manner of connection between other components is schematically described, and is not limited thereto. The bus may be classified into an address bus, a data bus, a control bus, and the like. For ease of representation, only one thick line is used to represent the bus in FIG. 31, but this does not mean that there is only one bus or only one type of bus.

In the embodiments of this application, a processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by a combination of hardware in the processor and a software module.

In the embodiments of this application, the memory may be a non-volatile memory, for example, a hard disk drive (HDD) or solid-state drive (SSD), or may be a volatile memory, for example, a random access memory (RAM). The memory is any other medium that can be used to carry or store expected program code in a form of an instruction or a data structure and that can be accessed by a computer, but is not limited thereto. The memory in the embodiments of this application may alternatively be a circuit or any other apparatus that can implement a storage function, and is configured to store the program instruction and/or the data.

All or some of the foregoing methods in the embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are completely or partially generated. The computer may be a general-purpose computer, a special-purpose computer, a computer network, a network device, user equipment, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer or a data storage device, for example, a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

It is clearly that a person skilled in the art can make various modifications and variations to this application without departing from the scope of this application. This application is intended to cover these modifications and variations of this application provided that they fall within the scope defined by the following claims and their equivalent technologies.

What is claimed is:

1. A signal transmission method, comprising:
sending resource indication information to a terminal device, wherein the resource indication information indicates resource block groups (RBGs) allocated to the terminal device in a bandwidth part (BWP), the BWP comprises N segments of frequency domain resources, and N is an integer greater than or equal to 2, wherein
for one of the N segments of frequency domain resources, a size P of an RBG other than a first RBG and a last RBG in the segment of frequency domain resources is determined based on a sum of bandwidths of the N segments of frequency domain resources, wherein P is an integer greater than or equal to 1; and
for one of the N segments of frequency domain resources, a size of the first RBG in the segment of frequency domain resources is determined based on a start location of the segment of frequency domain resources and P, wherein the start location of the segment of frequency domain resources is determined based on a reference point of the segment of frequency domain resources, or the start location of the segment of frequency domain resources is determined based on a reference point of the BWP; and
transmitting a signal to the terminal device on the RBGs allocated to the terminal device.

2. The method according to claim 1, wherein
for one of the N segments of frequency domain resources, a size of the last RBG in the segment of frequency domain resources is determined based on a start location of the segment of frequency domain resources, a bandwidth of the segment of frequency domain resources, and P, wherein the start location of the segment of frequency domain resources is determined based on a reference point of the segment of frequency domain resources, or the start location of the segment of frequency domain resources is determined based on a reference point of the BWP.

3. The method according to claim 1, wherein the sum of the bandwidths of the N segments of frequency domain resources is:
a value obtained after a quantity of overlapping resource blocks (RBs) is subtracted from a total quantity of RBs comprised in the N segments of frequency domain resources, wherein the overlapping RBs comprise an RB on which a first segment of frequency domain resources and a second segment of frequency domain resources in the N segments of frequency domain resources overlap.

4. The method according to claim 1, wherein
one information bit in the resource indication information corresponds to one RBG index, and when a value of the one information bit is t1, the RBGs allocated to the terminal device comprise an RBG corresponding to the one RBG index, or when a value of the one information bit is not t1 or is t2, the RBGs allocated to the terminal device do not comprise an RBG corresponding to the RBG index, wherein t1 and t2 are integers;

each RBG index corresponds to a different RBG, or a plurality of RBG indexes correspond to a same RBG; and when a plurality of RBG indexes correspond to the same RBG, the RBG is an overlapping resource in a plurality of segments of frequency domain resources of the N segments of frequency domain resources.

5. The method according to claim 1, wherein the resource indication information comprises N information fields, the N information fields one-to-one correspond to the N segments of frequency domain resources, and each of the N information fields indicates resources allocated to the terminal device in each of the N segments of frequency domain resources; and if a quantity of bits in the resource indication information is L greater than a quantity of required bits, for one of the N information fields, bits in the information field are information obtained after Y1 bits 0 are added to bits required to allocate resources to the terminal device in a segment of frequency domain resources corresponding to the information field, wherein Y1 is a value obtained by equally dividing L by N, or Y1 is determined based on L and a ratio of a quantity of bits in the information field to the quantity of bits in the resource indication information; or if a quantity of bits in the resource indication information is S less than a quantity of required bits, for one of the N information fields, the information field is used to indicate resources allocated to the terminal device in a segment of frequency domain resources corresponding to the information field, wherein the information field is information obtained after Y2 bits are removed from bits required to allocate the resources to the terminal device in the segment of frequency domain resources corresponding to the information field, and Y2 is a value obtained by equally dividing S by N, or Y2 is determined based on S and a ratio of a quantity of bits in the information field to the quantity of bits in the resource indication information.

6. A communications apparatus, comprising a memory and a processor, wherein the processor is configured to couple to the memory, and read and execute an instruction stored in the memory, to receive resource indication information sent by a network device, wherein the resource indication information indicates resource block groups (RBGs) allocated to a terminal device in a bandwidth part (BWP), the BWP comprises N segments of frequency domain resources, and N is an integer greater than or equal to 2, wherein for one of the N segments of frequency domain resources, a size P of an RBG other than a first RBG and a last RBG in the segment of frequency domain resources is determined based on a sum of bandwidths of the N segments of frequency domain resources, wherein P is an integer greater than or equal to 1; and for one of the N segments of frequency domain resources, a size of the first RBG in the segment of frequency domain resources is determined based on a start location of the segment of frequency domain resources and P, wherein the start location of the segment of frequency domain resources is determined based on a reference point of the segment of frequency domain resources, or the start location of the segment of frequency domain resources is determined based on a reference point of the BWP; and transmit a signal on the RBGs allocated to the terminal device.

7. The communications apparatus according to claim 6, wherein for one of the N segments of frequency domain resources, a size of the last RBG in the segment of frequency domain resources is determined based on a start location of the segment of frequency domain resources, a bandwidth of the segment of frequency domain resources, and P, wherein the start location of the segment of frequency domain resources is determined based on a reference point of the segment of frequency domain resources, or the start location of the segment of frequency domain resources is determined based on a reference point of the BWP.

8. The communications apparatus according to claim 6, wherein a value obtained after a quantity of overlapping resource blocks (RBs) is subtracted from a total quantity of RBs comprised in the N segments of frequency domain resources, wherein the overlapping RBs comprise an RB on which a first segment of frequency domain resources and a second segment of frequency domain resources in the N segments of frequency domain resources overlap.

9. The communications apparatus according to claim 6, wherein one information bit in the resource indication information corresponds to one RBG index, and when a value of the one information bit is t1 the RBGs allocated to the terminal device comprise an RBG corresponding to the one RBG index, or when a value of the one information bit is not t1 or is t2, the RBGs allocated to the terminal device do not comprise an RBG corresponding to the RBG index, wherein t1 and t2 are integers;

each RBG index corresponds to a different RBG, or a plurality of RBG indexes correspond to a same RBG; and when a plurality of RBG indexes correspond to the same RBG, the RBG is an overlapping resource in a plurality of segments of frequency domain resources of the N segments of frequency domain resources.

10. The communications apparatus according to claim 6, wherein the resource indication information comprises N information fields, the N information fields one-to-one correspond to the N segments of frequency domain resources, and each of the N information fields indicates resources allocated to the terminal device in each of the N segments of frequency domain resources; and if a quantity of bits in the resource indication information is L greater than a quantity of required bits, for one of the N information fields, X1 bits in the information field are used to indicate resources allocated to the terminal device in a segment of frequency domain resources corresponding to the information field, wherein X1 is equal to a quantity of bits in the information field minus Y1, and Y1 is a value obtained by equally dividing L by N, or Y1 is determined based on L and a ratio of the quantity of bits in the information field to the quantity of bits in the resource indication information; or if a quantity of bits in the resource indication information is S less than a quantity of required bits, for one of the N information fields, bits obtained after Y2 bits 0 are added to bits in the information field are used to indicate resources allocated to the terminal device in a segment of frequency domain resources corresponding to the information field, wherein Y2 is a value obtained by equally dividing S by N, or Y2 is determined based on S and a ratio of a quantity of bits in the information field to the quantity of bits in the resource indication information.

11. A communications apparatus, comprising a memory and a processor, wherein
the processor is configured to couple to the memory, and read and execute an instruction stored in the memory, to
send resource indication information to a terminal device, wherein the resource indication information indicates resource block groups (RBGs) allocated to the terminal device in a bandwidth part (BWP), the BWP comprises N segments of frequency domain resources, and N is an integer greater than or equal to 2, wherein
for one of the N segments of frequency domain resources, a size P of an RBG other than a first RBG and a last RBG in the segment of frequency domain resources is determined based on a sum of bandwidths of the N segments of frequency domain resources, wherein P is an integer greater than or equal to 1; and
for one of the N segments of frequency domain resources, a size of the first RBG in the segment of frequency domain resources is determined based on a start location of the segment of frequency domain resources and P, wherein the start location of the segment of frequency domain resources is determined based on a reference point of the segment of frequency domain resources, or the start location of the segment of frequency domain resources is determined based on a reference point of the BWP; and
transmit a signal to the terminal device on the RBGs allocated to the terminal device.

12. The communications apparatus according to claim 11, wherein
for one of the N segments of frequency domain resources, a size of the last RBG in the segment of frequency domain resources is determined based on a start location of the segment of frequency domain resources, a bandwidth of the segment of frequency domain resources, and P, wherein the start location of the segment of frequency domain resources is determined based on a reference point of the segment of frequency domain resources, or the start location of the segment of frequency domain resources is determined based on a reference point of the BWP.

13. The communications apparatus according to claim 11, wherein the sum of the bandwidths of the N segments of frequency domain resources is:
a value obtained after a quantity of overlapping resource blocks (RBs) is subtracted from a total quantity of RBs comprised in the N segments of frequency domain resources, wherein the overlapping RBs comprise an RB on which a first segment of frequency domain resources and a second segment of frequency domain resources in the N segments of frequency domain resources overlap.

14. The communications apparatus according to claim 11, wherein
one information bit in the resource indication information corresponds to one RBG index, and when a value of the one information bit is t1, the RBGs allocated to the terminal device comprise an RBG corresponding to the one RBG index, or when a value of the one information bit is not t1 or is t2, the RBGs allocated to the terminal device do not comprise an RBG-corresponding to the RBG index, wherein t1 and t2 are integers;
each RBG index corresponds to a different RBG, or a plurality of RBG indexes correspond to a same RBG; and
when a plurality of RBG indexes correspond to the same RBG, the RBG is an overlapping resource in a plurality of segments of frequency domain resources of the N segments of frequency domain resources.

15. The communications apparatus according to claim 11, wherein
the resource indication information comprises N information fields, the N information fields one-to-one correspond to the N segments of frequency domain resources, and each of the N information fields indicates resources allocated to the terminal device in each of the N segments of frequency domain resources; and
if a quantity of bits in the resource indication information is L greater than a quantity of required bits, for one of the N information fields, bits in the information field are information obtained after Y1 bits 0 are added to bits required to allocate resources to the terminal device in a segment of frequency domain resources corresponding to the information field, wherein Y1 is a value obtained by equally dividing L by N, or Y1 is determined based on L and a ratio of a quantity of bits in the information field to the quantity of bits in the resource indication information; or
if a quantity of bits in the resource indication information is S less than a quantity of required bits, for one of the N information fields, the information field is used to indicate resources allocated to the terminal device in a segment of frequency domain resources corresponding to the information field, wherein the information field is information obtained after Y2 bits are removed from bits required to allocate the resources to the terminal device in the segment of frequency domain resources corresponding to the information field, and Y2 is a value obtained by equally dividing S by N, or Y2 is determined based on S and a ratio of a quantity of bits in the information field to the quantity of bits in the resource indication information.

* * * * *

UNITED STATES PATENT AND TRADEMARK OFFICE
CERTIFICATE OF CORRECTION

Page 1 of 1

PATENT NO. : 11,818,695 B2
APPLICATION NO. : 17/157727
DATED : November 14, 2023
INVENTOR(S) : Ting Wang et al.

It is certified that error appears in the above-identified patent and that said Letters Patent is hereby corrected as shown below:

In the Claims

Column 70, Line 32, Claim 9, after "t1" insert therefore -- , --;

Column 72, Line 14 (Approx.), Claim 14, please delete "RBG-corresponding" and insert therefore -- RBG corresponding --.

Signed and Sealed this
Twenty-second Day of October, 2024

Katherine Kelly Vidal
*Director of the United States Patent and Trademark Office*